(12) United States Patent
Muller et al.

(10) Patent No.: US 10,602,236 B2
(45) Date of Patent: Mar. 24, 2020

(54) UNIQUE CONTENT SEQUENCE IDENTIFICATION METHOD AND APPARATUS

(71) Applicant: ISPOT.TV, INC., Bellevue, WA (US)

(72) Inventors: Sean Muller, Bellevue, WA (US);
Torsten Bittner, Redmond, WA (US);
Moshe Cristel, Issaquah, WA (US);
Dennis Ameen, Sammamish, WA (US)

(73) Assignee: ISPOT.TV, INC., Bellevue, WA (US)

( * ) Notice: Subject to any disclaimer, the term of this patent is extended or adjusted under 35 U.S.C. 154(b) by 416 days.

(21) Appl. No.: 15/430,399

(22) Filed: Feb. 10, 2017

(65) Prior Publication Data

US 2017/0155973 A1    Jun. 1, 2017

Related U.S. Application Data

(63) Continuation-in-part of application No. 15/246,375, filed on Aug. 24, 2016, now abandoned, which is a
(Continued)

(51) Int. Cl.

| H04N 21/81 | (2011.01) |
|---|---|
| H04N 21/2668 | (2011.01) |
| G06Q 30/02 | (2012.01) |
| H04N 21/442 | (2011.01) |
| H04N 21/44 | (2011.01) |

(Continued)

(52) U.S. Cl.
CPC ....... *H04N 21/812* (2013.01); *G06Q 30/0251* (2013.01); *G06Q 30/0276* (2013.01); *H04N 21/25841* (2013.01); *H04N 21/25883* (2013.01); *H04N 21/25891* (2013.01); *H04N 21/2668* (2013.01); *H04N 21/44008* (2013.01); *H04N 21/44222* (2013.01); *H04N 21/6582* (2013.01)

(58) Field of Classification Search
CPC .................................................... H04N 21/812
See application file for complete search history.

(56) References Cited

U.S. PATENT DOCUMENTS

| 6,993,245 B1 | 1/2006 | Harville |
|---|---|---|
| 8,302,120 B2 | 10/2012 | Ramaswamy |
| (Continued) | | |

OTHER PUBLICATIONS

Non-Final Office Action dated Nov. 6, 2018, issued in related U.S. Appl. No. 15/245,095, 54 pages.
(Continued)

*Primary Examiner* — Michael H Hong
(74) *Attorney, Agent, or Firm* — Schwabe, Williamson & Wyatt, P.C.

(57) ABSTRACT

Television transmissions are received at multiple locations across a large area. Advertisements may be identified, harvested and tagged from within in the television transmissions. The advertisements may be assigned identifiers; media plans may be determined. A datastructure of observed advertisement sequences may be created; the observed advertisement sequences may be determined to have a probability of being unique above a threshold. The smart TVs may render broadcast content and may report advertisement and/or content identifiers. Reported advertisement sequences may be determined and compared to the datastructure of observed advertisement sequences to identify and/or confirm content rendered by the smart TVs.

24 Claims, 26 Drawing Sheets

Related U.S. Application Data continuation-in-part of application No. 15/245,095, filed on Aug. 23, 2016, now Pat. No. 10,405,037, which is a continuation-in-part of application No. 15/218,351, filed on Jul. 25, 2016, now abandoned, which is a continuation of application No. 14/489,359, filed on Sep. 17, 2014, now Pat. No. 9,402,111.

(51) Int. Cl.
*H04N 21/658* (2011.01)
*H04N 21/258* (2011.01)

(56) References Cited

U.S. PATENT DOCUMENTS

| | | | |
|---|---|---|---|
| 9,380,325 | B1 | 6/2016 | Cormie et al. |
| 9,519,914 | B2 | 12/2016 | Splaine et al. |
| 9,986,288 | B2 | 5/2018 | Besehanic |
| 2005/0096920 | A1 | 5/2005 | Matz et al. |
| 2005/0171951 | A1 | 8/2005 | Farmer |
| 2006/0184982 | A1 | 8/2006 | Paz et al. |
| 2007/0110169 | A1* | 5/2007 | Nassor ............... H04N 7/17318 375/240.26 |
| 2007/0124756 | A1 | 5/2007 | Covell et al. |
| 2009/0307092 | A1* | 12/2009 | Gugliuzza ............ G06Q 30/02 705/14.64 |
| 2011/0063317 | A1 | 3/2011 | Gharaat et al. |
| 2011/0239243 | A1 | 9/2011 | Dierks et al. |
| 2011/0313856 | A1 | 12/2011 | Cohen et al. |
| 2012/0110618 | A1 | 5/2012 | Kilar et al. |
| 2013/0031582 | A1 | 1/2013 | Tinsman et al. |
| 2013/0144723 | A1 | 6/2013 | Green et al. |
| 2013/0227601 | A1 | 8/2013 | Zigmond et al. |
| 2013/0290502 | A1 | 10/2013 | Bilobrov et al. |
| 2013/0305273 | A1 | 11/2013 | Hadfield et al. |
| 2013/0308818 | A1 | 11/2013 | Macintosh et al. |
| 2013/0339991 | A1 | 12/2013 | Ricci |
| 2014/0032321 | A1 | 1/2014 | Krafcik et al. |
| 2014/0096029 | A1 | 4/2014 | Schultz |
| 2014/0115615 | A1 | 4/2014 | Fuhrer |
| 2014/0003539 | A1 | 7/2014 | Rodriguez |
| 2014/0229970 | A1 | 8/2014 | Besehanic |
| 2014/0282662 | A1 | 9/2014 | Major |
| 2014/0282670 | A1 | 9/2014 | Sinha et al. |
| 2015/0181311 | A1 | 6/2015 | Navin et al. |
| 2016/0366478 | A1 | 12/2016 | Muller et al. |

OTHER PUBLICATIONS

Non-Final Office Action dated Oct. 5, 2018, issued in related U.S. Appl. No. 15/246,375, 52 pages.
Final Office Action dated Jun. 19, 2019, issued in related U.S. Appl. No. 15/275,121, 21 pages.
Non-Final Office Action dated Oct. 6, 2017, issued in related U.S. Appl. No. 15/218,351, 13 pages.
Non-Final Office Action dated Nov. 7, 2017, issued in related U.S. Appl. No. 15/245,095, 48 pages.
Office Action dated Jan. 29, 2019, issued in Australian Application No. 2015318666, 3 pages.
Office Action dated May 28, 2019, issued in Chinese Application No. 201580050491.3, 8 pages.
Office Action dated Dec. 16, 2019, issued in Chinese Application No. 201580050491.3, 13 pages.
Extended European Search Report dated Mar. 5, 2018, issued in European Application No. 15841928.3, 9 pages.
Office Action dated Jan. 8, 2020, issued in European Application No. 15841928.3, 7 pages.
International Search Report and Written Opinion dated Jun. 16, 2015, issued in International Application No. PCT/US2015/015821, 11 pages.
Non-Final Office Action dated Dec. 10, 2019, issued in related U.S. Appl. No. 15/275,121, 25 pages.

\* cited by examiner

UNIQUE CONTENT SEQUENCE IDENTIFICATION METHOD AND APPARATUS

CROSS-REFERENCE TO RELATED APPLICATIONS

This application is a continuation-in-part of U.S. patent application Ser. No. 15/246,375, filed Aug. 24, 2016, U.S. patent application Ser. No. 15/245,095, filed Aug. 23, 2016, and U.S. patent application Ser. No. 15/218,351, filed Jul. 25, 2016; U.S. patent application Ser. No. 15/218,351 is a continuation of U.S. patent application Ser. No. 14/489,359, filed Sep. 17, 2014 and issued as U.S. Pat. No. 9,402,111 on Jul. 26, 2016. U.S. patent application Ser. No. 14/489,359, Ser. No. 15/218,351, Ser. No. 15/245,095, and Ser. No. 15/246,375 are incorporated herein, in their entirety, for all purposes; the benefit of the filing dates of U.S. patent application Ser. No. 14/489,359, Ser. No. 15/218,351, Ser. No. 15/245,095, and Ser. No. 15/246,375 are claimed for all subject matter disclosed therein.

FIELD

This disclosure relates to a method and system for identifying unique sequences of content.

BACKGROUND

The following description includes information that may be useful in understanding the present invention. It is not an admission that any of the information provided herein is prior art or relevant to the presently claimed invention, or that any publication specifically or implicitly referenced is prior art.

Television audience measurement technologies use human-completed paper logs, somewhat automated "People Meters", and, more recently, more automated "Portable People Meters" and analysis of "Set-Top Box" data. Paper logs are notebooks in which research subjects record what television broadcast channels and shows they watch and at what time. The paper logs are criticized for being imprecise or inaccurate, for under-reporting daytime and late-night viewing, for failing to record channel "surfing" (rapidly changing channels), and for only measuring audience behavior during relatively few periods during the year. People Meters have buttons, generally one for each research subject in a residence. The research subject presses a button to indicate that they are watching the television and the People Meter records what frequency the television is tuned to. By cross-referencing the time of day with a broadcast schedule for the channel utilizing the frequency, it is possible to estimate the program which the research subject was probably watching (assuming there were no deviations from the schedule).

People Meters also allow non-research subjects to input their age and other demographic information (via buttons), so that non-research subjects may also provide information. Paper logs and People Meters are criticized for requiring active engagement by the research subject, for the selection and distribution of research subjects across the population, for only being used inside of residences, for not measuring audience behavior with respect to non-traditional media rendering devices (smart phones, tables, laptop and desktop computers, and the like), and for the inexact connection between program schedule and what programs and advertisements were actually viewed (program schedules are notoriously unreliable). Portable People Meters ("PPM") are devices worn on or carried by a research subject. The PPM detects inaudible information encoded in the audio and transmits the decoded information to the research organization. The decoded information identifies media which the research subject was exposed to, at least when the original media was encoded to include the inaudible information.

Set-Top Box data from cable converter boxes and the like has been used more recently to measure audience sizes and characteristics. Set-Top Boxes have a large installed base, the data is easily accessible and there is readily available demographic data at the household level. However, one of the major weaknesses in Set-Top Box data is the inability to verify whether the television screen is actually on and whether the content is being viewed since many people turn off their televisions without turning off the Set-Top Box. This leaves measurement companies guessing and creating algorithms to estimate what was actually viewed. The second issue with Set-top Box data is not knowing definitively what advertisements ran during a program and requires matching of external "as-run ad logs" to determine what ads may have been viewed. This is further complicated by certain advertisement types that are locally inserted, operator inserted, dynamically inserted, or inserted into an "over-the-top" program transmission (program transmission on Netflix, Hulu, and the like is referred to herein as an "over-the-top" or "OTT" transmission). The tracking of advertisements in on-demand programming, OTT programming, and other types of advertisements is virtually impossible via Set-Top Box data.

Previous audience measuring systems are very dependent on the accuracy of a media plan, which is used to determine what the research subject was exposed to; however, anticipated media plans are notorious for being inaccurate relative to what was actually broadcast. Furthermore, existing audience measuring systems are slow, do not record many forums and devices in which and by which media is rendered, and are oriented around shows and show audiences, rather than advertisements and advertisement audiences.

Many "second screen" services exist to provide content on a second screen, such as a smartphone, while a user watches or is present before a first screen. To provide relevant second screen content, such services require knowing what is being rendered on the first screen. Automatic content recognition ("ACR") is being deployed to automatically recognize content, such as based on recognition of fingerprints or watermarks. However, as the amount of content increases rapidly and as advertisers create more narrowly tailored advertisements and rapidly place them in wide-ranging distribution channels, including in broadcast media (such that advertisement content increases even faster than non-advertisement content), it is not realistic to insert watermarks into all content and fingerprint recognition requires a vast and highly organized infrastructure to characterize the ever-expanding pool of content. As a result, ACR is typically focused on recognizing "shows" in the content, not on recognizing advertisements.

Advertisers attempt to measure the "View Rate" for advertisements ("View Rate" is defined further, herein). However, for broadcast advertisements, the equipment used to measure View Rate is not typically located in the television (or other display device) which renders the advertisement, but is located elsewhere in the path to the television, such as in a Set-Top Box or on a server. Attempting to measure View Rate in the path to the television is problematic, because of disconnects which can occur between the television and the path to the television and because not all users will be connected to a sampled path. However, measuring View Rate in televisions using ACR is prone to the problems noted above. As a result, View Rate measurement, particularly with respect to broadcast media, typically uses small, closely studied, audiences with controlled equipment and/or with limited content access and statistical extrapolation of the resulting information to larger audiences.

Contemporary televisions are capable of reporting a great deal of information, including ACR information (obtained directly or indirectly), however, they do so unreliably. Sometimes the content is misidentified, sometimes a broadcaster or channel is not identified or is misidentified, sometimes the time of day is not reliably identified, sometimes the rendering time is different from the broadcast time (because the content was recorded), sometimes duplicate information is communicated, sometimes there are gaps in what is communicated, sometimes a designated market area ("DMA") is not reported or is reported unreliably.

DETAILED DESCRIPTION

Figure 1:
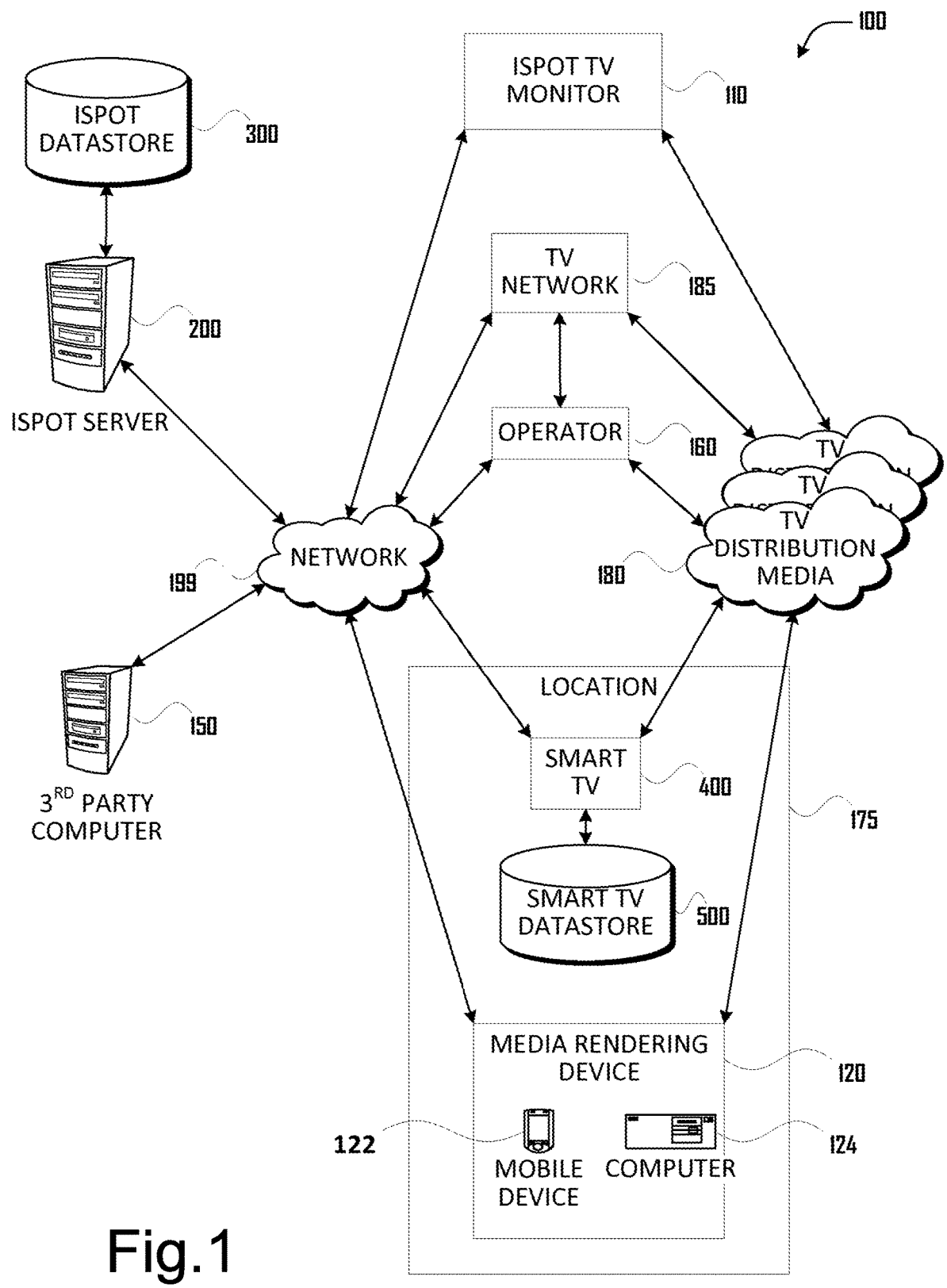
FIG. 1 is a network and device diagram illustrating exemplary computing devices configured according to embodiments disclosed in this paper.

The following Detailed Description provides specific details for an understanding of various examples of the technology. One skilled in the art will understand that the technology may be practiced without many of these details. In some instances, structures and functions have not been shown or described in detail or at all to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect between two or more elements; the coupling of connection between the elements can be physical, logical, or a combination thereof. Additionally, the words, "herein," "above," "below," and words of similar import, when used in this application, shall refer to this application as a whole and not to particular portions of this application. When the context permits, words using the singular may also include the plural while words using the plural may also include the singular. The word "or," in reference to a list of two or more items, covers all of the following interpretations of the word: any of the items in the list, all of the items in the list, and any combination of one or more of the items in the list.

Multiple instances of certain components are labeled with an element number and letter; all such component instances are equivalent within normal ranges. Multiple instances of otherwise identical components can control, be controlled, or communicate separately through assignment of unique or distinguishing identifiers. Such components may be referred to herein only by element number, without a letter in conjunction therewith, in which case the reference is to any of such components.

As used herein, "TV" is an abbreviation for "television". TV devices are meant to include "Smart TV" (defined herein).

As used herein, "Television-Type Devices" include Smart TVs and "second screen" devices, such as smartphones, computers, and the like, which have been configured to receive and render broadcast television. Television-Type Devices may include a tuner of electromagnetic radiation, to receive broadcast television programs broadcast via electro-magnetic radiation (whether terrestrially, through a cable system, or from satellites).

As used herein, "on-demand programming" means audio and/or video content which a user selects; the on-demand programming is typically selected and viewed in real-time, though the programming may also be downloaded or otherwise recorded (by a computing device proximate to the end user or at a server remote from the end user) for later viewing or rendering.

As used herein, "linear television" means television programming which is broadcast on a pre-established schedule to a large audience.

As used herein, "Smart TV" is a television or set-top box with an integrated computer and Internet services. Smart TVs can access and render broadcast television programming as well as online interactive media, Internet TV, OTT content, and network-accessible content, typically through a downloaded or pre-installed software application or "app". Smart TVs are computers comprising a memory, an operating system, and applications for receiving and rendering broadcast television programming and content obtained through apps.

As used herein, "Operator" is an organization which provides content via TV Distribution Media. Operators may aggregate content from multiple Television Networks, each of which may be assigned a "channel" or equivalent in the Broadcast Media.

As used herein, "TV Distribution Media" is a one-to-many communication medium which generally utilizes electro-magnetic radiation to transmit information; examples of TV Distribution Media include radio and television terrestrial broadcast media, satellite broadcast media, and cable systems.

As used herein, "TV Network" is a distributor of linear television content, generally allocated one or more "channels" in TV Distribution Media. TV Networks commonly, though not exclusively, distribute linear television content through Operators, such as through a cable company. TV Networks may distribute linear television content directly through certain types of TV Distribution Media, such as through terrestrial broadcast media.

As used herein, "Pod" means a cluster of consecutive commercials or spot announcements within a television show.

As used herein, "Ad Slot" means a portion of a Pod in which an advertisement may be inserted. A Pod generally comprises multiple Ad Slots.

As used herein, "View Rate" measures the percentage of a broadcast advertisement which is viewed or at least rendered on a display device, such as a television. View Rate as used herein should not be confused with view-through rate in the context of online advertisements; view-through rate measures post-impression response or "viewthrough" from display media impressions viewed during and following an online advertising campaign and is generally understood as 100*viewthrough/impressions.

As used herein, "daypart" is a division of a week into days of the week, weekdays, weekends, and a division of days into, for example, primetime, early fringe, late fringe PM, weekend afternoon, late fringe AM, day time, weekend day, early morning, overnight, and the like.

As used herein, the term "module", "logic", and "routine" may refer to, be part of, or include an Application Specific Integrated Circuit (ASIC), a System on a Chip (SoC), an electronic circuit, a processor (shared, dedicated, or group) and/or memory (shared, dedicated, or group) or in another computer hardware component or device that execute one or more software or firmware programs or a combination, a combinational logic circuit, and/or other suitable components that provide the described functionality. Modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures.

FIG. 1 is a network and device diagram illustrating exemplary computing devices configured according to embodiments disclosed in this paper. Illustrated is iSpot Server 200 computer, which iSpot Server 200 connects to Smart TV 400 and Media Rendering Device 120 via network 199.

Smart TV 400 and Media Rendering Device 120 are illustrated within Location 175. Location 175 may be, for example, a house, an apartment building, or the like. Smart TV 400 and Media Rendering Device 120 do not have to be collocated (as illustrated in FIG. 1, within Location 175), but may be located in different locations. iSpot Server 200 may comprise or be connected to iSpot Datastore 300 (discussed further below). Illustrated within Media Rendering Device 120 are examples of Media Rendering Device 120, such as Computer 124 (which may be a laptop, desktop, tower computer and similar) and Mobile Device 122 (which may be a smart phone, mobile phone, tablet computer, wearable computer, and similar). Media Rendering Device 120 illustrates computers and/or equipment which users may utilize to render television and other content obtained from TV Distribution Media 180 and from Network 199. Media Rendering Device 120 also interacts with the iSpot Server 200 (as described further herein).

Also illustrated in FIG. 1 is Smart TV 400 and Smart TV Datastore 500, discussed further below.

Also illustrated in FIG. 1 are Operator 160, TV Network 185, and TV Distribution Media 180. These terms are defined above.

Also illustrated in FIG. 1 is iSpot TV Monitor 110. iSpot TV Monitor 110 connects to TV Distribution Media 180 across a wide geographic area, analyses linear television content distributed on TV Distribution Media 180, and transmits information to iSpot Server 200. iSpot TV Monitor 110 may perform some or all of the routines attributed to iSpot Server 200; for example, some or all of Ad Harvester 600 routine may be performed by iSpot TV Monitor 110.

Also illustrated in FIG. 1 is $3^{rd}$ Party Computer 150. $3^{rd}$ Party Computer 150 represents multiple parties, corporations, and the like who may be sources of information, such as program schedules for linear television distributed on TV Distribution Media 180, census data, and the like.

Network 199 illustrated in FIG. 1 comprises computers, network connections among the computers, and software routines to enable communication between the computers over the network connections. Examples of the Network 199 comprise an Ethernet network, the Internet, and/or a wireless network, such as a GSM, TDMA, CDMA, EDGE, HSPA, LTE, LTE-Advanced or other network provided by a wireless service provider. Connection to the Network 199 may be via a wireless or wireline connection. More than one network may be involved in a communication session between the illustrated devices. Connection to the Network 199 may require that the computers execute software routines which enable, for example, the seven layers of the OSI model of computer networking or equivalent in a wireless phone network.

This paper may discuss a first computer or computer process as connecting to a second computer or computer process (such as the Smart TV 400 connecting to the iSpot Server 200) or to a corresponding datastore (such as to iSpot Datastore 300); it should be understood that such connections may be to, through, or via the other of the two components (for example, a statement that Smart TV 400 connects with or sends data to the iSpot Server 200 should be understood as saying that the computing device may connect with or send data to the iSpot Datastore 300). References herein to "database" should be understood as equivalent to "datastore." Although illustrated as components integrated in one physical unit, the computers and databases may be provided by common (or separate) physical hardware and common (or separate) logic processors and memory components. Though discussed as occurring within one computing device, the software routines and data groups used by the software routines may be stored and/or executed remotely relative to any of the computers through, for example, application virtualization.

In overview (described in greater detail, below), iSpot Server 200 executes Ad Harvester 600 routine (potentially in conjunction with or using iSpot TV Monitor 110) to identify advertisements in linear television and to save information regarding the advertisements.

iSpot Server 200 also executes Media Plan Determiner 700 routine to determine a media plan for advertisements based on data from Ad Harvester 600 routine, and, with data from iSpot TV Monitor 110, to categorize Ad Slots and Advertisements in television shows as "national", "regional", "local" and/or "dynamically inserted".

In overview, Smart TV 400 (defined above) is owned or possessed by a television viewer. Smart TV 400 executes Viewing Data Collector 800 to collect information regarding Smart TV 400, itself, as well as regarding linear television transmitted via TV Distribution Media 180. Viewing Data Collector 800 may also be executed, in whole or in part, by iSpot Server 200 (such as, for example, blocks 830 to 865). The information collected by Smart TV 400 regarding the Smart TV 400, itself, comprises identifiers of the Smart TV 400 and of an IP Address or the like assigned to Smart TV 400 and the Designated Market Area ("DMA") in which the Smart TV 400 is located. The information collected by Smart TV 400 regarding linear television transmitted via TV Distribution Media 180 comprises a channel which Smart TV 400 received and rendered, a network call sign which may be associated with the channel, a show identifier of a show rendered by Smart TV 400 on the channel, and an iSpot Ad ID of an advertisement in the show rendered by Smart TV 400.

In overview, iSpot Server 200 also executes Smart TV Data Collector 900 to collect data from Viewing Data Collector 800, to execute Ad Insertion Type Determiner 1000, to determine the number of advertisement impressions which occur in the advertisement insertion type categories determined by Ad Insertion Type Determiner 1000, and to determine the GRP and TRP for advertisements. Ad Insertion Type Determiner 1000 categorizes content rendered by Smart TV 400 as being live or time shifted, categorizes non-national advertisement insertions as being regional or dynamic, and categorizes programming sources as being on-demand, OTT, or Internet. iSpot Server 200 may also execute New Ad Identifier 1100, to identify new advertisements, View Rate Module 1200 to determine view rates of advertisements, Overlap and Behavior Module 1300 to determine view rates as well as the advertisement type and behavior of a user of a television, Benchmark Module 1400 to determine view rate benchmarks relative to extrinsic standards, and Reference Ad and Variation Module 1500 to determine a canonical advertisement as well as variations of it.

In addition, iSpot Server 200 may execute Television-Type Device Monitoring Module 1600, Observed Ad Sequence Module 1700, Reported Ad Sequence Identification Module 1800, and Observed-Reported Ad Sequence Search Module 1900 determine observed sequences comprising advertisement(s), determine sequences comprising advertisement(s) reported by Television-Type Devices, correlate reported and observed sequences comprising advertisement(s), and complete missing information reported by Television-Type Devices, and determine whether a reported viewing instance was live or time-shifted.

Figure 2:
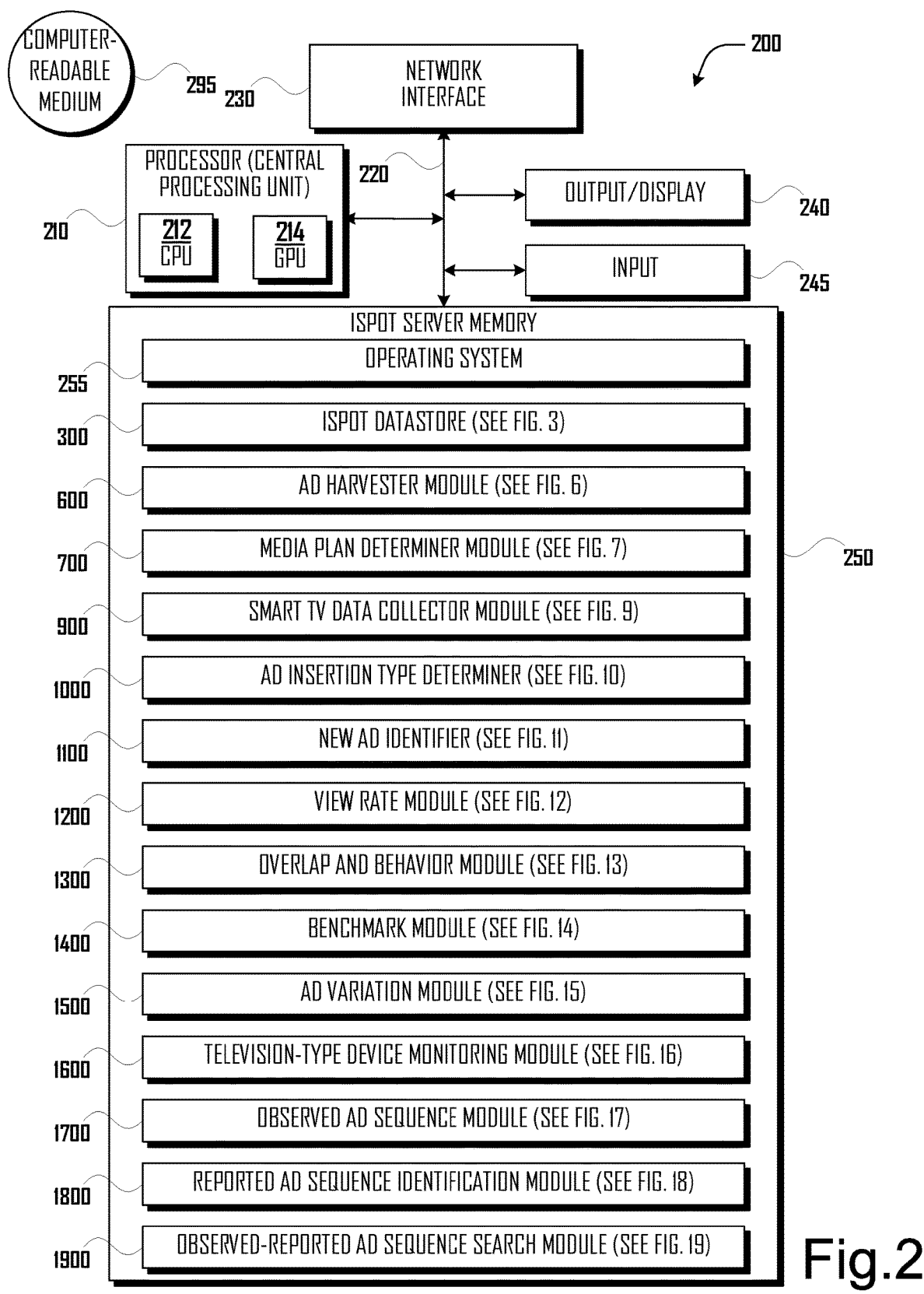
FIG. 2 is a functional block diagram of an exemplary iSpot Server computing device and some data structures and/or components thereof.

FIG. 2 is a functional block diagram of an exemplary iSpot Server 200 computing device and some data structures and/or components thereof. iSpot Server 200 comprises at least one Processing Unit 210, iSpot Server Memory 250, Display 240 and Input 245, all interconnected along with Network Interface 230 via Bus 220. Processing Unit 210 may comprise one or more general-purpose Central Processing Units ("CPU") 212 as well as one or more special-purpose Graphics Processing Units ("GPU") 214.

The components of Processing Unit 210 may be utilized by Operating System 255 for different functions required by routines executed by iSpot Server 200. Network Interface 230 may be utilized to form connections with Network 199 or to form device-to-device connections with other computers. iSpot Server Memory 250 generally comprises a random access memory ("RAM"), a read only memory ("ROM"), and a permanent mass storage device, such as a disk drive or SDRAM (synchronous dynamic random-access memory). iSpot Server Memory 250 stores program code for software routines, such as, for example, Ad Harvester 600, Media Plan Determiner 700, Smart TV Data Collector 900, Ad Insertion Type Determiner 1000, New Ad Identifier 1100, View Rate Module 1200, Overlap and Behavior Module 1300, Benchmark Module 1400, Ad Variation Module 1500, Television-Type Device Monitoring Module 1600, Observed Ad Sequence Module 1700, Reported Ad Sequence Identification Module 1800, Observed-Reported Ad Sequence Search Module 1900, as well as, for example, browser, email client and server routines, client applications, and database applications (discussed further below). Additional data groups for routines, such as for a webserver and web browser, may also be present on and executed by the iSpot Server 200. Webserver and browser routines may provide an interface for interacting with the other computing devices illustrated in FIG. 1 or with other computing devices not illustrated in FIG. 1, for example, through webserver and web browser routines (which may serve and respond to data and information in the form of webpages and html documents or files). The browsers and webservers are meant to illustrate user- and machine-interface routines generally, and may be replaced by equivalent routines for serving and rendering information to and in an interface in a computing device (whether in a web browser or in, for example, a mobile device application, or an API call to a server, a library, or the like).

In addition, iSpot Server Memory 250 also stores Operating System 255. These software components may be loaded from a non-transient Computer Readable Storage Medium 295 into iSpot Server Memory 250 of the computing device using a drive mechanism (not shown) associated with a non-transient Computer Readable Storage Medium 295, such as a floppy disc, tape, DVD/CD-ROM drive, memory card, or other like storage medium. In some embodiments, software components may also or instead be loaded via a mechanism other than a drive mechanism and Computer Readable Storage Medium 295 (e.g., via Network Interface 230).

The iSpot Server 200 may also comprise hardware supporting input modalities, Input 245, such as, for example, a touchscreen, a camera, a keyboard, a mouse, a trackball, a stylus, motion detectors, and a microphone. Input 245 may also serve as Display 240, as in the case of a touchscreen display which also serves as Input 245, and which may respond to input in the form of contact by a finger or stylus with the surface of Input 245. Input 245 and Display 240 may physically be part of iSpot Server 200 and/or may be a component(s) of another device, such as of Imager-Sorter 100.

Figure 3:
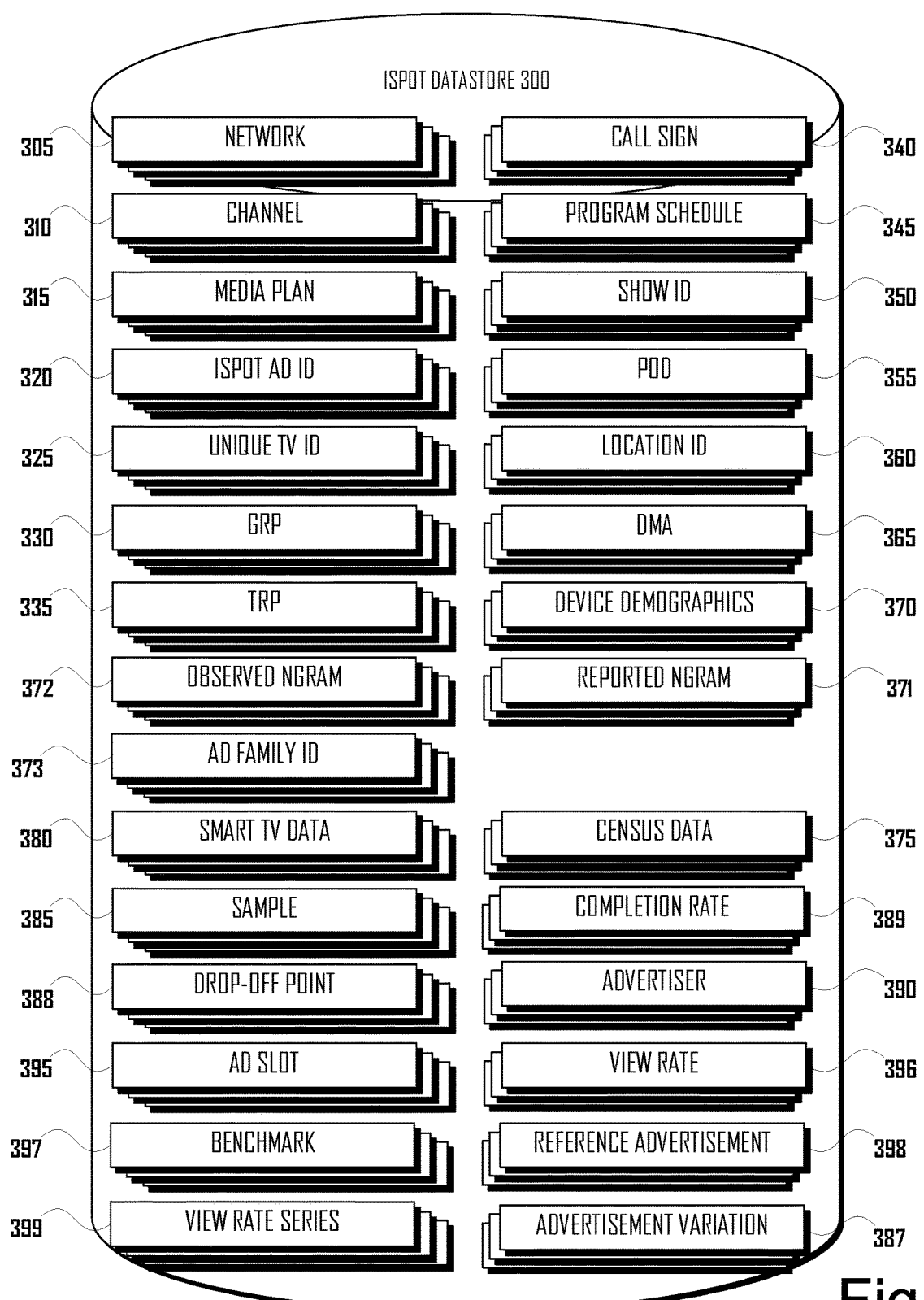
FIG. 3 is a functional block diagram of an exemplary iSpot Server Datastore.

The iSpot Server 200 may also comprise or communicate via Bus 220 with iSpot Datastore 300, illustrated further in FIG. 3. In various embodiments, Bus 220 may comprise a storage area network ("SAN"), a high speed serial bus, and/or via other suitable communication technology. In some embodiments, the iSpot Server 200 may communicate with the iSpot Datastore 300 via Network Interface 230. The iSpot Server 200 may, in some embodiments, include many more components than those shown in this Figure. However, it is not necessary that all of these generally conventional components be shown in order to disclose an illustrative embodiment.

FIG. 3 is a functional block diagram of an exemplary iSpot Server Datastore 300. The illustrated components of the iSpot Datastore 300 are data groups used by routines and are discussed further herein in the discussion of other of the Figures.

The data groups used by routines illustrated in FIG. 3 may be represented by a cell in a column or a value separated from other values in a defined structure in a digital document or file. Though referred to herein as individual records or entries, the records may comprise more than one database entry. The database entries may be, represent, or encode numbers, references to numbers and other values in other records, numerical operators, binary values, logical values, text, string operators, joins, conditional logic, tests, and similar.

Figure 4:
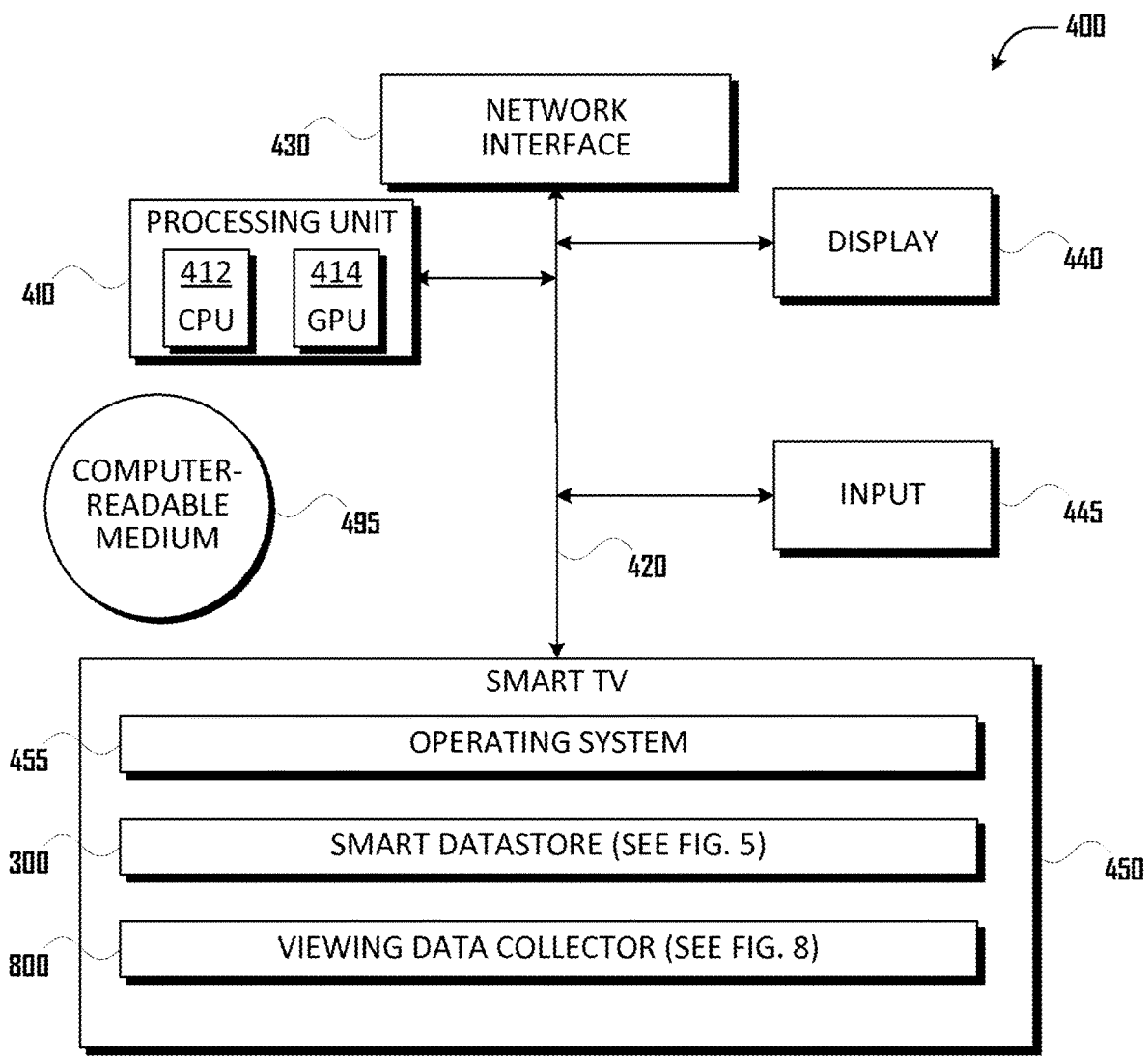
FIG. 4 is a functional block diagram of an exemplary Smart TV computing device and some data structures and/or components thereof.

FIG. 4 is a functional block diagram of an exemplary Smart TV 400 computing device and some data structures and/or components thereof. Smart TV 400 comprises at least one Processing Unit 410, Smart TV Memory 450, Display 440 and Input 445, all interconnected along with Network Interface 430 via Bus 420. Processing Unit 410 may comprise one or more general-purpose Central Processing Units ("CPU") 412 as well as one or more special-purpose Graphics Processing Units ("GPU") 414.

The components of Processing Unit 410 may be utilized by Operating System 455 for different functions required by routines executed by Smart TV 400. Network Interface 430 may be utilized to form connections with Network 199 or to form device-to-device connections with other computers. Smart TV Memory 450 generally comprises a random access memory ("RAM"), a read only memory ("ROM"), and a permanent mass storage device, such as a disk drive or SDRAM (synchronous dynamic random-access memory). Smart TV Memory 450 stores program code for software routines, such as, for example, Viewing Data Collector 800, as well as, for example, browser, email client and server routines, client applications, and database applications (discussed further below). Additional data groups for routines, such as for a webserver and web browser, may also be present on and executed by the Smart TV 400. Webserver and browser routines may provide an interface for interacting with the other computing devices illustrated in FIG. 1 or with other computing devices not illustrated in FIG. 1, for example, through webserver and web browser routines (which may serve and respond to data and information in the form of webpages and html documents or files). The browsers and webservers are meant to illustrate user- and machine-interface routines generally, and may be replaced by equivalent routines for serving and rendering information to and in an interface in a computing device (whether in a web browser or in, for example, a mobile device application, or an API call to a server, a library, or the like).

In addition, Smart TV Memory 450 also stores Operating System 455. These software components may be loaded from a non-transient Computer Readable Storage Medium 495 into Smart TV Memory 450 of the computing device using a drive mechanism (not shown) associated with a non-transient Computer Readable Storage Medium 495, such as a floppy disc, tape, DVD/CD-ROM drive, memory card, or other like storage medium. In some embodiments, software components may also or instead be loaded via a mechanism other than a drive mechanism and Computer Readable Storage Medium 495 (e.g., via Network Interface 430).

The Smart TV 400 may also comprise hardware supporting input modalities, Input 245, such as, for example, a touchscreen, a camera, a keyboard, a mouse, a trackball, a stylus, motion detectors, and a microphone. Input 445 may also serve as Display 440, as in the case of a touchscreen display which also serves as Input 445, and which may respond to input in the form of contact by a finger or stylus with the surface of Input 445. Input 445 and Display 440 may physically be part of Smart TV 400 and/or may be a component(s) of another device.

Figure 5:
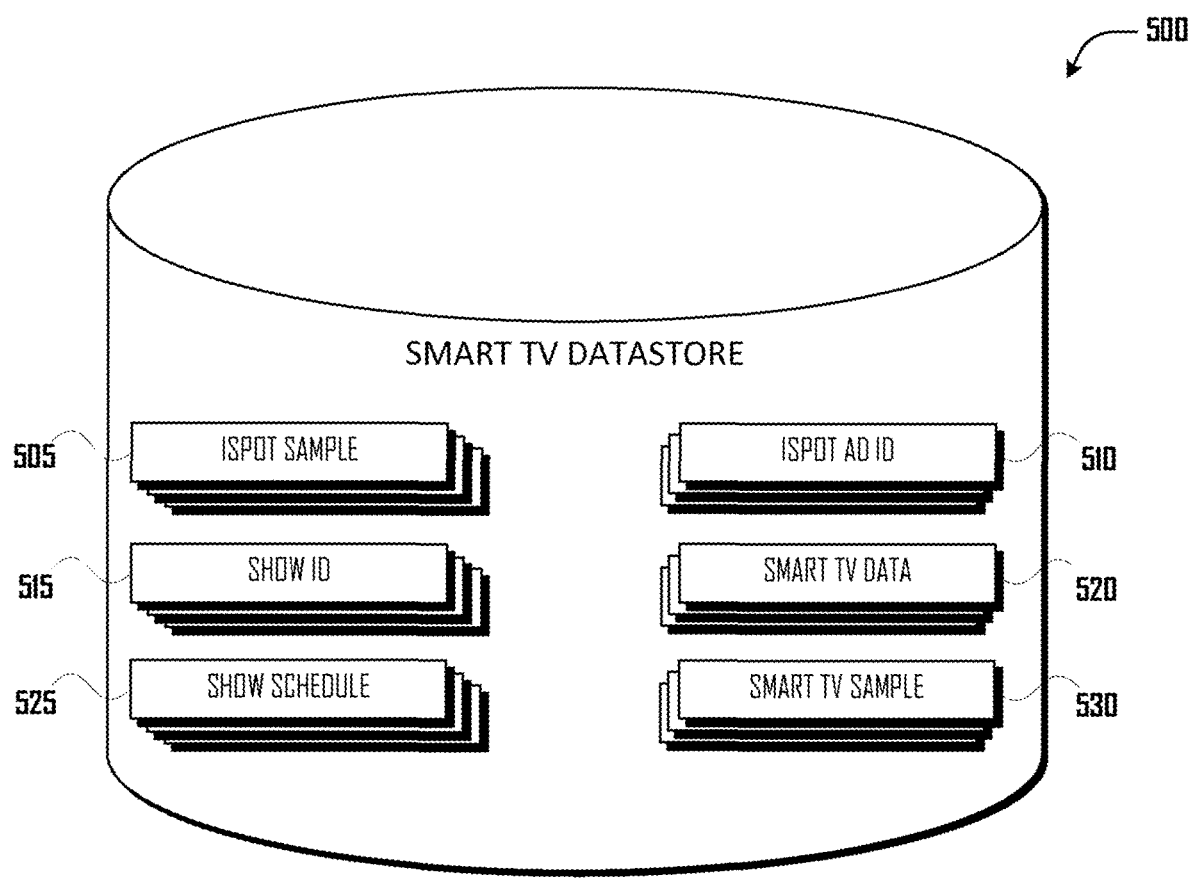
FIG. 5 is a functional block diagram of an exemplary Smart TV Datastore.

Smart TV 400 may also comprise or communicate via Bus 420 with Smart TV Datastore 500, illustrated further in FIG. 5. In various embodiments, Bus 420 may comprise a storage area network ("SAN"), a high speed serial bus, and/or via other suitable communication technology. In some embodiments, the Smart TV 400 may communicate with the Smart TV Datastore 500 via Network Interface 430. Smart TV 400 may, in some embodiments, include many more components than those shown in this Figure. However, it is not necessary that all of these generally conventional components be shown in order to disclose an illustrative embodiment.

FIG. 5 is a functional block diagram of an exemplary Smart TV Datastore 500. The illustrated components of the Smart TV Datastore 500 are data groups used by routines and are discussed further herein in the discussion of other of the Figures.

The data groups used by routines illustrated in FIG. 5 may be represented by a cell in a column or a value separated from other values in a defined structure in a digital document or file. Though referred to herein as individual records or entries, the records may comprise more than one database entry. The database entries may be, represent, or encode numbers, numerical operators, binary values, logical values, text, string operators, joins, conditional logic, tests, and similar.

Figure 6:
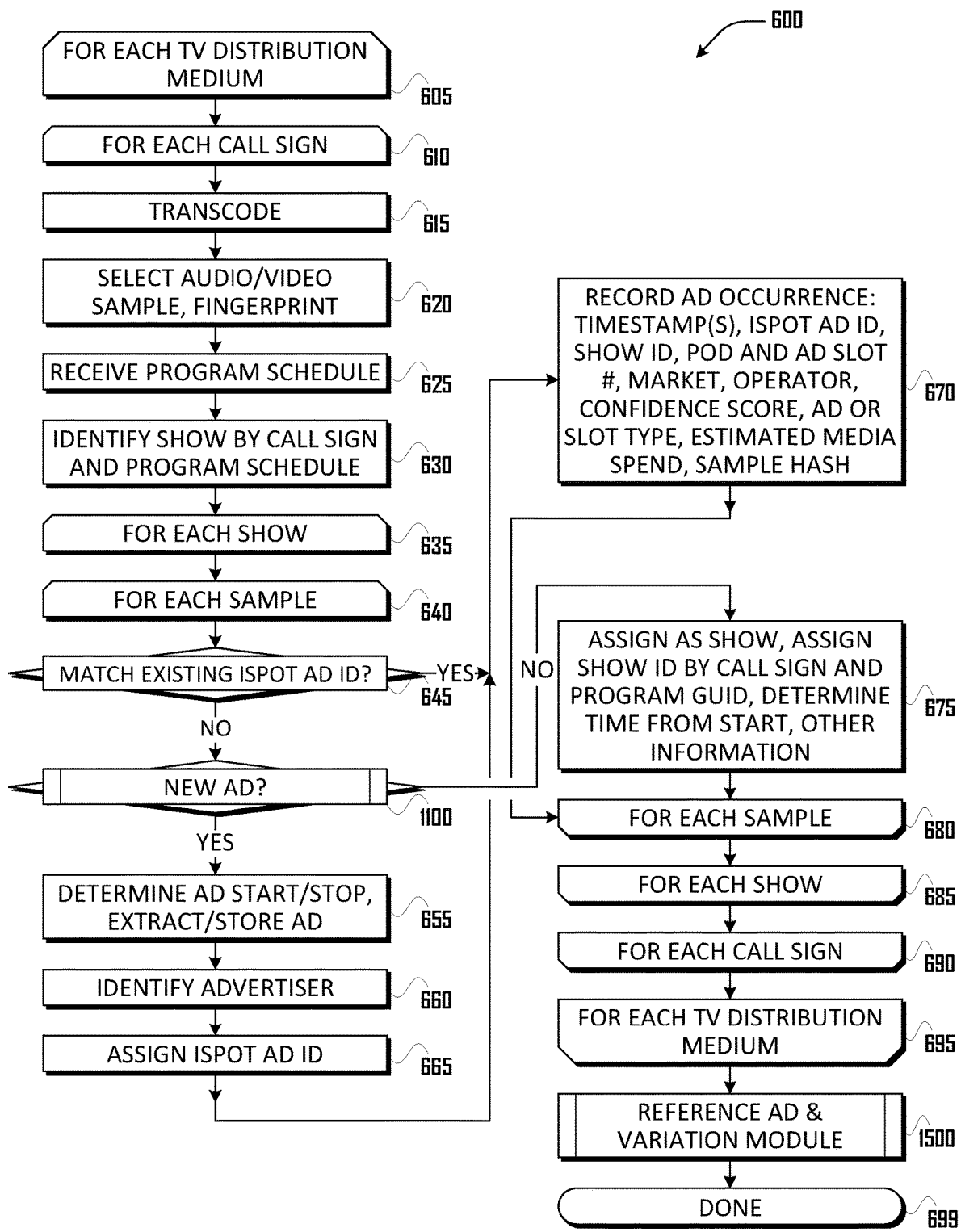
FIG. 6 is a flowchart illustrating an exemplary embodiment and/or algorithmic structure of an Ad Harvester routine.

FIG. 6 is a flowchart illustrating an exemplary embodiment of an Ad Harvester 600 routine. Ad Harvester 600 may be executed by iSpot Server 200 and/or by iSpot TV Monitor 110. Multiple television signal receivers may be present in such devices and such devices or signal receivers thereof may be distributed across a large geographic area, such as in multiple cities, in multiple states, and the like, connecting to multiple different TV Distribution Media 180 to obtain linear television from many sources and to execute Ad Harvester 600 with respect to the multiple linear television sources.

Blocks 605 to 695 iterate over each TV Distribution Medium 180 to which the computer hardware executing the Ad Harvester 600 routine can connect. Blocks 610 to 690 iterate over each "channel" which the computer hardware executing the Ad Harvester 600 routine can receive. "Channels" are commonly understood as dividing the communication spectrum used by TV Distribution Medium 180, though "channels" are now often a logical division, not a physical or electro-magnetic division of spectrum. For this reason, blocks 610 to 690 are labeled in relation to a "call sign" for each "channel". "Call signs" are commonly assigned to "channels"; examples of "call signs" include NBC, ABC, CNN and the like. Call signs may be recorded in iSpot Datastore 300 as Call Sign 340 records.

At block 615, the linear television received via the then-current Call Sign 340 may encoded and/or transcoded from the source signal (which may be analog or digital) obtained from the TV Distribution Medium 180. The encoding and/or transcoding may be into or according to one or more codecs and at a variety of frame or other rates.

At block 620, samples from the transcoded output of block 615 may be selected. For example, the samples may comprise 30 frames per second of video and/or 7 chunks per second of audio, which may be a subset of the transcoded data of block 615. Samples may comprise a full-resolution and/or original linear television datastream, as originally broadcast. The samples and the encoded and/or transcoded data of block 615 and/or a hash or fingerprint thereof may be saved in, for example, Sample 385 record or the like. Samples, hashes, or fingerprints may be referred to herein as a "representation".

At block 625, Ad Harvester 600 may receive a program schedule for Call Sign 340 in the TV Distribution Medium 180. The program schedule may be received from, for example, 3$^{rd}$ Party Computer 150. The program schedule may be stored in, for example, Program Schedule 345 record.

At block 630, Ad Harvester 600 may identify the then-current show in the Program Schedule 345 for Call Sign 340 at the then-current time. The show may be recorded in, for example, Show ID 350 record.

Blocks 635 to 685 iterate for each Show ID 350 record of block 630. Blocks 640 to 680 iterate for each Sample 385 of block 620. The processing of blocks 640 to 680 may be in relation to video and/or audio samples in Sample 385 records.

At block 645 a determination may be made whether the then-current Sample 385 or a hash thereof matches a Sample 385 of or a hash thereof associated with an existing iSpot Ad ID 320. This matching may also be performed in relation to Advertisement Variations 387 prepared by Reference Ad and Variation Module 1500. If not, then at block 1100, a determination may be made regarding whether the Sample 385 meets criteria for being an advertisement. This determination is discussed further in relation to FIG. 11.

If affirmative at block 1100, then at block 655 the start and stop of the advertisement may be determined. The start and stop of the advertisement may be determined according to for example, characteristic lengths of advertisements in the TV Distribution Medium and Call Sign, when a scene change occurred in Samples 385 preceding the current Sample 385, when a blank or black frame occurred in Samples 385 preceding the current Sample 385, when a change in volume occurred relative to Samples 385 preceding the current Sample 385, relative to the passage of time as may have been evaluated at block 1155, relative to other advertisements as may have been evaluated at block 1165, the length of other instances of known and unknown content in which the Sample 385 occurs, and according to other criteria, including those evaluated in New Ad Identifier 1100.

At block 655 the Samples 385, such as the present Sample 385, and/or a hash, fingerprint, or representation for the advertisement may also be stored or may be labeled to be stored after all Samples 385 in the advertisement have been processed.

At block 660, the advertiser in the advertisement may be identified, such as through identification of products, logos, trademarks, text, images, and the like which are associated with a known advertiser. The identified advertiser may be stored in, for example, an Advertiser 390 record.

At block 665, the advertisement may be assigned an iSpot Ad ID 320 and, at block 670, which may follow block 645 if affirmative at block 645, data regarding the occurrence of the advertisement may be recorded, such as in or in association with iSpot Ad ID 320, which data may comprise information such as a timestamp or timestamps for the advertisement (such as timestamps for different time zones), the iSpot Ad ID and the Show ID in which the advertisement occurred, the Pod number, commercial break number, or Ad Slot within the show (which may be recorded as Pod 355 and/or as Ad Slot 395), the market in which the ad was shown (such as a DMA 365), the Operator 160 and TV Distribution Media 180 of the show and advertisement, a confidence score which may have been generated in block 1100 to determine whether the Sample 385 is an advertisement or which may have been used in block 645 to determine that the Sample 385 was a match with an existing iSpot Ad ID 320, the type of advertisement or the Ad Slot in which the advertisement appeared (as may be determined by, for example, Ad Insertion Type Determiner 1000), the estimated spending by the Advertiser 390 on the advertisement ("Estimated Spend"), a hash or representation of the Sample and/or of an Advertisement Variation 387 and/or a Reference Advertisement 398 prepared and/or identified in relation to the Sample (such as at block 1500), and the like. The Estimated Spend may be determined according to, for example, a process such as that outlined in U.S. application Ser. No. 14/276,920, filed May 13, 2014.

At block 675, which may follow block 1100 if 1100 is not affirmative, the Sample 385 may be identified as not being an advertisement and may be identified as a sample of a TV show, such as of Show ID 350 record of block 630 or otherwise according to Program Schedule 345, Call Sign 340 and the then-current time. If not already performed, Show ID 350 may be assigned to the Sample 385 and the Sample 385 may be stored and/or hashed or fingerprinted and stored (which may be referred to herein as a "representation"). Information regarding the Sample 385 may also be stored, such as the time from the start of the show, a name of the show, the market (such as a DMA), the Operator, to TV Distribution Media, and the like.

Following recordation of data regarding the advertisement or following block 675, Ad Harvester 600 may return to iterate over the next Sample 385, Show, Call Sign, and TV Distribution Medium.

At block 1500, Ad Harvester 600 may execute Reference Ad and Variation Module 1500 to identify a reference advertisement corresponding to iSpot Ad ID 320 and to generate variations of reference advertisements. A reference advertisement may be understood as a canonical or typical form of an advertisement associated with a particular iSpot Ad ID 320. The identified reference advertisement may be stored as, for example, one or more Reference Advertisement 398 record(s). Reference Ad and Variation Module 1500 may also create variations of an advertisement, such as different encodings, different resolutions, different aspect ratios and the like. Advertisement variations may follow the format of variations used by operators and TV networks. Advertisement variations may be stored as, for example, one or more Advertisement Variation 387 records. Advertisement Variation 387 may be fingerprint and included in "representations" or Sample 385 of advertisements, for comparison relative to samples from Smart TVs.

At block 699, Ad Harvester 600 may conclude or return to a process which spawned Ad Harvester 600.

Figure 7:
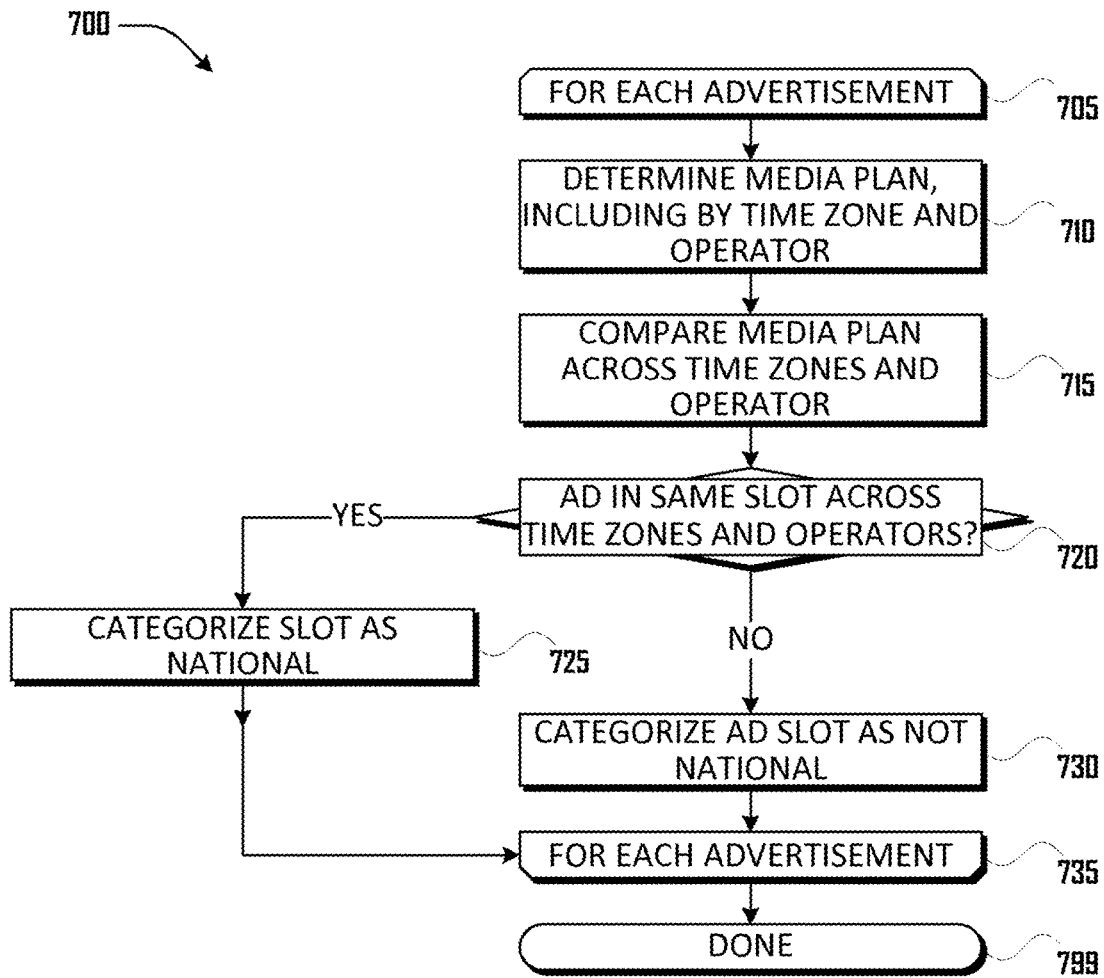
FIG. 7 is a flowchart illustrating an exemplary embodiment and/or algorithmic structure of a Media Plan Determiner routine.

FIG. 7 is a flowchart illustrating an exemplary embodiment of a Media Plan Determiner 700 routine. Media Plan Determiner 700 may be executed by, for example, iSpot Server 200. Media Plan Determiner 700 may be executed to determine the media plan for an advertisement. A media plan for an advertisement is a record of which shows an advertisement appeared in, on what days and at what times, in what Pods and Ad Slots, on what TV Distribution Media, in what markets, and the like. Advertisements are often placed by marketing companies with only general guidance from the underlying advertiser; multiple parties may be involved in selecting which advertisements appear when and where. As a result, the media plan for advertisements is seldom known in advance and precise media plans developed after the fact—prior to the disclosure herein—may be expensive to compile and may be based on sampling and extrapolations, which can be prone to error.

Block 705 to 735 iterate for each advertisement assigned an iSpot Ad ID 320 and with respect to which ad occurrence data was recorded, such as in block 670 of Ad Harvester 600.

At block 710, the ad occurrence data, such as of block 670 of Ad Harvester 600, and the show information, such as of block 675 of Ad Harvester, may be compiled or tabulated to determine a media plan for then then-current iSpot Ad ID 320. The media plan may be stored as, for example, Media Plan 315. A sample Media Plan 315 may contain columns such as, for example, Brand, Brand ID, Ad Title, iSpot Ad ID, Call Sign, Show Name, Show Episode, Show Type, Show Genre, Show Sub Genre, New Episode, Air Time Pacific/Central/Mountain/Eastern, Day of Week, Day Part, Pod and/or Slot Identifier, Airing Type (national, national satellite, regional, etc.), Market (DMA), Platform (TV Distribution Media), Operator, Duration, Parent iSpot Ad ID, Sample Hash ID, Industry, Sub Industry, Product Categories, Products, Estimated Spend, and the like.

At block 715, the Media Plan 315 across time zones and across Operators 160 may be compared. This may be by comparison of Media Plans 315 specific to each or within one Media Plan 315 which spans time zones and Operators 160.

At block 720, a determination may be made regarding whether for the same show, such as by Show ID 350, whether the same iSpot Ad ID 320 appears in the same Ad Slot 395 within Show ID 350. If affirmative at block 720, then Ad Slot 395 for Show ID 350 may be categorized as a "national" Ad Slot 395 and the iSpot Ad ID 320 may be categorized as a "national" ad. National Ad Slots are Ad Slots which are controlled by a party with national reach, such as TV Network 185, and national Advertisements are advertisements which are placed in national Ad Slots.

If negative at block 720, then at block 730 Ad Slot 395 for Show ID 350 may be categorized as a "not national" Ad Slot or as a "regional/local/dynamic" Ad Slot. Regional Ad Slots are Ad Slots which are sold or allocated to regional operators or advertising agencies to fill. Regional Ad Slots may be further categorized as "local" Ad Slots if different advertisements are found in the same Ad Slot within a region. Dynamic Ad Slots are regional or local Ad Slots which are filled dynamically by, for example, Operator 160 or an affiliate, and may be dynamically addressed to individual households or areas.

At block 735 Media Plan Determiner 700 may return to iterate over the next iSpot Ad ID 320.

At block 799, Media Plan Determiner 700 may conclude or return to a process which spawned Media Plan Determiner 700.

Figure 8:
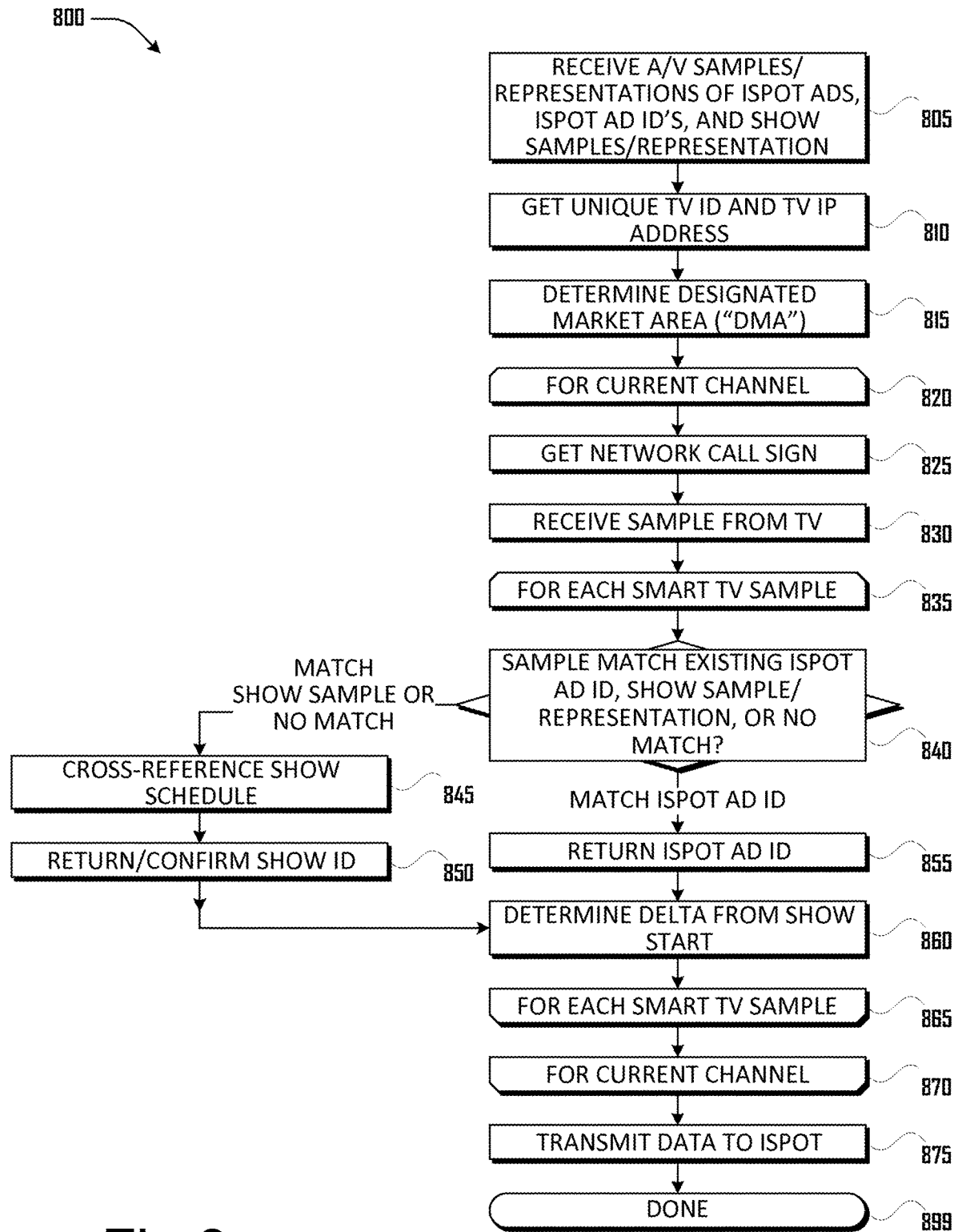
FIG. 8 is a flowchart illustrating an exemplary embodiment and/or algorithmic structure of a Viewing Data Collector routine.

FIG. 8 is a flowchart illustrating an exemplary embodiment of a Viewing Data Collector 800 routine. Viewing Data Collector 800 may be executed by, for example, Smart TV 400. Viewing Data Collector 800 may be loaded in Smart TV 400 by, for example, a manufacturer or distributor of Smart TV 400 or by a party otherwise entitled to install software on Smart TV 400.

At block 805, Viewing Data Collector 800 may receive audio and/or video samples or hashes or fingerprints or another representation of advertisements which have been assigned an iSpot Ad ID 320, the corresponding iSpot Ad IDs 320, samples, hashes, or fingerprints or another representation of shows, and corresponding Show IDs 350. The audio and/or video samples, hashes, fingerprints, or representation of both advertisements and shows may be stored in Smart TV Datastore 500 as iSpot Sample 505; iSpot Ad IDs 320 may be stored in Smart TV Datastore 500 as iSpot Ad IDs 510; Show IDs 350 may be stored in Smart TV Datastore 500 as Show IDs 515. The samples may be or comprise hashes or fingerprints of samples, which may be referred to herein as "representations".

At block 810, Viewing Data Collector 800 may obtain a unique TV identifier of the Smart TV 400, such as a MAC address or the like, and an IP Address utilized by the Smart TV 400. This data may be saved in or in association with, for example, a Smart TV Data 520 record.

At block 815, Viewing Data Collector 800 may obtain the Designated Market Area ("DMA") in which the Smart TV 400 is present. This may be obtained from a third party, such as $3^{rd}$ party Computer 150, who may map the IP address of Smart TV 400 to a DMA and may provide this information to Viewing Data Collector 800, such as in response to a request for the same made by Viewing Data Collector 800.

Blocks 820 to 870 may iterate for the then-current channel or Call Sign being received and rendered by Smart TV 400.

At block 825, Viewing Data Collector 800 may obtain the Call Sign of the TV Network 185 of the then-current channel. This may be obtained from the transmission over TV Distribution Media 180.

At block 830 a sample of content rendered by Smart TV 400 may be obtained from Smart TV 400 by Viewing Data Collector 800. The sample may be, for example, 1 frame-per-second of video. This sample, hash, fingerprint, or representation thereof may be saved as, for example, Smart TV Sample 530.

Blocks 835 to 865 may iterate for each Smart TV Sample 530.

At block 840, a determination may be made regarding whether Smart TV Sample 530 matches an existing iSpot Ad ID, a Show ID 515, or whether no match is obtained. This determination may involve a comparison of Smart TV Sample 530 to iSpot Sample 505, which iSpot Samples may be associated with a corresponding iSpot Ad IDs 510 and Show IDs 515. The comparison may be made by, for example, an Automated Content Recognition ("ACR") algorithm executed by Smart TV 400 or by Viewing Data Collector 800, which ACR system (or the like) may use the Smart TV Sample 530 as a reference.

If at block 840 the match was to a Show ID 515 or if there was no match, then at block 845, the matched Show ID 515 may be cross-referenced with Show Schedule 525 to confirm the match or to identify Show ID 515 if no match was determined. Show Schedule 525 may be obtained from a transmission over TV Distribution Media 180 and/or may obtained from or provided by $3^{rd}$ Party Computer 150 or another party as a service. At block 850, the Show ID 515 may be returned.

If at block 840 the match was to an iSpot Ad ID 510, then at block 855 the matching iSpot Ad ID 510 may be returned.

At block 860, the amount of time since the start of the show may be determined, such as relative to Show Schedule 525.

At block 865, Viewing Data Collector 800 may return to iterate over the next Smart TV Sample 530, if any.

At block 870, Viewing Data Collector 800 may return to block 820 iterate over the next channel, if any.

At block 875, the information collected by Viewing Data Collector 800 may be transmitted to iSpot Server 200 as, for example, Smart TV Data 520 records, Show ID 515 records, and iSpot Ad ID 510 records. This information may further identify which iSpot Samples 505 were found, as well as a confidence score relating to block 840 to 860.

At block 899, Viewing Data Collector 800 may conclude or return to a process which spawned Viewing Data Collector 800.

Figure 9:
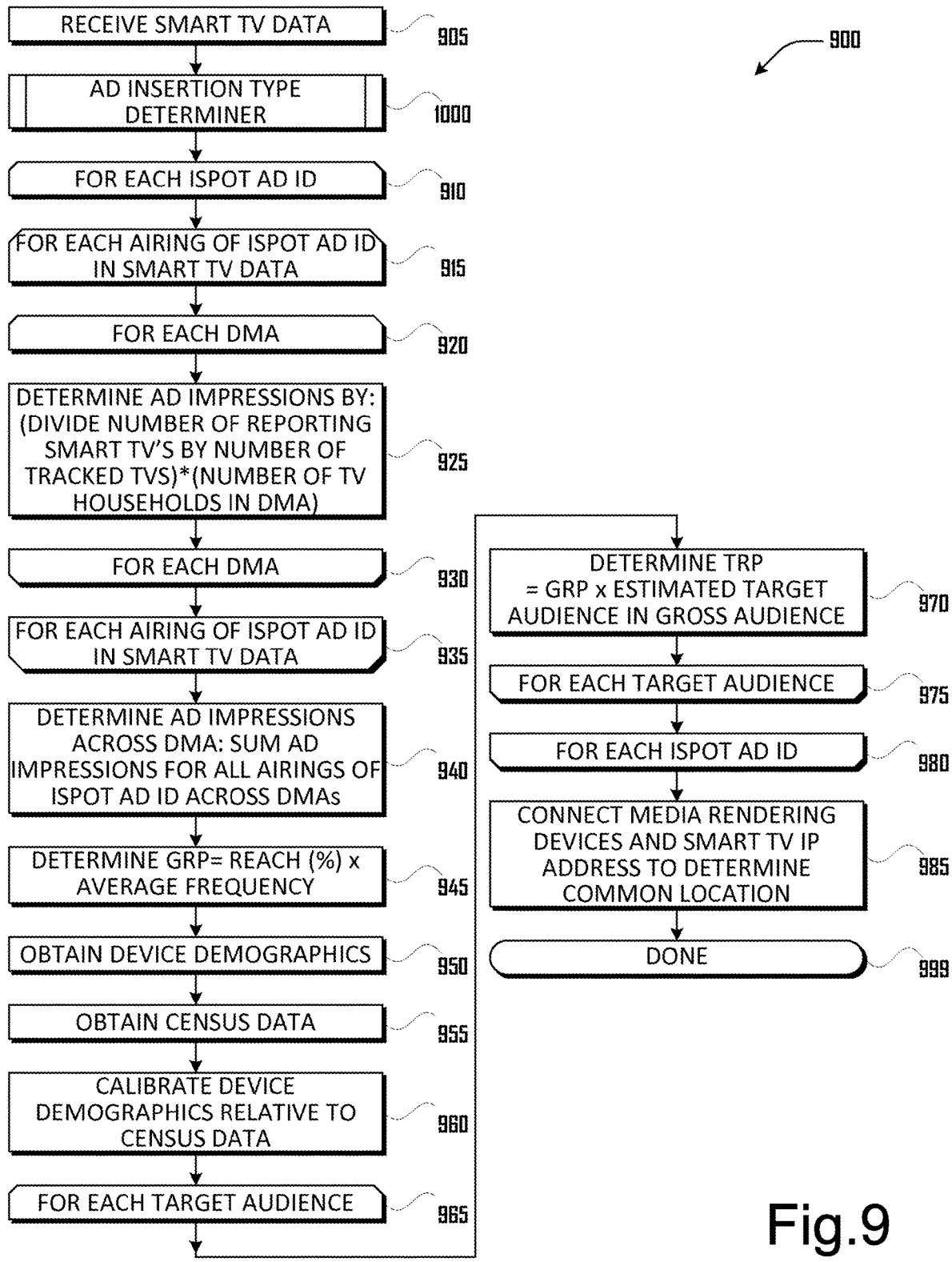
FIG. 9 is a flowchart illustrating an exemplary embodiment and/or algorithmic structure of a Smart TV Data Collector routine.

FIG. 9 is a flowchart illustrating an exemplary embodiment of a Smart TV Data Collector 900 routine. Smart TV Data Collector 900 may be executed by, for example, iSpot Server 200.

At block 905, Smart TV Data Collector 900 may receive Smart TV Data 520, such as from Smart TV 400 and Viewing Data Collector 800.

At block 1000, Smart TV Data Collector 900 may execute Ad Insertion Type Determiner 1000, though Ad Insertion Type Determiner 1000 may be executed as an independent process, not as a subroutine. Ad Insertion Type Determiner 1000 is discussed in relation to FIGS. 10A and 10B.

Blocks 910 to 980 iterate for each iSpot Ad ID in the Smart TV Data 520 of block 905. Blocks 915 to 935 iterate for each airing of iSpot AD ID in the Smart TV Data 520 of block 905. Blocks 920 to 930 iterate for each DMA in which occurred airings of iSpot AD ID.

At block 925, the number of impressions for each iSpot Ad ID 510 in or associated with the Smart TV Data 520 in the DMA may be determined by dividing the number of reporting Smart TVs 400 in the Smart TV Data 520 of block 905 by the number of tracked TVs (which may be either i) Smart TVs 400 which could potentially report or ii) all TVs) and multiplying the product of the foregoing by the number of television households in the DMA.

Block 930 may return to block 920 to iterate over the next DMA. Block 935 may return to block 915 to iterate over the next airing of iSpot Ad ID in Smart TV Data.

At block 940, Smart TV Data Collector 900 may determine the total advertisement impressions across geo-political units by summing, for example, the ad impressions by DMA determined in block 925. This will determine the advertisement impressions for "national" advertisements (those placed in national Ad Slots 395) as well as "regional" advertisements (advertisements placed in regional Ad Slots 395—the national/regional categorization having been made by, for example, Media Plan Determiner 700).

At block 945, the Gross Rating Points ("GRP") may determined as the reach of an iSpot Ad ID (expressed as a percentage of the total population) multiplied by the frequency or average frequency of the occurrence of the advertisement associated with the iSport Ad ID. The GRP may be saved as, for example, GRP 330 records.

At block 950, Smart TV Data Collector 900 may obtain demographics for the Smart TVs 400 providing data at block 905. At block 955, Smart TV Data Collector 900 may obtain census data relative to the population possessing Smart TVs 400 which provided data at block 905.

At block 960, Smart TV Data Collector 900 may calibrate the device demographics of block 950 relative to the census data of block 955.

Blocks 965 to 975 iterate for each target audience in the total population, such as an age range, a geographic area, a gender, and the like, in the total population.

At block 970, Smart TV Data Collector 900 may determine the Target Rating Points ("TRP") by multiplying the GRP of block 935 by the estimated percentage of the target audience in the gross audience (or total population). The TRP may be saved as, for example, TRP 335 records.

Block 975 may return to block 965 to iterate over the next target audience, if any.

Block 980 may return to block 910 to iterate over the next iSpot Ad ID.

At block 985, Smart TV Data Collector 900 may connect Media Rendering Devices 120 to Smart TVs 400, such as according to IP Address or other information, to determine Media Rendering Devices 120 and Smart TVs 400 which occupy a common location, so that data from one can be ascribed to the other.

At block 999, Smart TV Data Collector 900 may conclude or return to a process which spawned it.

Figure 10A:
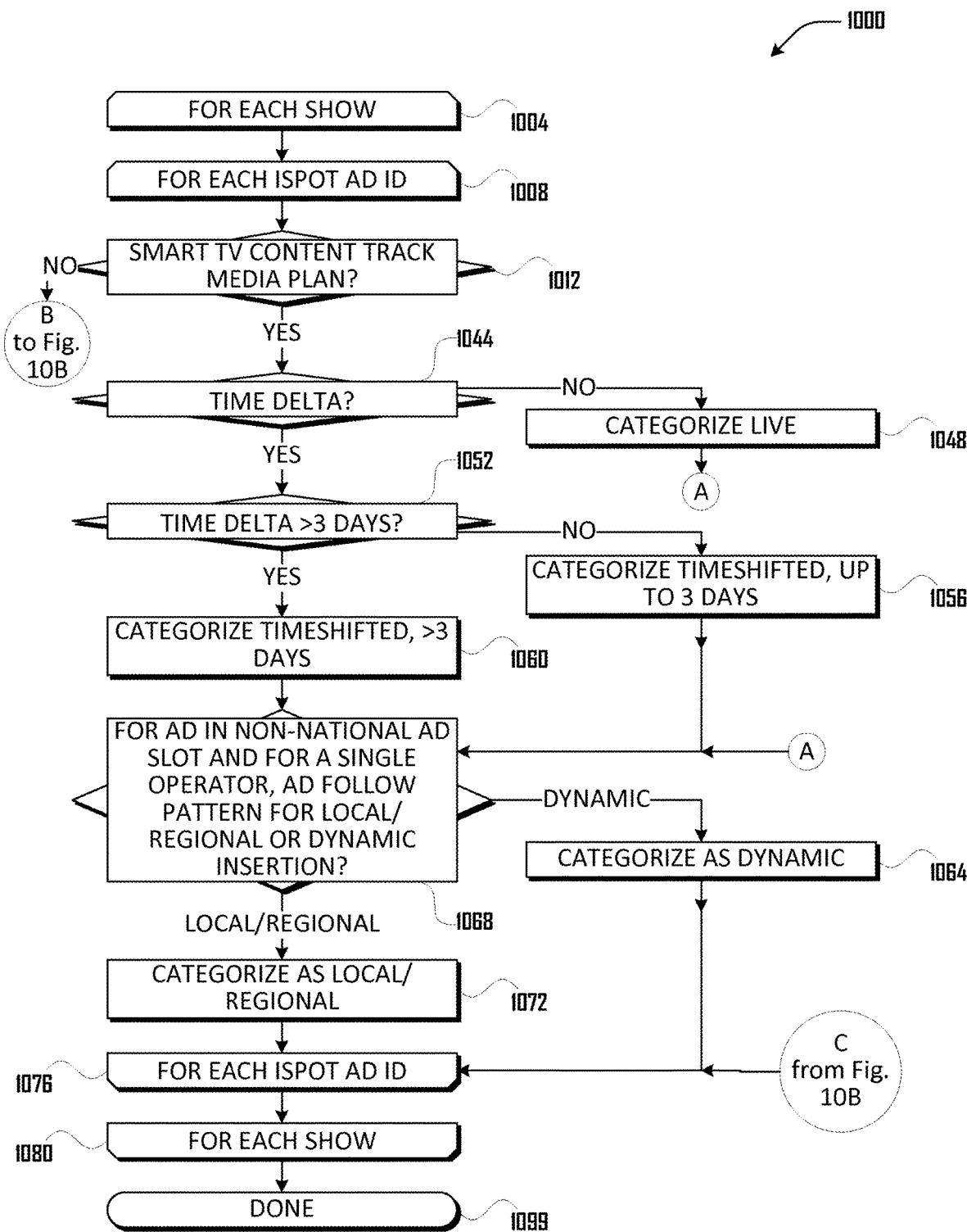
FIG. 10A is a flowchart illustrating an exemplary embodiment and/or algorithmic structure of a first portion of an Ad Insertion Type Determiner routine
Figure 10B:
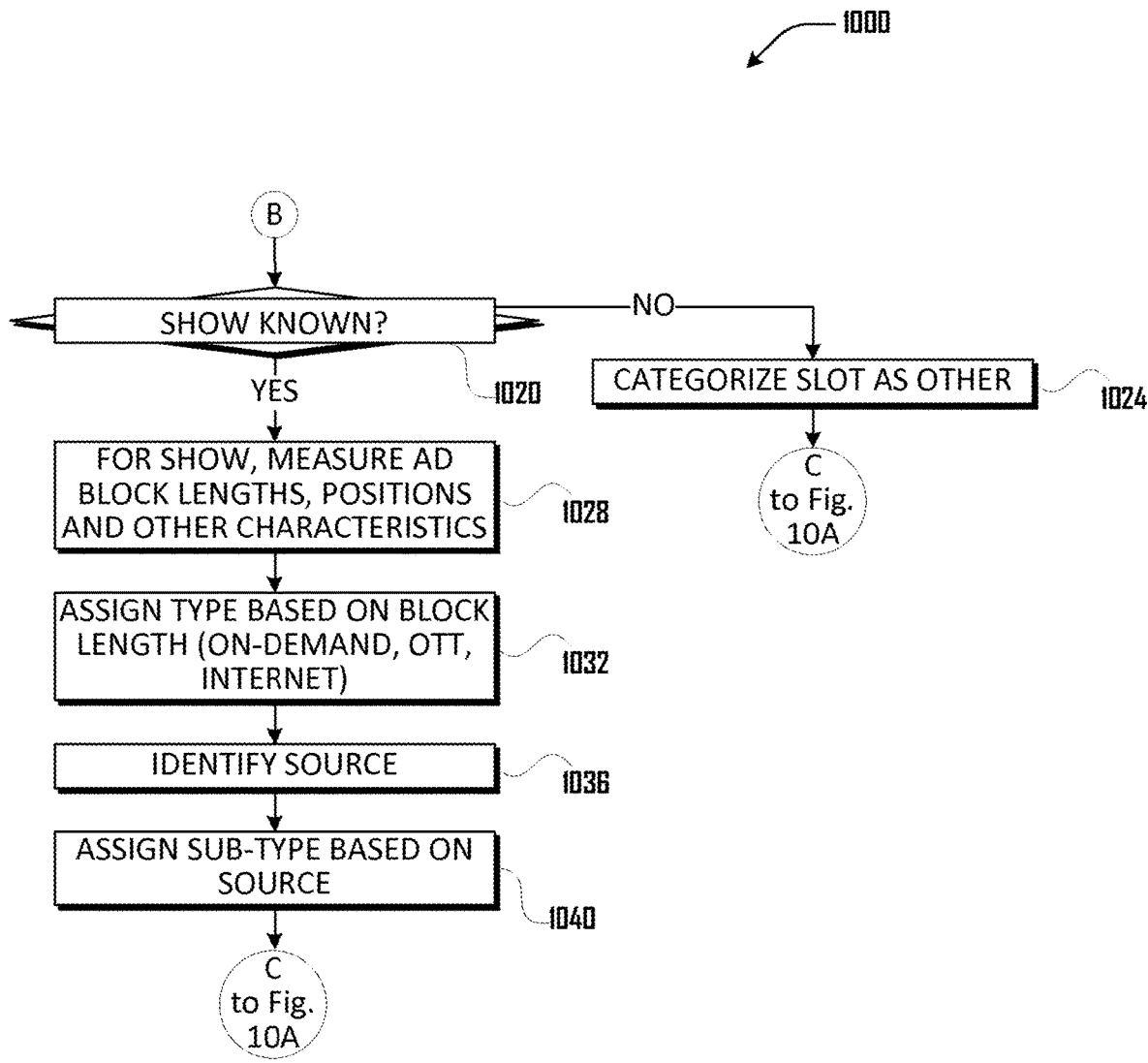
FIG. 10B is a flowchart illustrating an exemplary embodiment and/or algorithmic structure of a second portion of an Ad Insertion Type Determiner routine.

FIGS. 10A and 10B are a flowchart illustrating an exemplary embodiment of an Ad Insertion Type Determiner 1000 routine. Ad Insertion Type Determiner 1000 may be executed by iSpot Server 200 within Smart TV Data Collector 900 as a subroutine or as an independent process. Ad Insertion Type Determiner 1000 determines a type of advertisement insertion for advertisements which have been given an iSpot Ad ID 320, relative to the advertisement and/or an Ad Slot into which an advertisement may be inserted.

Blocks 1004 to 1080 iterate for each show, such as by Show ID 350, in the Smart TV Data 380 received at, for example, block 905 in Smart TV Data Collector 900. Blocks 1008 to 1076 iterate for each iSpot Ad ID received at, for example, block 905 in Smart TV Data Collector 900.

At block 1012, a determination may be made regarding whether the Smart TV content and the then-current iSpot Ad ID tracks the Media Plan 315 determined by Media Plan Determiner 700.

If affirmative at block 1012, then at block 1044, a determination may be made regarding whether there is a time difference between the Smart TV content and the Media Plan 315, such as according to a timestamp. If negative at block 1044, then at block 1048 the iSpot Ad ID in the Show may be categorized as "live", meaning that it was rendered by the reporting Smart TV 400 in real time. If affirmative at block 1044, then at block 1052 a determination may be made regarding whether the time difference is greater than three days. If negative at block 1052, then at block 1056, the iSpot Ad ID in the Show may be categorized as "timeshifted, up to three days." If affirmative at block 1052, then at block 1060, then iSpot Ad ID in Show may be categorized as "timeshifted, greater than three days."

At block 1068, a determination may be made, for advertisements in a non-national Ad Slot and for a single Operator, regarding whether or not the advertisement insertion follows a pattern for local, regional, or dynamic advertisement insertion. For example, a single Operator may show the same advertisement across a region, such as across an MTA (in which case the advertisement and/or Ad Slot may be categorized as "regional"), or may show different advertisements within a region (in which case the advertisement and/or Ad Slot may be categorized as "local"), or may show different advertisements to many different viewers without regard to geographic proximity (in which case the advertisement and/or Ad Slot may be categorized as "dynamic"). Depending on the determination at block 1068, the advertisement and/or Ad Slot and/or advertisement insertion type may be categorized as "locally" or "regionally inserted", such as at block 1072, or the advertisement and/or Ad Slot may be categorized as "dynamically inserted", such as at block 1064.

If negative at block 1012, then, in FIG. 10B at block 1020 a determination may be made regarding whether the Show in which the Ad ID occurred is known. If negative at block 1020, then at block 1024, the Ad Slot in which the iSpot Ad ID occurred may be categorized as "other".

If affirmative at block 1020, then at block 1028, for the Show in which the iSpot Ad ID occurred, the lengths of blocks of advertisements in the Show, the position of advertisements in the Show, and other characteristics may be measured. Different TV Distribution Media may have different lengths of blocks of advertisements in Shows, positions of advertisements in Shows, and other characteristics. At block 1032, the TV Distribution Media of the Show and Advertisement may be assigned as a type, such as on-demand, OTT, or Internet. At block 1036, the source may be identified, such as according to information in the Smart TV Data received, for example, at block 905. The source may a subset of or a particular provider within the type identified at block 1032, such as an Operator (such as Comcast, Timewarner, DirecTV, and the like) or an OTT provider (such as Amazon, Hulu, Netflix, and the like), or an Internet provider (such as YouTube). At block 1040, the source identified at block 1036 may be assigned as a sub-type. At circle "C", FIG. 10B may return to block 1076.

At block 1076, Ad Insertion Type Determiner 1000 may return to block 1008 to iterate over the next iSpot Ad ID. At block 1080, Ad Insertion Type Determiner 1000 may return to block 1004 to iterate over the next Show.

At block 1099, Ad Insertion Type Determiner 1000 may conclude or may return to a process which spawned it.

Figure 11A:
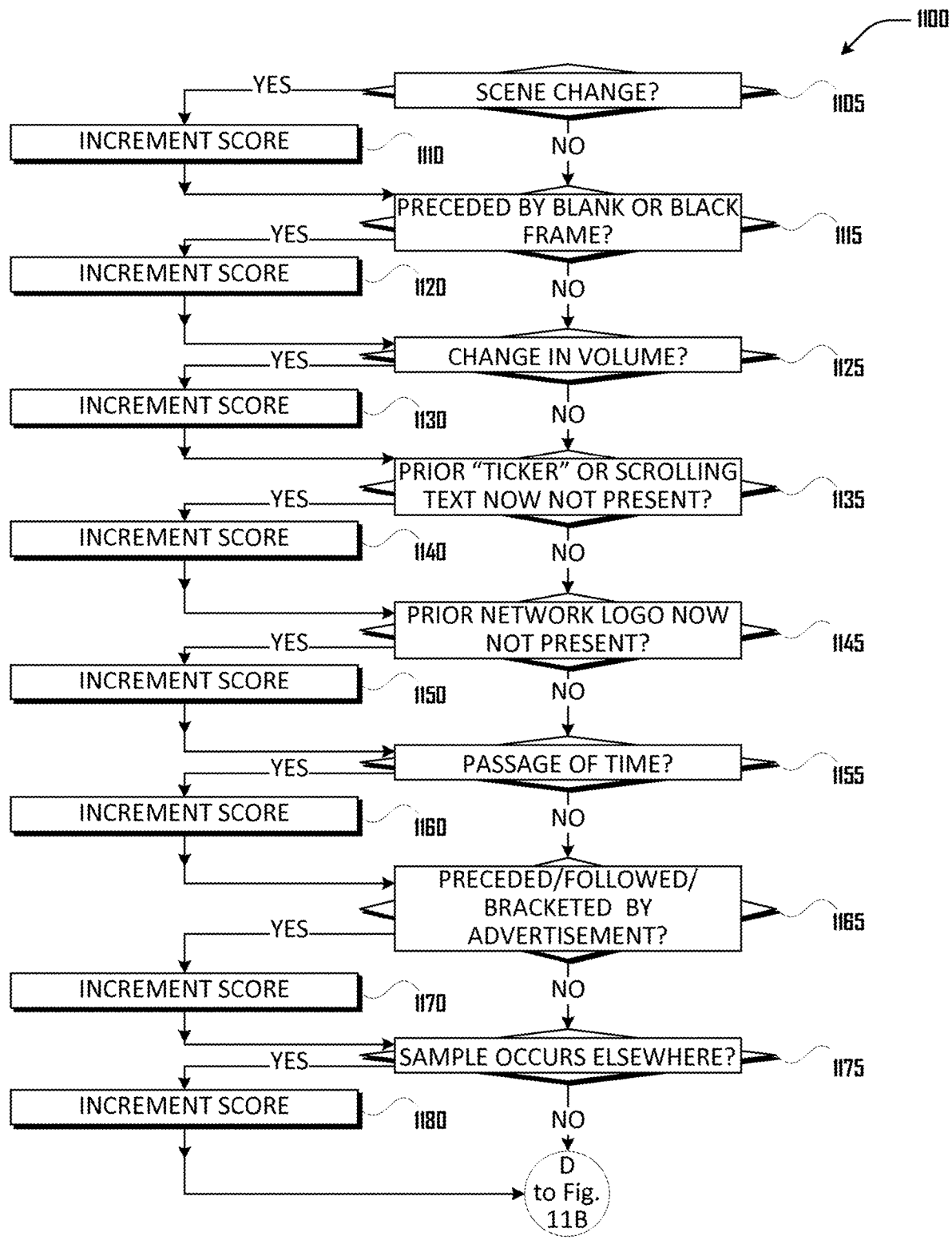
FIG. 11A is a flowchart illustrating an exemplary embodiment and/or algorithmic structure of a first portion of a New Ad Identifier routine.
Figure 11B:
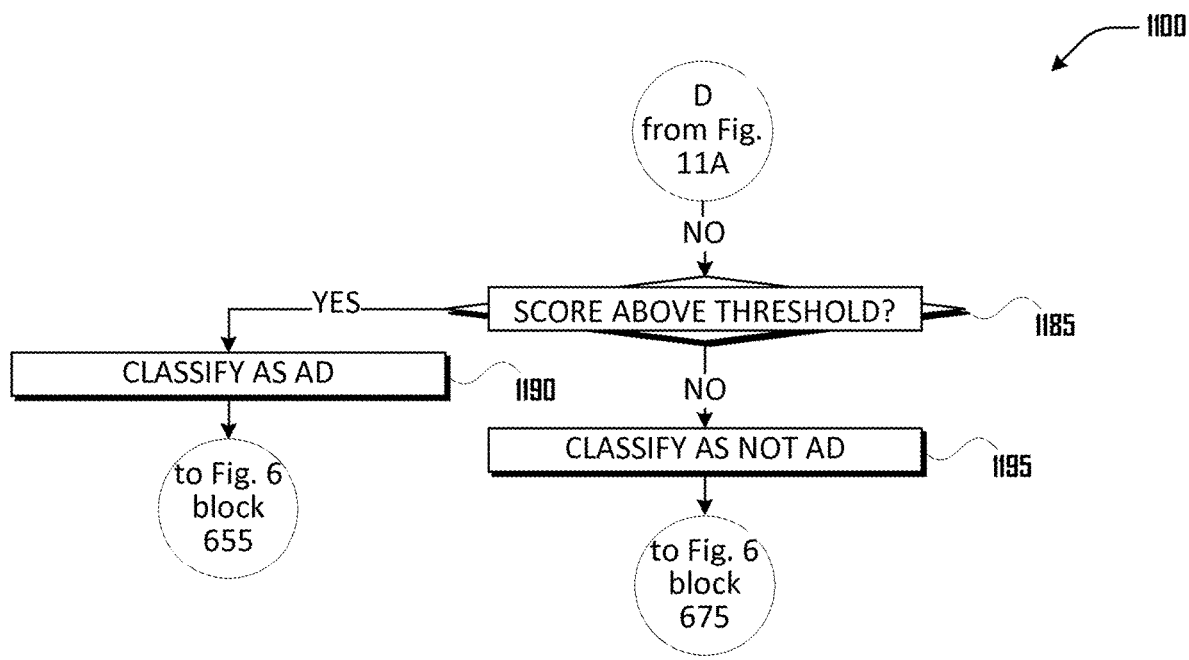
FIG. 11B is a flowchart illustrating an exemplary embodiment and/or algorithmic structure of a second portion of a New Ad Identifier routine.

FIG. 11 is a flowchart illustrating an exemplary embodiment of a New Ad Identifier 1100 routine. New Ad Identifier 1100 determines whether a Sample 385 which does not match an existing iSpot Ad ID 320 is an advertisement. New Ad Identifier 1100 may apply criteria for making this determination. New Ad Identifier 1100 may utilize a scoring system which applies a score (or scores) to various criteria and may then determine that Sample 385 is an advertisement if the total score is above a threshold; equivalent systems for evaluating a list of criteria may be utilized. A list of examples of criteria for being an advertisement are listed in FIGS. 11A and 11B. A different set of criteria may be utilized and the criteria may be utilized in a different order. Evaluation of the criteria may be terminated upon the occurrence of an event or a dispositive criteria.

For example, at block 1105 a determination may be made regarding whether the Sample 385 represents a scene change relative to a chronologically preceding Sample 385. The scene change evaluation may be based on a change in the video data. This evaluation may be performed by evaluating encoding of frames. For example, a Sample 385 which uses a preceding frame as a reference for motion-vector based compression may not be considered a scene change. This evaluation may also utilize a histogram of pixels in Sample 385 and a preceding Sample 385. An "earth mover distance" or other similar algorithm may also be utilized. If affirmative, then at block 1110, the advertisement score for Sample 385 may be incremented.

For example, at block 1115 a determination may be made regarding whether Sample 385 is preceded by a blank or black frame. If affirmative, then at block 1120, the advertisement score for Sample 385 may be incremented.

For example, at block 1125 a determination may be made regarding whether there is a change of volume in the Sample 385 relative to a preceded Sample. If affirmative, then at block 1130, the advertisement score for Sample 385 may be incremented.

For example, at block 1135 a determination may be made regarding whether a "ticker" or scrolling text in a preceding Sample 385 is not present in the then-current Sample 385. If affirmative, then at block 1140, the advertisement score for Sample 385 may be incremented.

For example, at block 1145 a determination may be made regarding whether a "ticker" or scrolling text in a preceding Sample 385 is not present in the then-current Sample 385. If affirmative, then at block 1140, the advertisement score for Sample 385 may be incremented.

For example, at block 1155 a determination may be made regarding whether an amount of time has elapsed during the current Show, since the start of the current Show, or since the last advertisement in the current Show, which amount of time is associated with an advertisement. If affirmative, then at block 1160, the advertisement score for Sample 385 may be incremented.

For example, at block 1165 a determination may be made regarding whether the current Sample 385, or a time range of Samples around current Sample 385, is preceded, followed by, or bracketed by (on both sides) by a Sample which matches an existing iSpot Ad ID 320. If affirmative, then at block 1170, the advertisement score for Sample 385 may be incremented.

For example, at block 1175 a determination may be made regarding whether the current Sample 385 occurs elsewhere, such as in other broadcasts by other Call Signs 340 or on other Channels 310, or on other Networks 305. If affirmative, then at block 1180, the advertisement score for Sample 385 may be incremented.

At block 1185 a determination may be made regarding whether the total score for the current Sample 385 is above a threshold. If it is, then at block 1190 the current Sample 385 may be classified as an advertisement and New Ad Identifier 1100 routine may, for example, return to block 655 of FIG. 6. If it is not, then at block 1195 the current Sample 385 may be classified as other than an advertisement and New Ad Identifier 1100 routine may, for example, return to block 675 of FIG. 6. New Ad Identifier 1100 routine may also provide that scores close to but not over the threshold may be evaluated by a human.

Figure 12:
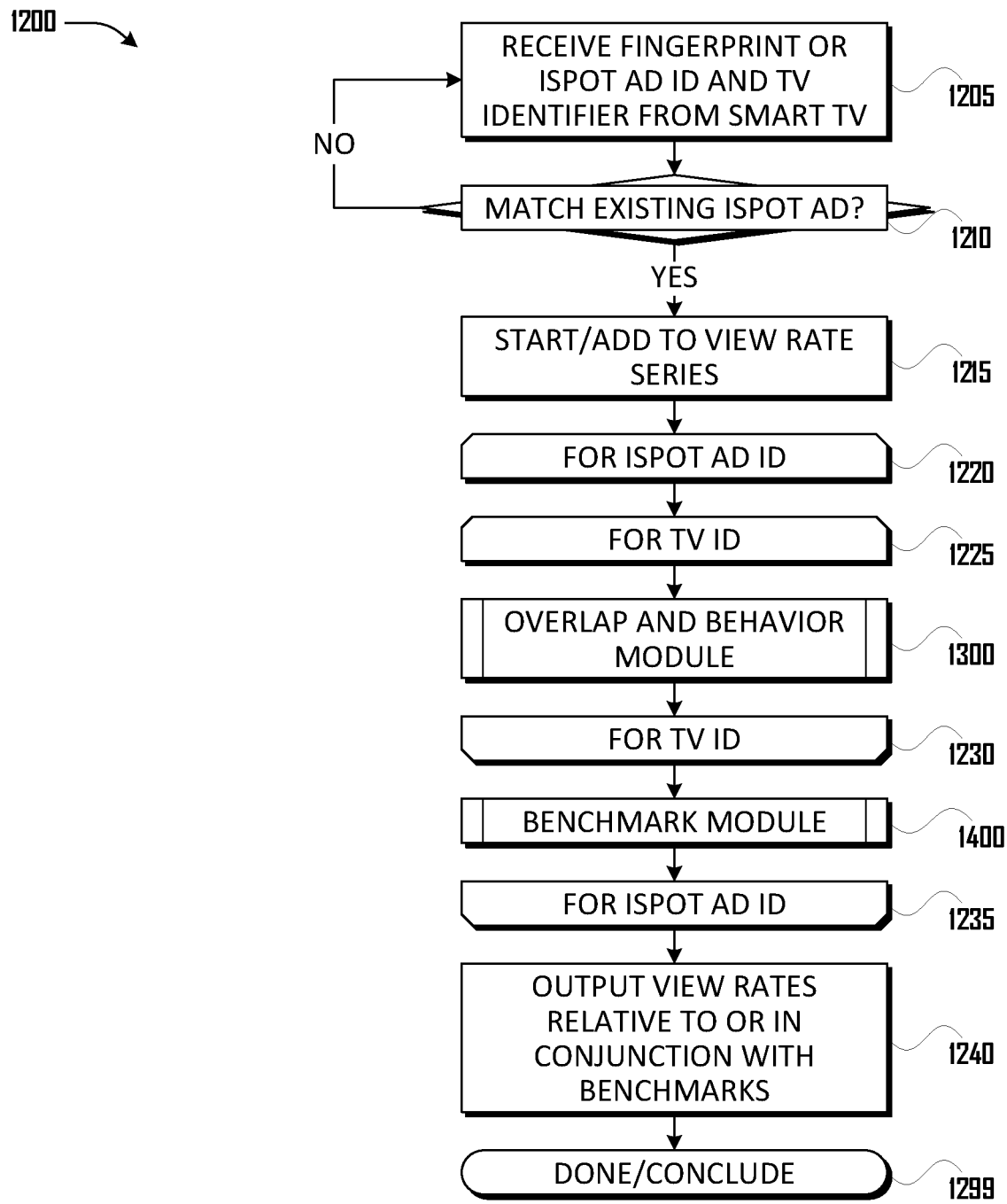
FIG. 12 is a flowchart illustrating an exemplary embodiment and/or algorithmic structure of a View Rate module.

FIG. 12 is a flowchart illustrating an exemplary embodiment and/or algorithmic structure of a View Rate Module 1200. View Rate Module 1200 receives a fingerprint or iSpot Ad ID 320 and a Unique TV ID 325, matches it to an iSpot Ad ID 320, and adds it to a View Rate determining series for all such data. The series is indexed or organized by iSpot Ad ID 320 and Unique TV ID 325. Overlap and Behavior Module 1300 may be executed to determine View Rate 396 for the Unique TV ID 325 and iSpot Ad ID 320, as well as the advertisement type and behavior of a user of the television with Unique TV ID 325. Benchmark Module 1400 may be executed to determine current View Rate benchmarks relative to extrinsic standards, such as average view rate for all advertisements, all ads by broadcaster and daypart, by network, and locale.

At block 1205, View Rate Module 1200 receives a fingerprint or iSpot Ad ID 320 and Unique TV ID 325 from a Smart TV.

At decision block 1210, View Rate Module 1200 determines whether fingerprint or iSpot Ad ID 320 matches an existing iSpot Ad ID 320. If negative or equivalent, View Rate Module 1200 may return to block 1205. If affirmative or equivalent, View Rate Module 1200 may add iSpot Ad ID 320 to a series of records in a datastructure. The datastructure may be organized and/or indexed by iSpot Ad ID 320 and Unique TV ID 325. The datastructure may be stored as, for example, one or more View Rate Series 399 records.

Opening loop block 1220 to closing loop block 1235 may iterate over all iSpot Ad ID 320 in View Rate Series 399. Opening loop block 1225 to closing loop block 1230 may iterate over all Unique TV ID 325 in View Rate Series 399. Together, this allows determination of View Rate for specific advertisements, by specific televisions, to be determined.

At block 1300, Overlap and Behavior Module 1300 may be executed to determine View Rate 396 for the Unique TV ID 325 and iSpot Ad ID 320, as well as the advertisement type and behavior of a user of the television with Unique TV ID 325.

At block 1400, Benchmark Module 1400 may be executed to determine current View Rate benchmarks relative to extrinsic standards, such as average view rate for all advertisements, all ads by broadcaster and daypart, by network, and locale, as well as standards intrinsic to an advertisement, such as an average View Rate 396 for an advertisement, including for dayparts, broadcast network, locale, and the like.

At block 1240, View Rate Module 1200 may output View Rate 396 values, including outputting View Rate 396 values relative and/or in conjunctions with Benchmark 397 values, such as by outputting such values in graphs and other graphical forms.

At block 1299, View Rate Module 1200 may conclude and/or return to a process, routine, or module which may have called it.

Figure 13A:
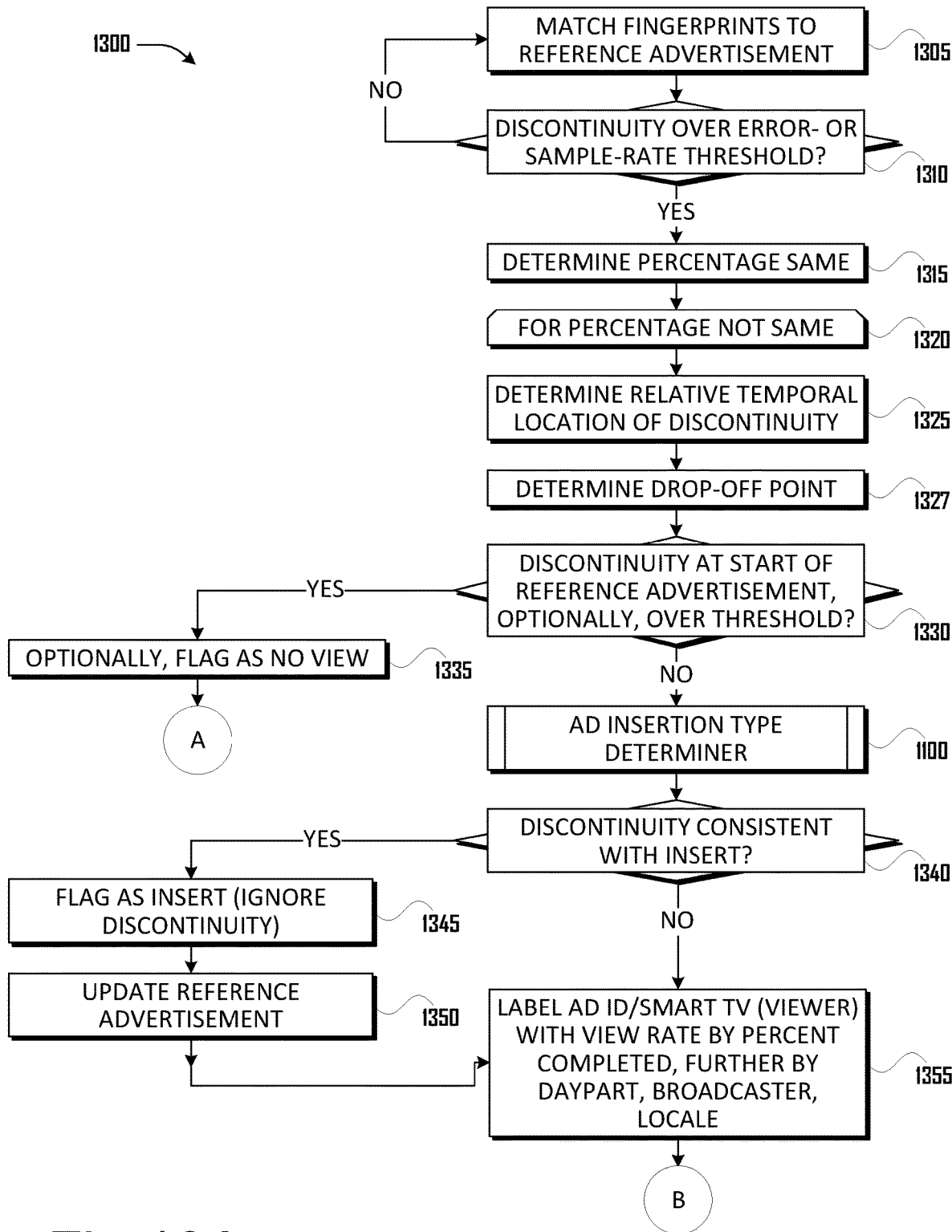
FIG. 13A is a flowchart illustrating an exemplary embodiment and/or algorithmic structure of a first portion of an Overlap and Behavior module.
Figure 13B:
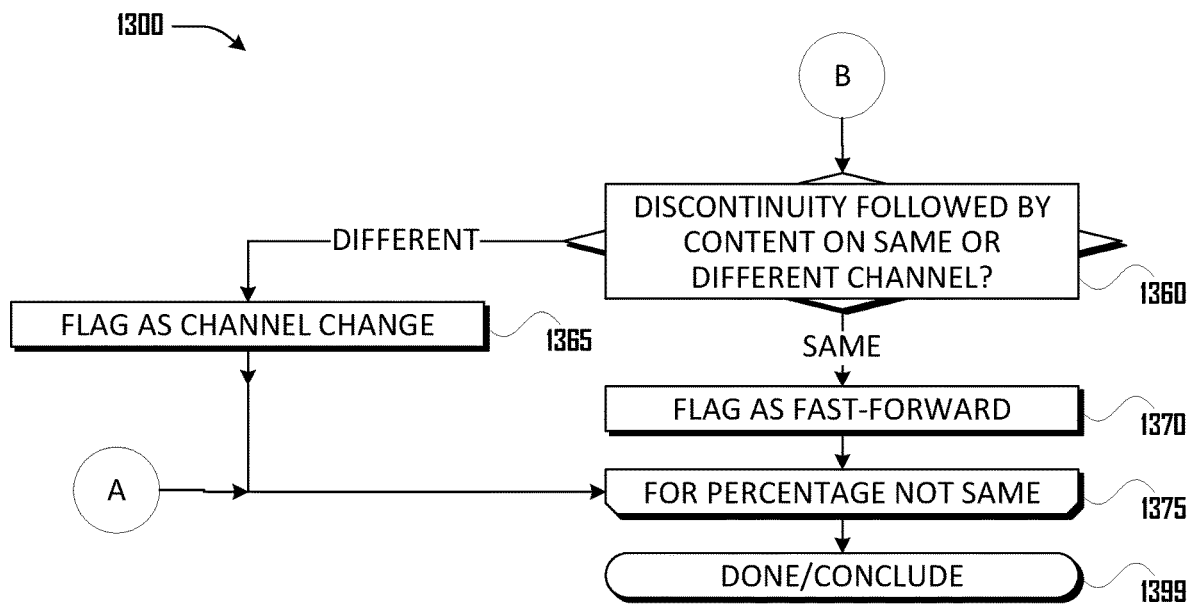
FIG. 13B is a flowchart illustrating an exemplary embodiment and/or algorithmic structure of a second portion of an Overlap and Behavior module.

FIG. 13A is a flowchart illustrating an exemplary embodiment and/or algorithmic structure of a first portion of an Overlap and Behavior Module 1300. FIG. 13B is a flowchart illustrating an exemplary embodiment and/or algorithmic structure of a second portion of an Overlap and Behavior Module 1300, continuing the flowchart of FIG. 13A. Overlap and Behavior Module 1300 may be executed by, for example iSpot Server 200. Overlap and Behavior Module 1300 iterates over View Rate Series 399 for an iSpot Ad ID 320 and for a Unique TV ID 325.

At block 1305, Overlap and Behavior Module 1300 may match a chronologically recorded set of fingerprints associated with iSpot Ad ID 320 and Unique TV ID 325 in View Rate Series 399 to Sample 385 records or another record associated with an iSpot Ad ID 320, which records may be stored and/or identified as one or more "Reference Advertisement 398" record. Reference Advertisement 398 may be understood as a canonical form of an advertisement associated with a particular iSpot Ad ID 320. This matching may be performed retrospectively, over a set of fingerprints which at least have the potential to match with Reference Advertisement 398 record, such as after View Rate Series 399 has aged, such as more than 3 minutes, 30 minutes, one hour, one day, or the like.

At decision block 1310, Overlap and Behavior Module 1300 may determine whether there is a discontinuity between Reference Advertisement 398 and fingerprints associated with iSpot Ad ID 320 and Unique TV ID 325 in View Rate Series 399. The determination may require that the discontinuity exceed a threshold, such as a threshold to address an error-rate or sample-rate in one or both of the fingerprints in View Rate Series 399 and/or in Reference Advertisement 398. The discontinuity may be, for example, a break, missing fingerprints, or a difference between fingerprints in View Rate Series 399 and Reference Advertisement 398.

At block 1315, Overlap and Behavior Module 1300 may determine the percentage which is the same or the percentage which is different between fingerprints associated with iSpot Ad ID 320 and Unique TV ID 325 in View Rate Series 399 and Reference Advertisement 398.

Opening loop block 1320 to closing loop block 1375 may iterate over the percentage which is not the same.

At block 1325, Overlap and Behavior Module 1300 may determine the relative temporal location of the discontinuity between fingerprints associated with iSpot Ad ID 320 and Unique TV ID 325 in View Rate Series 399 and Reference Advertisement 398. This temporal location may be identified as a percentage of the advertisement which was rendered. For example, the relative temporal location of the discontinuity may occur in a first, second, third, or fourth quartile of Reference Advertisement 398.

At block 1327, Overlap and Behavior Module 1300 may determine a drop-off point for the fingerprints associated with iSpot Ad ID 320 and Unique TV ID 325 in View Rate Series 399 relative to Reference Advertisement 398. A drop-off point comprises a time, relative to the start of rendering of the television advertisement, when rendering of the television advertisement (as shown by fingerprints associated with iSpot Ad ID 320 and Unique TV ID 325 in View Rate Series 399) is discontinued, before an end of the reference television advertisement. Drop-off point may be determined relative to broadcasters, dayparts, broadcaster and daypart, by locale, by locale and daypart, and the like.

Drop-off point results may be stored in, for example, one or more Drop-Off Point 388 records.

At decision block 1330, Overlap and Behavior Module 1300 may determine whether the discontinuity occurs at the start of Reference Advertisement 398. This may indicate that the viewer did not see the beginning of the advertisement. Certain advertisers and/or marketers may not want to "count" a view in View Rate 396 for an advertisement if the viewer did not see the beginning of the advertisement. If affirmative or equivalent at decision block 1330, then at block 1335, Overlap and Behavior Module 1300 may flag or otherwise label the fingerprints associated with iSpot Ad ID 320 and Unique TV ID 325 in View Rate Series 399 as being a "no view" or otherwise may not count such rendering in View Rate 396 for an advertisement. After block 1335, FIG. 13A may then continue at location "A" in FIG. 13B.

At block 1100, if not already performed, Overlap and Behavior Module 1300 may perform Ad Insertion Type Determiner 1000 to determine the insertion type for the overall advertisement, such as whether it is live, timeshifted, dynamic, local/regional, on-demand, OTT, internet.

At decision block 1340, Overlap and Behavior Module 1300 may determine whether the discontinuity between the fingerprints associated with iSpot Ad ID 320 and Unique TV ID 325 in View Rate Series 399 and Reference Advertisement 399 is consistent with an insert into Reference Advertisement 399. For example, certain advertisements allow regional or local insertion into the advertisements, such as a list of local car dealers or the like. Such insertions may come, for example, at the end or in another location in an advertisement and may be of a fixed duration, such as three, five or ten seconds. Consistency with an insert may be determined with respect to characteristics of inserts in Reference Advertisement 399 or may be determined with respect to characteristics of inserts, generally, such as that inserts often occur at the end of advertisements.

If affirmative or equivalent at decision block 1340, then at block 1345, Overlap and Behavior Module 1300 may flag the discontinuity as an insert into Reference Advertisement 399, in which case the discontinuity may be ignored. Ignoring the discontinuity may mean that the Reference Advertisement 399 is effectively treated as being shorter than it is, when viewed with the insert. At block 1350, Overlap and Behavior Module 1300 may update Reference Advertisement 399 or another record to indicate that it has been identified as having an insert.

At block 1355, Overlap and Behavior Module 1300 may label the fingerprints associated with iSpot Ad ID 320 and Unique TV ID 325 in View Rate Series 399 to be credited toward View Rate 396 for the iSpot Ad ID 320, according to percentage which is the same (or different) and, for example, according to the relative temporal location of the discontinuity determined at block 1325 (such as according to a first quartile, second quartile, third quartile, or fourth quartile) and the drop-off point of block 1327. A daypart for the fingerprints associated with iSpot Ad ID 320 and Unique TV ID 325 in View Rate Series 399 may also be determined at this block, such as according to when records for when fingerprints associated with iSpot Ad ID 320 and Unique TV ID 325 in View Rate Series 399 were recorded, relative to the location and time zone of the reporting Unique TV ID 325. The broadcaster and/or locale reported by or determined for Unique TV ID 325 may also be obtained and labeled, flagged, or indexed at this block, such that Benchmark Module 1400 may determine the average view rate for the advertisement across all reporting TVs, further relative to broadcasters, dayparts, locales and the like.

After block 1355, FIG. 13A may then continue at location "B" in FIG. 13B.

At decision block 1360, Overlap and Behavior Module 1300 may determine whether the discontinuity is followed by content on the same or a different channel. This may be determined according to, for example, information received by Smart TV Data Collector 900 from Viewing Data Collector 800.

If decision block 1360 indicates that the following content is on a different channel, then the discontinuity may be flagged or labeled as a channel change. If decision block 1360 indicates that the following content is on the same channel, then the discontinuity may be flagged or labeled as a fast forward.

At done block 1399, Overlap and Behavior Module 1300 may conclude and/or return to a process which spawned it.

Figure 14:
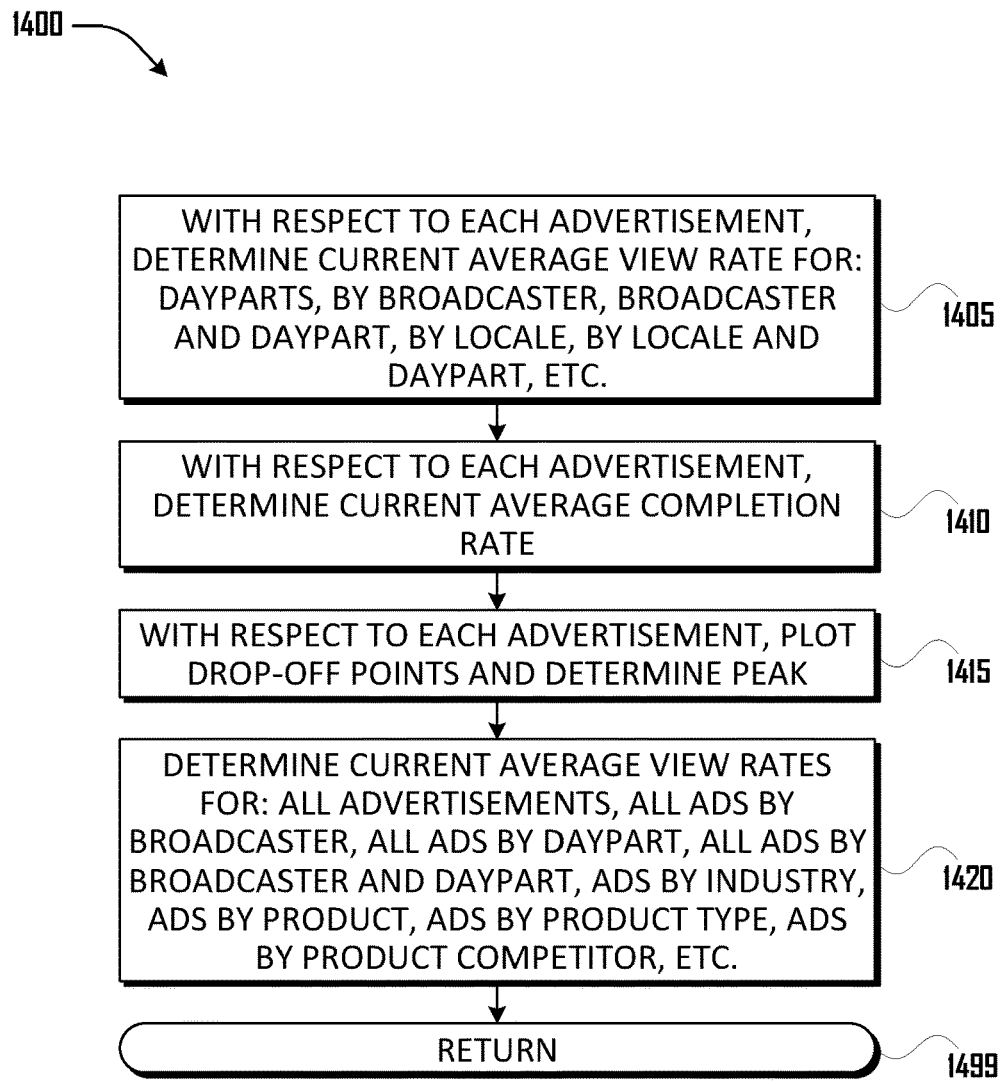
FIG. 14 is a flowchart illustrating an exemplary embodiment and/or algorithmic structure of a Benchmark Determining module.

FIG. 14 is a flowchart illustrating an exemplary embodiment and/or algorithmic structure of Benchmark Module 1400. Benchmark Module 1400 may be executed by, for example, iSpot Server 200. Benchmark Module 1400 may be executed to determine current View Rate benchmarks relative to extrinsic standards, such as average view rate for all advertisements, all ads broadcast by a broadcaster, broadcast in a daypart, broadcast by network, and broadcast in a locale, as well as standards intrinsic to an advertisement, such as an average View Rate 396 for an advertisement, average View Rate 396 for the advertisement by daypart, broadcast network, locale, and the like. Benchmark Module 1400 may also determine an average completion rate and peak drop-off point for an advertisement.

At block 1405, Benchmark Module 1400 may determine the current average of View Rate 396 records for each advertisement associated with an iSpot Ad ID 320. The average view rate may be determined relative to broadcasters, dayparts, broadcaster and daypart, by locale, by locale and daypart, and the like.

At block 1410, Benchmark Module 1400 may determine the average completion rate for each advertisement associated with an iSpot Ad ID 320. The average completion rate may be determined relative to broadcasters, dayparts, broadcaster and daypart, by locale, by locale and daypart, and the like. The average completion rate of the television advertisement comprises a percentage of renderings in which the rendered television advertisement was rendered without interruption, relative to all reporting televisions. The average completion rate may be determined by using Drop-Off Point 388 records. Average completion rate results may be stored as, for example, one or more Completion Rate 389 records.

At block 1415, Benchmark Module 1400 may, for each advertisement associated with an iSpot Ad ID 320, plot Drop-Off Point 388 records and determine one or more local maxima or peaks. Peak drop-off point may be determined for each advertisement relative to broadcasters, dayparts, broadcaster and daypart, by locale, by locale and daypart, and the like. These results may also be stored in one or more Drop-Off Point 388 records.

At block 1420, Benchmark Module 1400 may determine the current average of View Rate 396 records for all advertisements. This may be determined to include or reveal such information organized by advertisements by broadcaster, by daypart, by broadcaster and daypart, by industry, by product, product type, product competitor, and the like.

At done block 1499, Benchmark Module 1400 may conclude and/or may return to a process which may have spawned it.

Figure 15:
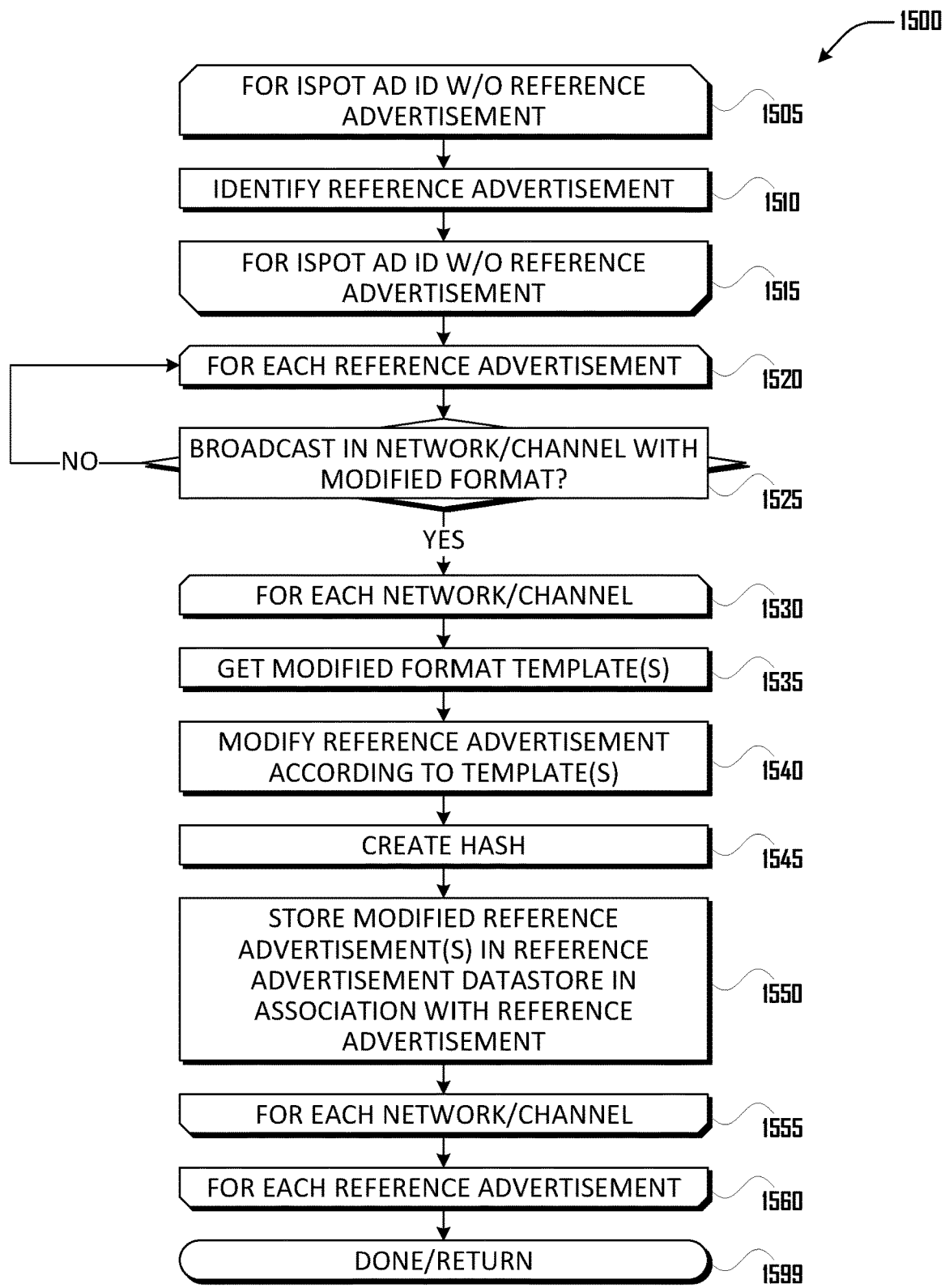
FIG. 15 is a flowchart illustrating an exemplary embodiment and/or algorithmic structure of a Reference Ad and Variation module.

FIG. 15 is a flowchart illustrating an exemplary embodiment and/or algorithmic structure of Reference Advertisement and Variation Module 1500. Reference Advertisement and Variation Module 1500 may be executed by, for example, iSpot Server 200, whether independently (not as a subroutine or submodule) or as a module or routine called by another process, module, or routine. Reference Advertisement and Variation Module 1500 may be executed to identify a reference advertisement corresponding to iSpot Ad ID 320 and to generate variations of reference advertisements. A reference advertisement may be understood as a canonical or typical form of an advertisement associated with a particular iSpot Ad ID 320. The identified reference advertisement may be stored as, for example, one or more Reference Advertisement 398 record(s). Reference Ad and Variation Module 1500 may also create variations of an advertisement, such as different encodings, different resolutions, different aspect ratios and the like. Advertisement variations may follow the format of variations used by operators and TV networks. Advertisement variations may be stored as, for example, one or more Advertisement Variation 387 records. Advertisement Variation 387 may be fingerprint and included in "representations" or Sample 385 of advertisements, for comparison relative to samples from Smart TVs.

Opening loop block 1505 to closing loop block 15015 may iterate over iSpot Ad ID 320, or at least iSpot Ad ID 320 which are not yet associated with a Reference Advertisement 398.

At block 1510, Reference Advertisement and Variation Module 1500 may identify a reference advertisement corresponding to a then-current iSpot Ad ID 320. An identified reference advertisement may be, for example, a first set of Sample 385 records associated with a then-current iSpot Ad ID 320, a most common set of Sample 385 records associated with a then-current iSpot Ad ID 320, a set of Sample 385 records associated with a selected Network 305, a set of Sample 385 records with fewest errors or fewest missing frames, and/or a combination of these factors or the like. An identified reference advertisement and/or Samples 385 records thereof may be stored as or associated with, for example, one or more Reference Advertisement 398 records.

At closing loop block 1515, Reference Advertisement and Variation Module 1500 may iterate over a next iSpot Ad ID 320 and/or may proceed.

Opening loop block 1520 to closing loop block 1560 may iterate over each Reference Advertisement 398 records or at least those Reference Advertisement 398 records which have not previously had variations generated in relation thereto.

A decision block 1525, Reference Advertisement and Variation Module 1500 may determine if the Reference Advertisement 398 is known to or has been observed to be broadcast by one or more TV Network 185, Network 305, and/or Channel 310 known to modify advertisements. For example, "ESPN" may be known to be a Network 305 and/or Channel 310 which is known or which has been observed to broadcast advertisements in a modified format.

If affirmative or equivalent at decision block 1525, then opening loop block 1530 to closing loop block 1555 may iterate over each TV Network 185, Network 305, and/or Channel 310 known to modify advertisements, with respect to the then-current Reference Advertisement 398.

At block 1535, Reference Advertisement and Variation Module 1500 may obtain template(s) for modification of advertisements by the TV Network 185, Network 305, and/or Channel 310. For example, TV Network 185, Network 305, and/or Channel 310 may modify advertisements in characteristic ways which follow or can be described according to templates. For example, modification templates may comprise graphical, encoding, and/or another modification. For example, graphical modifications may comprise a reduced display area of, a cropping of, a changed aspect ratio of an "original" Reference Advertisement 398. The graphical modification may be further comprise an insert area, wherein the insert area may be an area in which a party inserts text, including static or scrolling text (including a "ticker" of scrolling text), credits, news, advertisements, social media content, program information, or the like. The insert area may comprise images, including static images and/or video. The insert area may be above, below, or beside Reference Advertisement 398. The reduced display area may accommodate the insert area and/or the insert area may be an overlay or an underlay. There may be no or more than one insert area in a template.

An encoding modification may comprise, for example, a different encoding format, a different packet format, a different bitrate, or the like.

At block 1540, Reference Advertisement and Variation Module 1500 may modify Reference Advertisement 398 according to the template(s) of the then current TV Network 185, Network 305, and/or Channel 310. With respect to insert area(s), the template may substitute a blank area, a characteristic text or image or a text or image. The blank area, a characteristic text or image or a text or image may serve as a substitute and/or may signal the presence of an insert area.

At block 1545, Reference Advertisement and Variation Module 1500 may create a hash of modification(s) of Reference Advertisement 398 created at block 1540. The hash may correspond to a sample hash created at, for example, block 670 of FIG. 6.

At block 1550, Reference Advertisement and Variation Module 1500 may store the modified Reference Advertisement 398 and/or a hash thereof in iSpot Server Datastore 300 as, for example, one or more Advertisement Variation 387 records. Advertisement Variation 387 records may be associated with Reference Advertisement 398 records.

Figure 20:
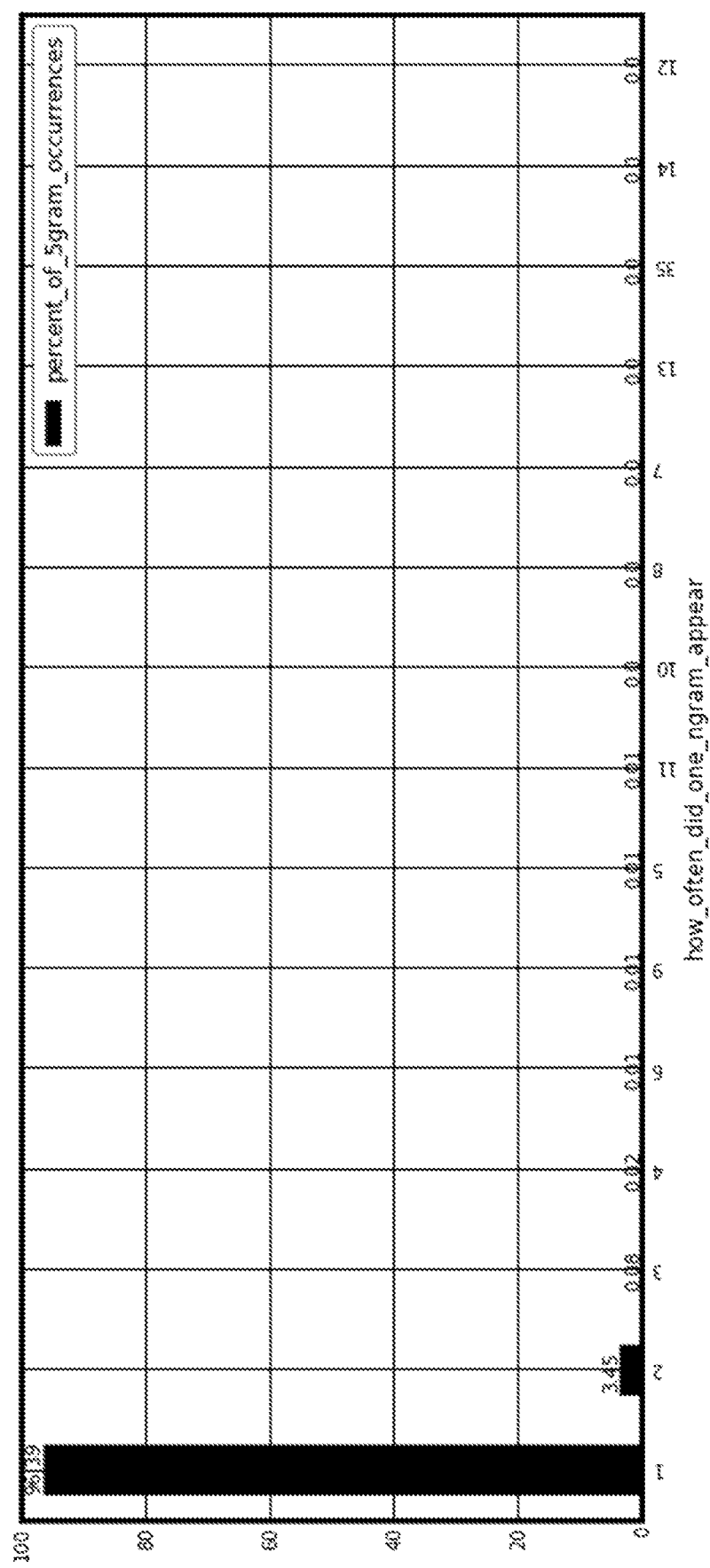
FIG. 20 is a chart of observed data, illustrating how often a sequence of five advertisements was broadcast.

At done block 1599, Reference Advertisement and Variation Module 1500 may conclude and/or may return to a process which may have spawned it.

iSpot.tv, Inc. has developed a large database of content sequences, identifying when different content was shown, where, and on what channel, across a large portion of the United States. This database includes both shows and advertisements. This database is highly accurate and reflects both human and programmatic input. Prior to development of this database, databases of programming typically included only shows, not advertisements. In rare cases where advertisements were included, such databases were limited in geographic coverage.

iSpot.tv, Inc. discovered that relatively short sequences comprising advertisements are unique and may be used to identify when the short sequence was broadcast, where, and on what channel. A large database of content sequences with broad geographic coverage was necessary to discover this information. iSpot.tv, Inc. learned that a sequence of five advertisements can be used to identify when the 5-ad sequence was broadcast, where, and on what channel, with approximately 96.39% accuracy. Please see FIG. 20. Additional sequences, with a larger number of content items (including shows), were also searched, showing even higher accuracy. iSpot.tv, Inc. learned that a sequence of four advertisements can be used to identify when the sequence was broadcast, where, and on what channel, with approximately 95.4% accuracy. Please see FIG. 21. iSpot.tv, Inc. learned that a sequence of three advertisements can be used to identify when the sequence was broadcast, where, and on what channel, with approximately 92.22% accuracy. Please see FIG. 22. iSpot.tv, Inc. learned that a sequence of just two advertisements can still be used to identify when the sequence was broadcast, where, and on what channel, with approximately 51.7% accuracy. Please see FIG. 23.

As can be appreciated by a review of FIGS. 20-23, iSpot.tv, Inc. was surprised to learn that a sequence of even just two advertisements may be used to correctly identify when, where, and on what channel an advertisement-including sequence occurred, greater than 50% of the time, and that this confidence increases to 92.22% with just three advertisements in a sequence. Similar results can be obtained for single advertisements in combination with a leading and a following content instance.

When processing a large amount of reported viewing data from Television-Type Devices, the reported information is highly variable, fragmentary, and incomplete. Frequently, the reported location of the Television-Type Device and broadcast channel information is entirely missing or is unreliable. In addition, many Television-Type Devices now render video recorded at an earlier day and time. However, based on the research discussed above, a report from a Television-Type Device which includes a reported rendering of only two or three advertisements in a sequence (or one advertisement and a leading and a following content instance) and with a database of observed advertisements and content covering a large geographic area, it is possible to determine when, where, and on what channel the reported advertisements were originally broadcast and it is possible to determine if the rendering was live, contemporaneous with the original broadcast, or if the rendering was time-shifted. This allows reported information from Television-Type Devices to be confirmed and supplemented with a high degree of confidence, from observed broadcasts, notwithstanding that the reported information is highly variable, fragmentary, and incomplete.

Television-Type Device Monitoring Module 1600, Observed Ad Sequence Module 1700, Reported Ad Sequence Identification Module 1800, and Observed-Reported Ad Sequence Search Module 1900 determine observed sequences comprising advertisement(s), determine sequences comprising advertisement(s) reported by Television-Type Devices, correlate reported and observed sequences comprising advertisement(s), complete missing information in relation to content rendered by Television-Type Devices, and determine whether a reported viewing instance was live or time-shifted.

Figure 16:
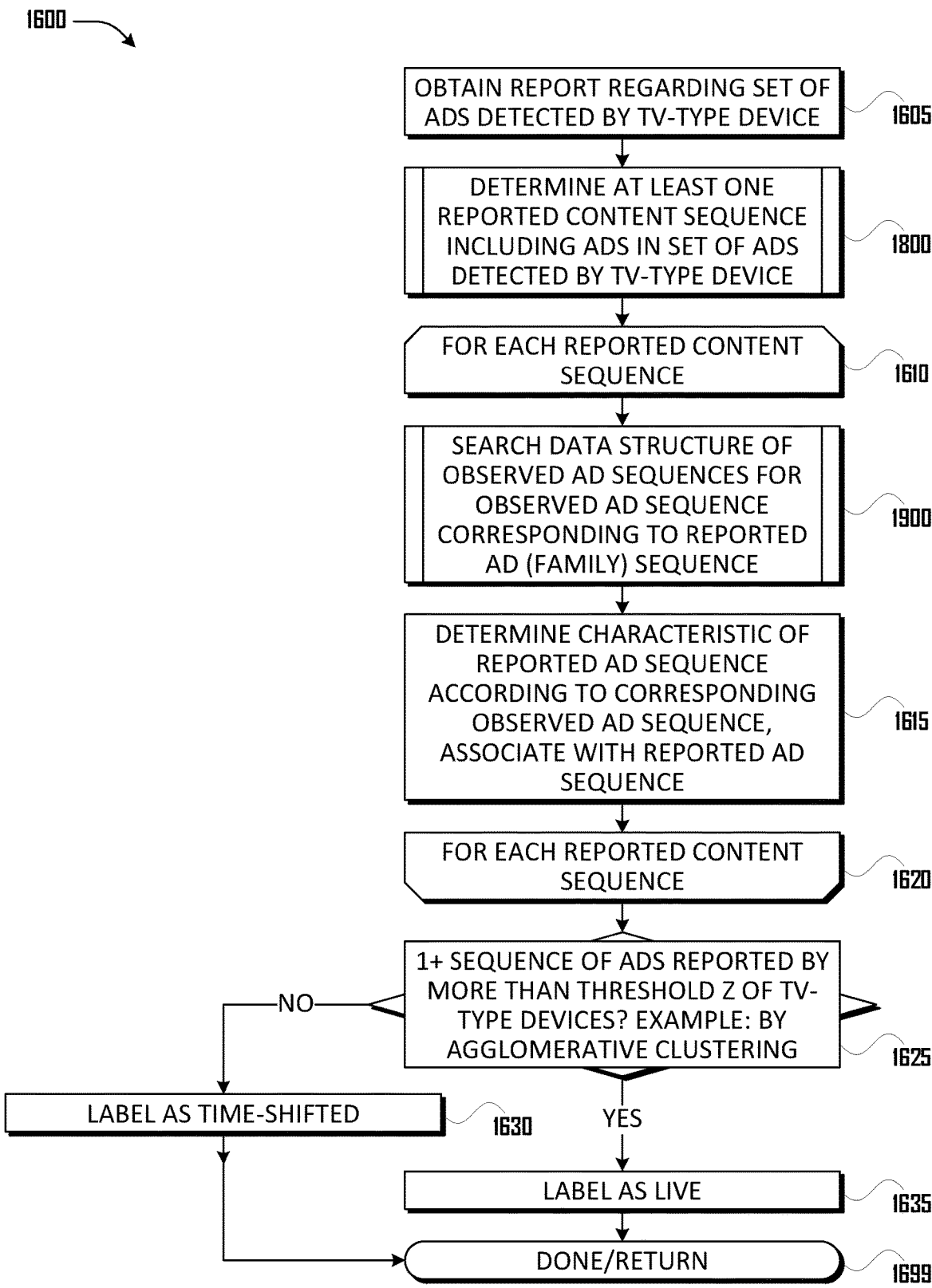
FIG. 16 is a flowchart illustrating an exemplary embodiment and/or algorithmic structure of a Television-Type Device Monitor module.

FIG. 16 is a flowchart illustrating an exemplary embodiment and/or algorithmic structure of Television-Type Device Monitoring Module 1600. Television-Type Device Monitoring Module 1600 may be executed by, for example, iSpot Server 200, whether independently (not as a subroutine or submodule) or as a module or routine called by another process, module, or routine. Television-Type Device Monitoring Module 1600 may be executed to monitor reports from Television-Type Devices. Television-Type Devices may be configured—such as by a manufacturer, supplier, or service provider—to report information. Reported information may be reported to, for example, iSpot Server 200, an operator of TV Distribution Media 180 and/or of TV Network 185, such as Operator 160, a manufacturer of the Television-Type Device, and/or to a $3^{rd}$ Party Computer 150. Television-Type Device Monitoring Module 1600 may receive such reports directly from Television-Type Devices and/or indirectly, such as from a party who receives such reports from Television-Type Devices. A report from a Television-Type Device or from another party may comprise information obtained by such party from other sources.

The reported information may include, for example, the following: a Receive Device UUID, a postal code, a DMA (or "designated market area"). The reported information may include "previous content", "ad", and "next content" information. "Previous content" information may include, for example, an identifier of a show or program, a title of the show or program, a call sign (such as of TV Network 185), and a start and end time of the show or program. The "ad" information may include, for example, an advertisement identifier, such as an iSpot Ad ID 320, a start and end time of the advertisement, and a start and/or end time of a program in which the advertisement appeared. The "next content" information may include, for example, an identifier of a show or program, a title of the show or program, a call sign (such as of TV Network 185), and a start and end time of the show or program. The report from Television-Type Devices may include a content sample or fingerprint (such as a hash of a content sample). A content sample may be a frame or frames of video, an audio portion, or the like.

In the foregoing, identifiers of shows or programs may be, for example, identifiers provided by a party such as, for example, Gracenote, Inc. (which may be a subsidiary of Tribune Media). In the foregoing, advertisement identifiers may be, for example, identifiers provided by a party such as iSpot, Inc. or another party. In the foregoing, identifiers (whether of shows, programs, or advertisements) may be associated with content through various means, such as by a party who correlates a content sample or content fingerprint with an identifier, a program schedule with an identifier, and the like.

The party who correlates content with an identifier may be the Television-Type Device, a party who obtains content samples/fingerprints from Television-Type Devices and provides identifiers to the Television-Type Device, and the like. Techniques for correlating content with identifiers are disclosed herein.

Television-Type Device Monitoring Module 1600 processes reported information from Television-Type Devices to determine reported sequences comprising advertisements. A sequence comprising an advertisement is also referred to herein as an "ngram". As illustrated in FIG. 16, Television-Type Device Monitoring Module 1600 may perform this by, for example, calling Reported Ad Sequence Identification Module 1800 as a subroutine or sub-module (as noted elsewhere, the modules and components thereof may be re-ordered). The reported sequences comprising advertisements may be used, such as by Observed-Reported Ad Sequence Search Module 1900, to search a database or data structure of observed sequences comprising advertisements. Because very short advertisement-containing sequences still return high confidence results, the search can be performed quickly. Characteristics of the observed sequences may then be associated with the reported sequences, such as a broadcast channel, a DMA, a time, a show, and the like. Observed sequences comprising advertisements may be determined by, for example, Observed Ad Sequence Module 1700.

Referring to FIG. 16, at block 1605, Television-Type Device Monitoring Module 1600 may obtain a report regarding content rendered by a Television-Type Device, which content may include a set of advertisements rendered by a Television-Type Device. At set of such reports may be accumulated, such as over a time period or over a number of reports. As noted, the reported information may be incomplete and/or unreliable.

At block 1800, Television-Type Device Monitoring Module 1600 may determine at least one reported ngram in the report of block 1605. This may be performed by, for example, Reported Ad Sequence Identification Module 1800 (discussed further in FIG. 1800). Reported ngrams may be saved and/or referenced in iSpot Server Datastore 300 as, for example, one or more Reported Ngram 371 record.

Opening loop block 1610 to closing loop block 1620 may iterate over the reported Ngram 371 record(s) of block 1800.

At block 1900, Television-Type Device Monitoring Module 1600 may search a datastructure of observed ngrams for one or more observed ngrams corresponding to a then-current Reported Ngram 371 record. A datastructure of observed ngrams may be created by, for example, Observed Ad Sequence Module 1700. Observed ngrams in the datastructure may be saved as or represented by one or more Observed Ngram 372 records in iSpot Server Datastore 300.

At block 1615, with a result of block 1900, Television-Type Device Monitoring Module 1600 may determine a characteristic of the then-current Reported Ngram 371, according to the corresponding Observed Ngram 372. The characteristic may comprise, for example, a day-time (of the advertisement when broadcast, according to the Observed Ngram 372), a broadcaster, a channel, a network, a DMA, a local or national categorization, an advertisement family identifier, a specific advertisement identifier, a schedule identifier, a broadcast time, an advertisement slot identifier, a first-time airing identifier a temporal rating (such as live, same date, delayed by up to three, seven or thirty days) and the like.

At closing loop block 1620, Television-Type Device Monitoring Module 1600 may return to opening loop block 1610 to iterate over the next Reported Ngram 371, if any.

At decision block 1625, Television-Type Device Monitoring Module 1600 may determine whether a Reported Ngram 371 was reported by more than a threshold number of Television-Type Devices within a time period. This may be performed, for example, by performing agglomerative clustering on Reported Ngram 371 records from all (or a large number of) reporting Television-Type Devices. For example, if a Reported Ngram 371 was reported by a large number of Television-Type Devices within a time period, this strongly indicates that the rendering of the Reported Ngram 371 occurred contemporaneously with a live broadcast.

If affirmative or equivalent at decision block 1625, at block 1635, Television-Type Device Monitoring Module 1600 may label the Reported Ngram 371 record as having been a live rendering of the Reported Ngram 371. If negative or equivalent at decision block 1625, at block 1630, Television-Type Device Monitoring Module 1600 label the Reported Ngram 371 record as having been a time-shifted rendering of the Reported Ngram 371 (time-shifted renderings being less likely to occur in clusters).

At done block 1699, Television-Type Device Monitoring Module 1600 may conclude and/or return to a process which spawned it.

Figure 17:
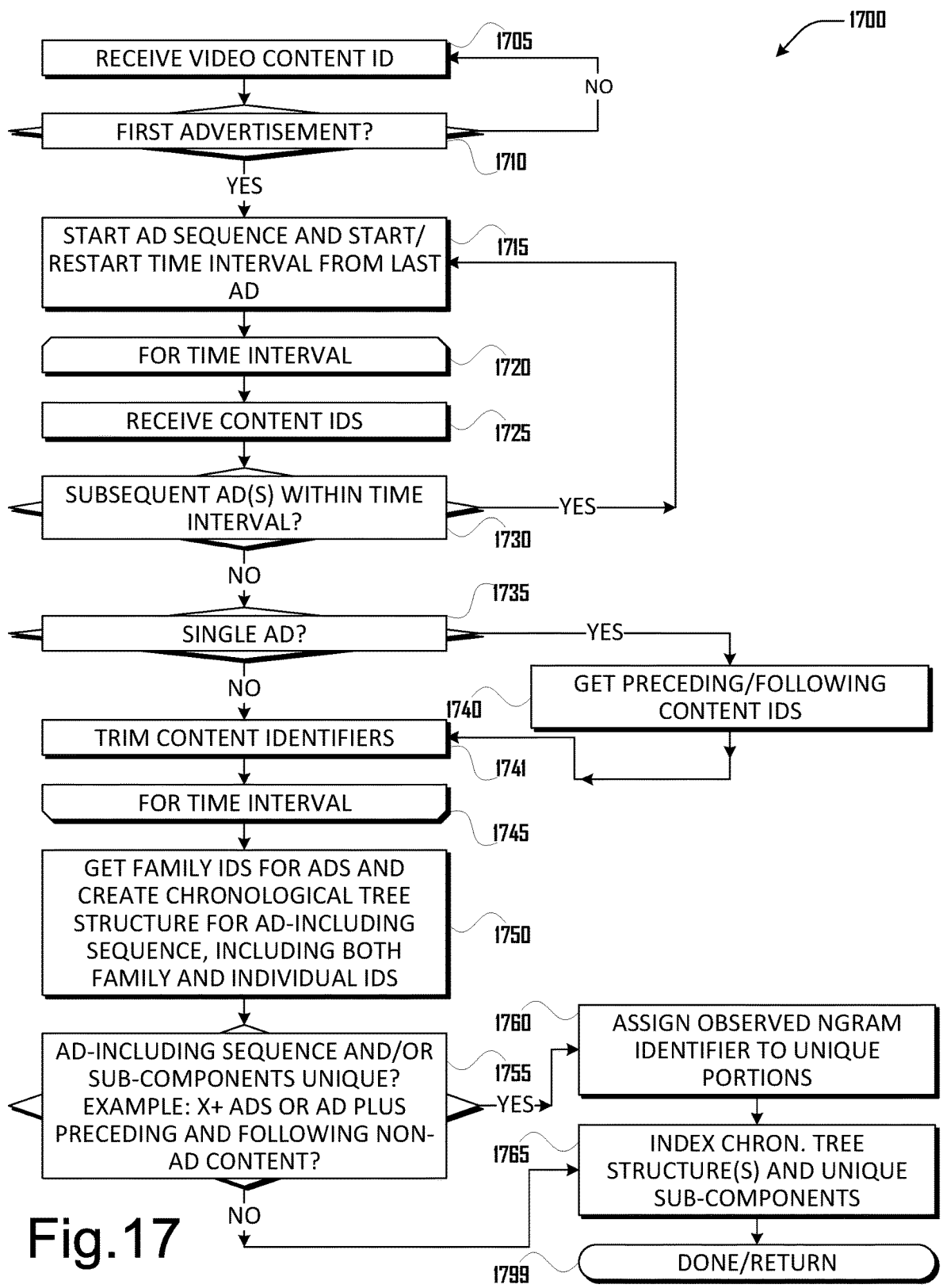
FIG. 17 is a flowchart illustrating an exemplary embodiment and/or algorithmic structure of an Observed Ad Sequence module.

FIG. 17 is a flowchart illustrating an exemplary embodiment and/or algorithmic structure of Observed Ad Sequence Module 1700. Observed Ad Sequence Module 1700 may also be referred to herein as, "Video Observation Module". Observed Ad Sequence Module 1700 may be executed by, for example, iSpot Server 200 and/or by iSpot TV Monitor 110, whether independently (not as a subroutine or submodule) or as a module or routine called by another process, module, or routine. Observed Ad Sequence Module 1700 may be executed to determine ngrams in broadcast or other media in a controlled environment; such determined ngrams are referred to herein as "Observed ngrams" or as "observed sequence of advertisements". Observed ngrams may be stored as, for example, one or more Observed Ngram 372 records in iSpot Datastore 300.

As discussed herein, iSpot Server 200 or instances or subcomponents thereof, such as in iSpot TV Monitor 110, may execute Ad Harvester 600 to identify advertisements in linear television and to save information regarding the advertisements. Multiple television signal receivers may be present in iSpot TV Monitor 110; such devices or signal receivers thereof may be distributed across a large geographic area, such as in multiple cities, in multiple states, and the like, connecting to multiple different TV Distribution Media 180 to obtain linear television from many sources and to execute Ad Harvester 600 and/or Observed Ad Sequence Module 1700 with respect to the multiple linear television sources. Observed Ad Sequence Module 1700 may be executed in conjunction with and/or separately from Ad Harvester 600.

At block 1705, Observed Ad Sequence Module 1700 may receive a video content identifier, such as a Show ID 350, iSpot Ad ID 320, or an "unidentifiable" marker, as may have been determined by, for example, Ad Harvester 600. Observed Ad Sequence Module 1700 may also receive a render time timestamp, indicating when the video content was rendered (for example, by the iSpot TV Monitor 110), as well as other metadata of or associated with the content or content identifier. The other metadata may include information characteristic of the video content, such as a daytime, a broadcaster, a local/national categorization, a schedule identifier, a channel identifier, an advertisement slot identifier, a first-time-airing identifier, and a temporal rating and the like.

At decision block 1710, Observed Ad Sequence Module 1700 may determine whether the video content identifier of block 1705 is a first advertisement, such as an iSpot Ad ID 320 (as opposed to a Show ID 350 or "unidentifiable" marker). If negative or equivalent at decision block 1710, Observed Ad Sequence Module 1700 may return to block 1705.

If affirmative or equivalent at decision block 1710, Observed Ad Sequence Module 1700 may, at block 1715, start an Observed ngram (an observed sequence of content identifiers comprising an advertisement) and may start a timer to count a time interval from the iSpot Ad ID 320 of block 1705. The time interval may be, for example, between 115 and 130 seconds. The time interval may be, for example, 120 seconds. The time interval may be, for example, selected based on a characteristic time interval for a block of advertisements broadcast by a TV Distribution Media 180 and/or TV Network 185. The characteristic time interval for a block of advertisements may depend on and be selected according to the TV Distribution Media 180 and/or TV Network 185 associated with the video content identifier of block 1705.

Opening loop block 1720 to closing loop block 1745 may iterate over content identifiers received by Observed Ad Sequence Module 1700 during the time interval.

At block 1725, Observed Ad Sequence Module 1700 may receive content identifiers, such as Show ID 350, iSpot Ad ID 320, or an "unidentifiable" markers, as may have been determined by, for example, Ad Harvester 600. Observed Ad Sequence Module 1700 may also receive a render time timestamp, indicating when the video content was rendered (for example, by the iSpot TV Monitor 110), as well as a render time indicator and other metadata.

At decision block 1730, Observed Ad Sequence Module 1700 may determine whether the content identifiers of block 1725 comprises at least one iSpot Ad ID 320, subsequent to the preceding iSpot Ad ID 320 of block 1705.

If affirmative or equivalent at decision block 1730, Observed Ad Sequence Module 1700 may return to block 1715. Observed Ad Sequence Module 1700 may record the content identifiers received in the previous iteration of block 1725 and restart the time interval, beginning with a last iSpot Ad ID 320 in the set of content identifiers received on a previous iteration of block 1725. Observed Ad Sequence Module 1700 may then proceed with block 1720, with the restarted time interval.

If negative or equivalent at decision block 1730, at decision block 1735, Observed Ad Sequence Module 1700 may determine whether the iSpot Ad ID 320 of block 1705 was a single advertisement or if it was followed by another or subsequent iSpot Ad ID 320 within the time interval characteristic of a block of advertisements.

If affirmative or equivalent at decision block 1735, indicating that the iSpot Ad ID 320 of block 1705 was isolated and was not followed by a subsequent iSpot Ad ID 320, at block 1730 Observed Ad Sequence Module 1700 may get preceding and following content identifiers and metadata, such as a Show ID 350, for content instances which preceded and followed the iSpot Ad ID 320 of block 1705.

At block 1741, Observed Ad Sequence Module 1700 may trim content identifiers recorded between blocks 1705 and 1740. Trimming content identifiers may comprise, for example, identifying the first iSpot Ad ID 320 of block 1705 as well as a last iSpot Ad ID 320 identified in final iteration of decision block 1730, and removing content identifiers which follow the last iSpot Ad ID 320. Trimming content identifiers may also comprise substituting fillers or blanks for show identifiers and unknown identifiers in the sequence. If block 1740 was traversed, trimming content identifiers may comprise, for example, saving the iSpot Ad ID 320 of block 1705 and the preceding and following content identifiers of block 1740 (which may be Show IDs 350).

At closing loop block 1745, the then-current time interval ends.

In this way, blocks 1705 to 1745, with iteration between blocks 1715 and 1730, accumulate a set of sequential content identifiers which include iSpot Ad IDs 320. Such sets commonly include sets of advertisements which occur within a time interval characteristic of blocks of advertisements broadcast or transmitted by TV Network 185 and/or Operator 160.

At block 1750, Observed Ad Sequence Module 1700 may obtain one or more family identifiers associated with individual advertisement identifiers or iSpot Ad ID's 320 in the sequence of content identifiers accumulated across block 1705 to 1745.

For example, individual advertisements may share common content, such as a common beginning, middle, or ending portion or a common soundtrack. For example, an automobile manufacturer may produce a family of advertisements for a brand of car. The family of advertisements for the brand of car may share a common set of images, video, or audio, such as of the car, the car's interior, a trademark of the car, and the like. Individual advertisements within the family may be customized for different markets, such as with images emblematic of a particular market (such as of an iconic building in an area, an environmental or cultural scene, or the like), song lyrics adapted for a market, and contact information for a large retailer specific to the market. Specific advertisement identifiers, such as iSpot Ad ID 320, may thus be grouped in or associated with an advertisement family identifier. Advertisement family identifiers may be stored in, for example, iSpot Datastore 300 as one or more Ad Family ID 373.

Thus, at block 1750, Observed Ad Sequence Module 1700 may obtain one or more Ad Family ID 373 associated with each iSpot Ad ID 320 in the sequence of content identifiers accumulated across block 1705 to 1745.

At block 1750, Observed Ad Sequence Module 1700 may also create a data structure corresponding to and/or encoding the sequence of content identifiers accumulated across block 1705 to 1745. The data structure may include sub-components, such as groups of two, three, or other sets of advertisements within a longer sequence. The data structure may include advertisement family identifiers, in addition to specific advertisement identifiers. The data structure may include show identifiers or blanks or fillers for show identifiers. The data structure may be, for example, a trie (also called a digital tree, radix tree, or prefix tree). A trie is an ordered tree data structure used to store a dynamic set or associative array. Nodes in the tree do not necessarily store the key associated with each node; instead, the position of a node in the tree defines the key with which it is associated. In the tree, descendants of a node may have a common prefix of the string associated with that node, and the root may be associated with the empty string. Values are not necessarily associated with every node, but tend to be associated only with leaves.

The data structure of block 1750 may be a chronological tree structure, encoding the overall advertisement-including sequence of content identifiers accumulated across block 1705 to 1745, as well as advertisement family identifiers for individual ads in the sequence and sub-components of the sequence. The data structure may encode and/or be associated with information associated with the content, such as a broadcast channel, a DMA, a time, a show, a time offset relative to a show, and the like.

At decision block 1755, Observed Ad Sequence Module 1700 may determine whether the overall advertisement-including sequence of content identifiers and/or sub-components thereof is unique or is probably unique. For example, Observed Ad Sequence Module 1700 may determine whether the sequence and/or sub-components have greater than a threshold number of identifiers in a sequence, such as 2 or more, 3 or more, 4 or more, or the like. Alternatively and/or in addition, the determination of decision block 1755 may determine whether a sequence has already been observed.

If affirmative or equivalent at decision block 1755, at block 1760, for a sequence of content identifiers and sub-components thereof which are or which probably are unique, Observed Ad Sequence Module 1700 may assign one or more identifiers to such components. This identifier(s) may be stored as, for example, one or more Observed Ngram 372 records.

At block 1765, both unique and non-unique Observed Ngram 372 records may be indexed to facilitate rapid search or comparison.

At done block 1799, Observed Ad Sequence Module 1700 may conclude, return to its beginning to begin again with respect to additional content identifiers, and/or return to a process which may have called it.

Figure 18:
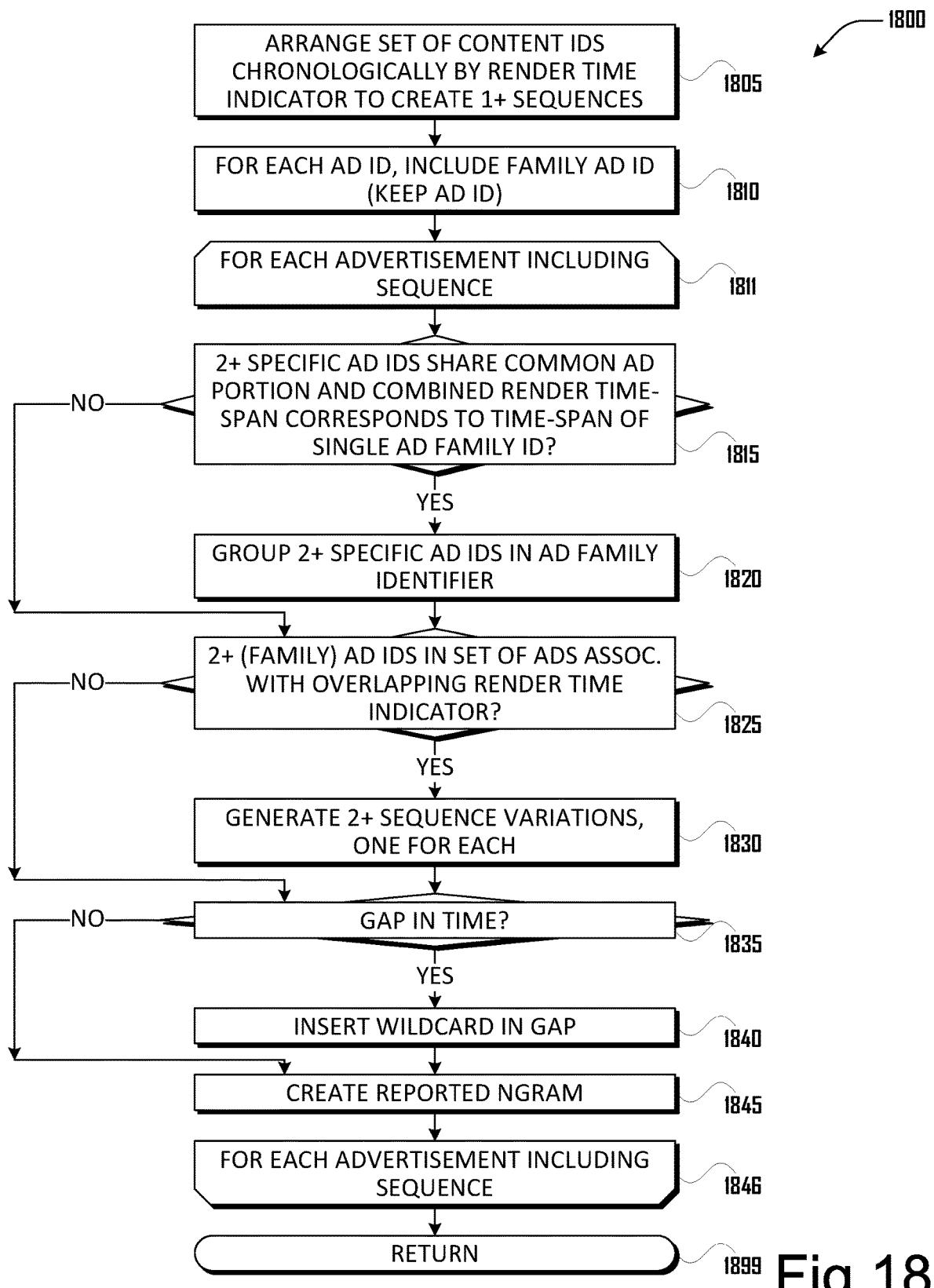
FIG. 18 is a flowchart illustrating an exemplary embodiment and/or algorithmic structure of a Reported Ad Sequence Identification module.

FIG. 18 is a flowchart illustrating an exemplary embodiment and/or algorithmic structure of a Reported Ad Sequence Identification Module 1800. Reported Ad Sequence Identification Module 1800 may be executed by, for example, iSpot Server 200, and/or a component or instance thereof. As noted, Reported Ad Sequence Identification Module 1800 may determine at least one reported ngram in a report from a Television-Type Device, as may have been received by Television-Type Device Monitoring Module 1600, such as at block 1605 of Television-Type Device Monitoring Module 1600. Reported Ad Sequence Identification Module 1800 may be executed by, for example, iSpot Server 200, and/or a component or instance thereof.

At block 1805, Reported Ad Sequence Identification Module 1800 may arrange a set of reported content identifiers, such as iSpot Ad IDs 320 and/or Show IDs 350, chronologically by render time indicator, to create one or more content sequences. Sequences not including an advertisement identifier may, optionally, be discarded.

At block 1810, for each advertisement identifier, such as an iSpot Ad ID 320, Reported Ad Sequence Identification Module 1800 may obtain an advertisement family identifier, such as an Ad Family ID 373.

Opening loop block 1811 to closing loop block 1846 may iterate over each advertisement including sequence of blocks 1805 and 1810.

At decision block 1815, Reported Ad Sequence Identification Module 1800 may determine whether two or more advertisement identifiers share (or are associated with) a common advertisement portion, such as if they are grouped with the same Ad Family ID 373, and if the combined render time-span of the two or more advertisements corresponds to the time-span of the single ad family identifier. An affirmative (or equivalent) determination at this decision block may indicate, for example, if one advertisement is incorrectly being reported by the Television-Type Device as a rendering of two or more advertisements.

If affirmative or equivalent at decision block 1815, at block 1820 Reported Ad Sequence Identification Module 1800 may group the two or more advertisements identifiers in the advertisement family identifier.

At decision block 1825, which may follow a negative or equivalent decision at decision block 1815 or which may follow block 1820, Reported Ad Sequence Identification Module 1800 may determine whether two or more advertisements in the then-current advertisement including sequence have overlapping rendering time indicators in the advertisement including sequence. For example, advertisements A and B are detected in sequence, though the render time for advertisement B begins before the end of the render time indicator for advertisement A. The determination of decision block 1825 may further require that the advertisements are in the same advertisement family, which may indicate that the Television-Type Device incorrectly identified one advertisement as being different advertisements.

If affirmative or equivalent at decision block 1825, at block 1830, Reported Ad Sequence Identification Module 1800 may generate two or more sequence variations, one for each of the advertisement identifiers with overlapping render time indicators.

At decision block 1835, Reported Ad Sequence Identification Module 1800 may determine whether the then-current advertisement including sequence includes one or more gaps in time. The gaps may have to be above a threshold. If affirmative or equivalent at decision block 1835, at block 1840, Reported Ad Sequence Identification Module 1800 may insert a wildcard in the gap. Gaps below the threshold, or gaps below a threshold and which, for example, bridge two instances of the same advertisement identifier (which indicate an interruption in the report), may be ignored or may not be filled with a wildcard.

At block 1845, Reported Ad Sequence Identification Module 1800 may create a record of or recording the then-current advertisement including sequence. For example, Reported Ad Sequence Identification Module 1800 may create one or more Reported Ngram 371 records to record the then-current advertisement including sequence, as processed between opening loop block 1811 and block 1845.

At closing loop block 1846, Reported Ad Sequence Identification Module 1800 may return to opening loop block 1811 to iterate over the next advertisement including sequence.

At done block 1899, Reported Ad Sequence Identification Module 1800 may conclude and/or return to a process, module or routine which may have called it, such Television-Type Device Monitoring Module 1600.

Figure 19:
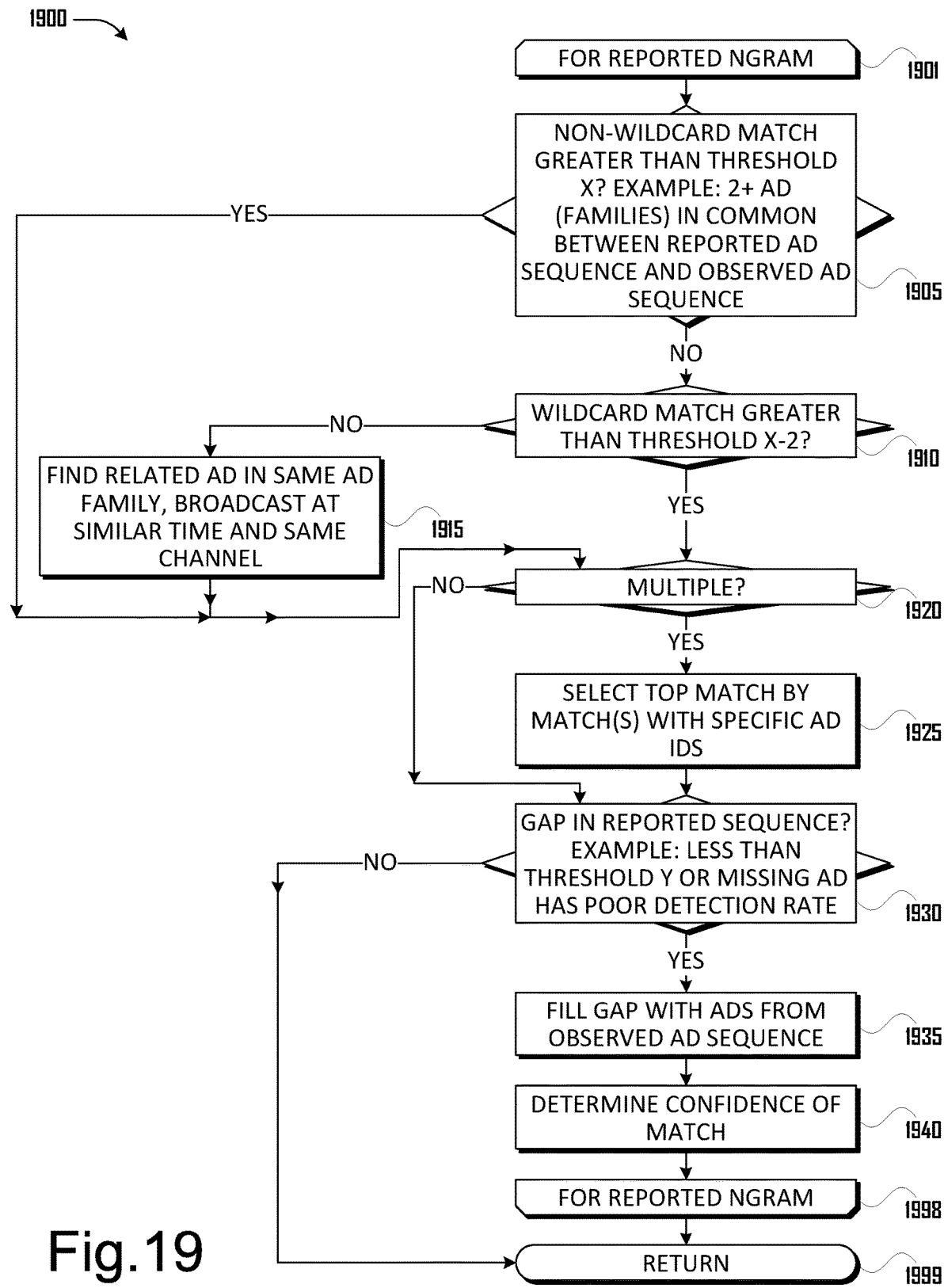
FIG. 19 is a flowchart illustrating an exemplary embodiment and/or algorithmic structure of an Observed-Reported Ad Sequence Search module.

FIG. 19 is a flowchart illustrating an exemplary embodiment and/or algorithmic structure of an Observed-Reported Ad Sequence Search Module 1900. Observed-Reported Ad Sequence Search Module 1900 may be executed by, for example, iSpot Server 200, and/or a component or instance thereof. As noted, reported sequences comprising advertisements, such as Reported Ngram 371 records, may be used, such as by Observed-Reported Ad Sequence Search Module 1900, to search a database or data structure of observed sequences comprising advertisements, such as Observed Ngram 372 records. The reported sequence comprising an advertisement may be, for example, a Reported Ngram 371 record.

Opening loop block 1901 to closing loop block 1998 may iterate over a then-current Reported Ngram 371 record, such as one provided by, for example, Television-Type Device Monitoring Module 1600, and/or as may have been produced by, for example, Reported Ad Sequence Identification Module 1800.

With respect to the then-current Reported Ngram 371 record, at decision block 1905, Observed-Reported Ad Sequence Search Module 1900 may determine whether a non-wildcard match greater than a threshold is found between the then-current Reported Ngram 371 record and the datastructure of observed advertisement including sequences, such as, for example, the datastructure of Observed Ngram 372 records. This determination may be made with respect to family advertisement identifiers, such as Ad Family ID 373, as may have been included in Reported Ngram 371 by Reported Ad Sequence Identification Module 1800.

For example, at block 1905, Observed-Reported Ad Sequence Search Module 1900 may determine whether a sequence of two or more advertisements match, between the Reported Ngram 371 record and Observed Ngram 372 records. Characteristic information recorded during observation of the sequence, such as what network it was broadcast on, where (in what DMA), when, and other information. The threshold may be selected based on an allowable uncertainty. For example, an allowable uncertainty, for an uncertainty less than 50% may allow use of a threshold of only a two advertisement sequence match. For an uncertainty less than 8%, a threshold of only a three advertisement sequence match may be used. For an uncertainly less than 5%, a threshold of a four advertisement sequence match may be used.

If negative or equivalent at decision block 1905, at decision block 1910, Observed-Reported Ad Sequence Search Module 1900 may determine whether a match is found between Reported Ngram 371 and Observed Ngram 372 records, above a threshold, including wildcards which may be in Reported Ngram 371 record. The threshold of decision block 1910 may be a higher threshold than that of decision block 1905.

If affirmative or equivalent at decision block 1910, Observed-Reported Ad Sequence Search Module 1900 may determine whether more than one wildcard match above the threshold of block 1910 was found. If affirmative or equivalent at decision block 1920, at block 1925, Observed-Reported Ad Sequence Search Module 1900 may select a top match by matching specific advertisement identifiers, in addition to advertisement family identifier, such as according to iSpot Ad ID 320 in Reported Ngram 371.

If negative or equivalent at decision block 1910, which indicates that there was neither a non-wildcard match nor a wildcard match between a Reported Ngram 371 and Observed Ngram 372 records, Observed-Reported Ad Sequence Search Module 1900 may find a related advertisement. This search may be based on the reported information which may be available. The search may be for an advertisement in the same advertisement family, and/or broadcast at a similar time and/or channel.

Decision block 1930 may follow block 1920 or block 1925.

At decision block 1930, Observed-Reported Ad Sequence Search Module 1900 may determine whether there is a gap in the reported sequence of the then-current Reported Ngram 371, relative to a matching Observed Ngram 372. The gap may be a gap less than a threshold and/or the gap in Reported Ngram 371 relative to the matching Observed Ngram 372 may be an advertisement which is known to have a poor detection rate.

If affirmative or equivalent at decision block 1930, Observed-Reported Ad Sequence Search Module 1900 may fill the gap with advertisements from the matching Observed Ngram 372 record.

At block 1940, Observed-Reported Ad Sequence Search Module 1900 may determine a confidence with respect to the match between Reported and Observed Ngrams. The confidence may increase when the match comprises a result greater than a threshold. The threshold may be determined based on, for example, the number of matching advertisements or other content instances. The confidence may further be based on or include whether the match was based on advertisement family identifiers or specific advertisement identifiers, whether gaps were present in the Reported Ngram, whether a match was to an advertisement with a known poor detection rate, and the like.

At closing loop block 1998, Observed-Reported Ad Sequence Search Module 1900 may return to opening loop block 1901 to iterate over a next Reported Ngram 371, if any.

At done block 1999, Observed-Reported Ad Sequence Search Module 1900 may conclude and/or return to a process, routine, or module which may have called it.

Figure 21:
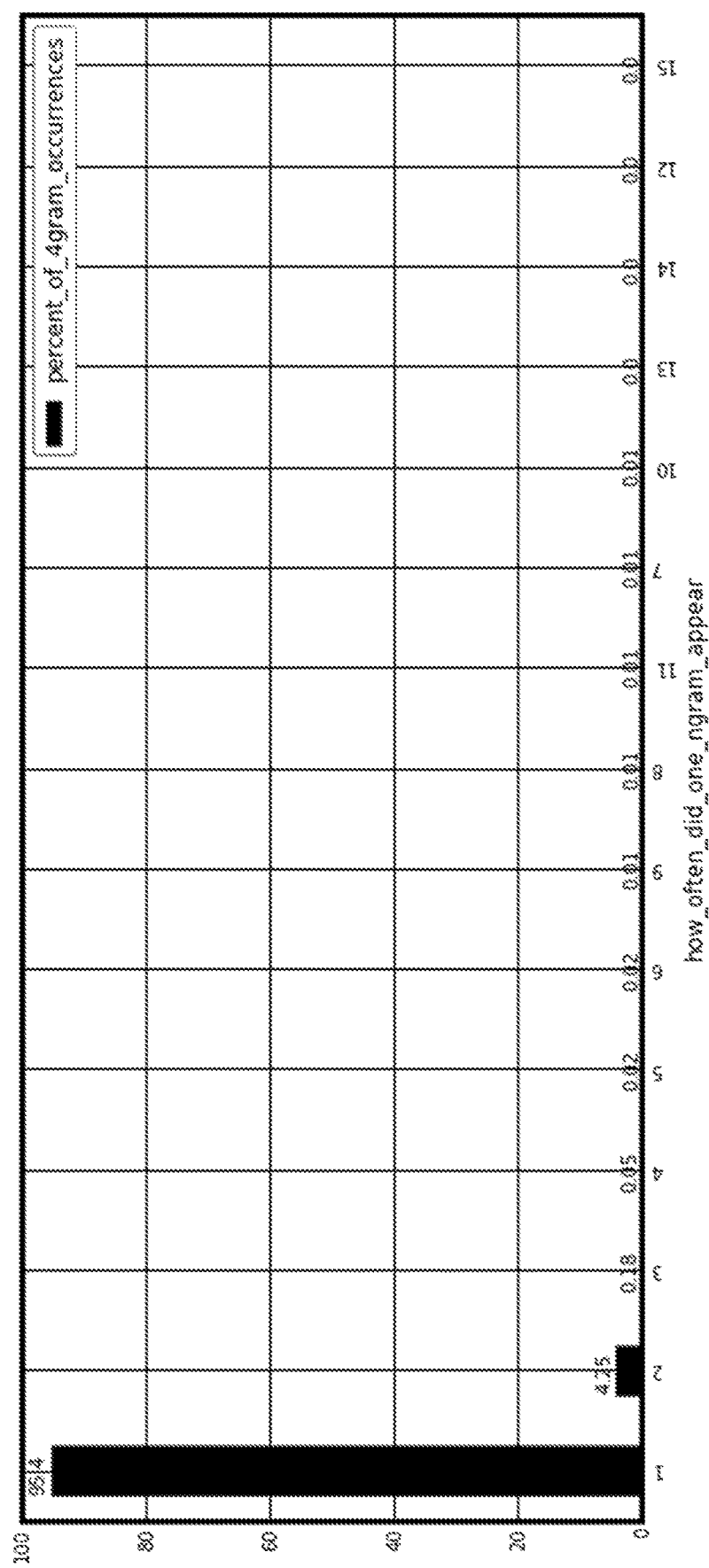
FIG. 21 is a chart of observed data, illustrating how often a sequence of four advertisements was broadcast.
Figure 22:
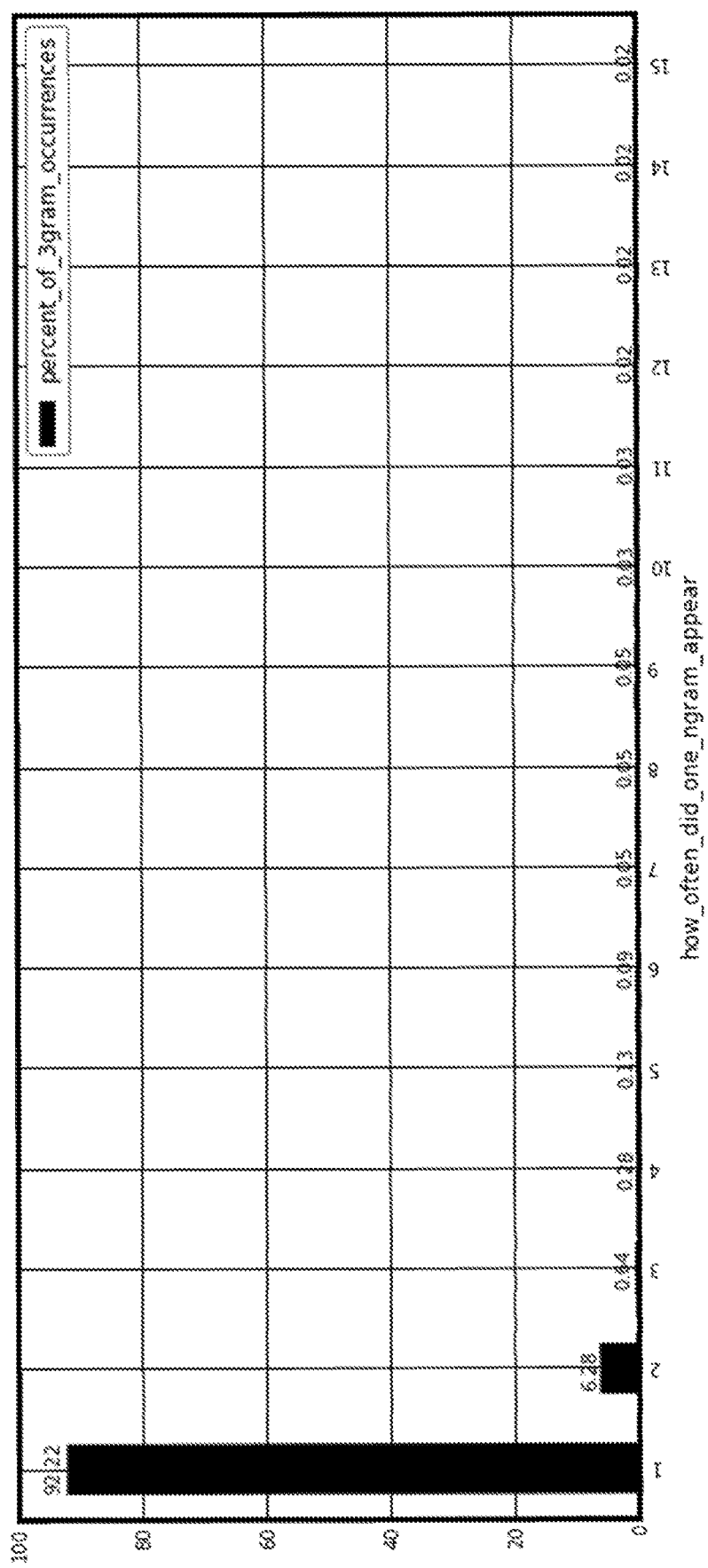
FIG. 22 is a chart of observed data, illustrating how often a sequence of three advertisements was broadcast.
Figure 23:
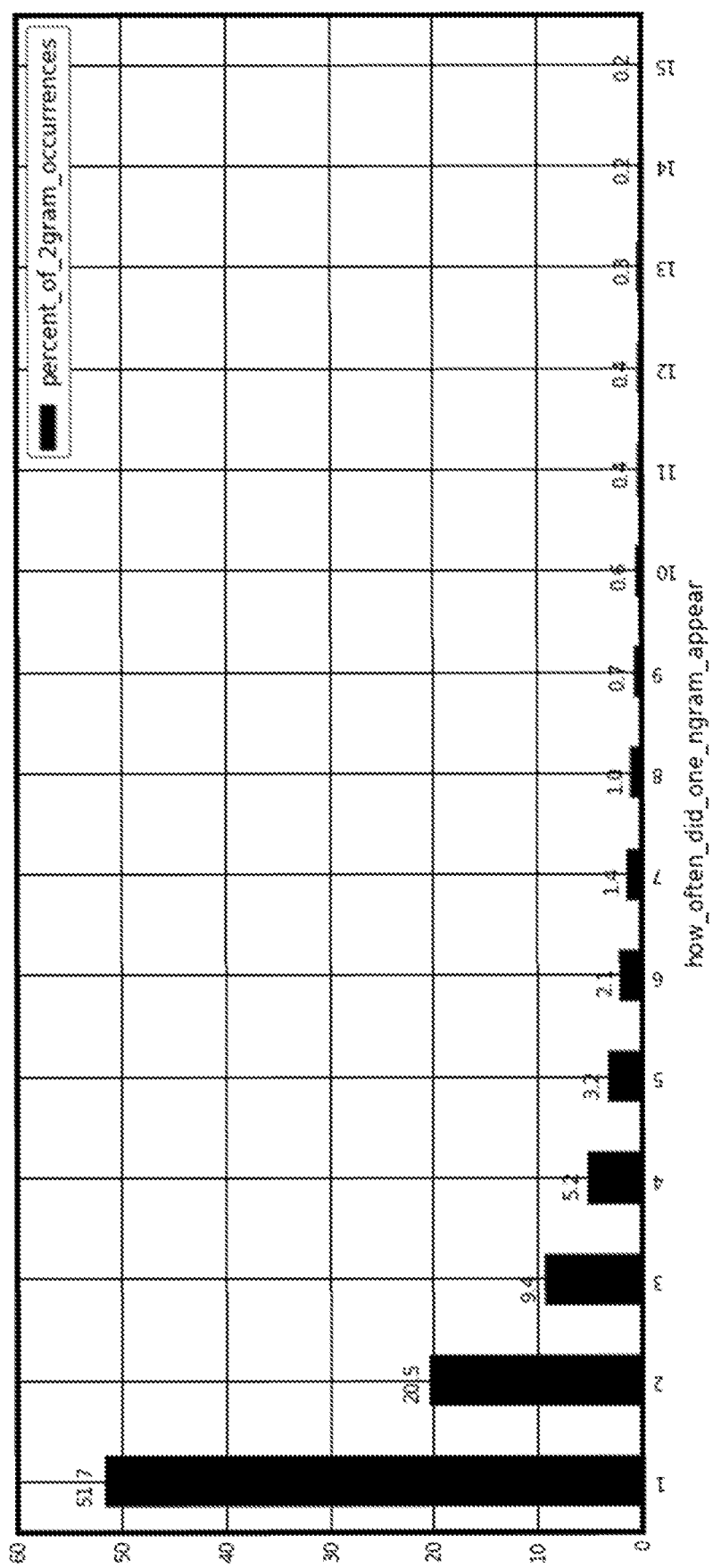
FIG. 23 is a chart of observed data, illustrating how often a sequence of two advertisements was broadcast.

As discussed above, FIG. 20 is a chart of observed data, illustrating how often a sequence of five advertisements was broadcast by multiple TV Networks 185, in multiple TV Distribution Media 180, in multiple locations. FIG. 21 is a chart of observed data, illustrating how often a sequence of four advertisements was broadcast by multiple TV Networks 185, in multiple TV Distribution Media 180, in multiple locations. FIG. 22 is a chart of observed data, illustrating how often a sequence of three advertisements was broadcast by multiple TV Networks 185, in multiple TV Distribution Media 180, in multiple locations. FIG. 23 is a chart of observed data, illustrating how often a sequence of two advertisements was broadcast by multiple TV Networks 185, in multiple TV Distribution Media 180, in multiple locations.

The above Detailed Description of embodiments is not intended to be exhaustive or to limit the disclosure to the precise form disclosed above. While specific embodiments of, and examples are described above for illustrative purposes, various equivalent modifications are possible within the scope of the system, as those skilled in the art will recognize. For example, while processes or blocks are presented in a given order, alternative embodiments may perform routines having operations, or employ systems having blocks, in a different order, and some processes or blocks may be deleted, moved, added, subdivided, combined, and/or modified. While processes or blocks are at times shown as being performed in series, these processes or blocks may instead be performed in parallel, or may be performed at different times. Further, any specific numbers noted herein are only examples; alternative implementations may employ differing values or ranges.

Following are examples of the foregoing disclosure.

EXAMPLE 1

An apparatus for computing, comprising: a computer processor, and a memory; and a television-type device monitoring module to determine a characteristic of a media content to associate with a television-type device, wherein to determine the characteristic of the media content to associate with the television-type device, the television-type device monitoring module is to obtain a report regarding a set of advertisements rendered by the television-type device, determine according to the report at least one reported sequence of advertisements in the set of advertisements rendered by the television-type device, perform a search for the at least one reported sequence of advertisements in a data structure of observed advertisement sequences, and determine, according to a result of the search, the characteristic of the media content to associate with the advertisement television-type device.

EXAMPLE 2

The apparatus according to Example 1, further comprising a video observation module to create the datastructure of observed advertisement sequences, wherein to create the datastructure of observed advertisement sequences, the video observation module is to receive a set of video content streams, wherein each video content stream in the set of video content streams is transmitted by a video broadcaster, determine a set of sequential content instances in each video content stream, determine a set of advertisement-including sequences in a sequential content instance in the set of sequential content instances, wherein each advertisement-including sequence in the set of advertisement-including sequences is determined to have a probability of being unique that is greater than a uniqueness threshold, and create the data structure of observed advertisement sequences comprising the set of advertisement-including sequences.

EXAMPLE 3

The apparatus according to Example 2, wherein the uniqueness threshold comprises at least one of i) two or more advertisements in a sequence or ii) when an advertisement-including sequence comprises an individual advertisement and a preceding and a following non-advertisement content.

EXAMPLE 4

The apparatus according to Example 3, wherein the sequence comprises two or more advertisements and a non-advertisement content.

EXAMPLE 5

The apparatus according to Example 2, wherein the video content streams are received from at least one of an Internet-based video streaming service, a terrestrial television broadcaster, a satellite television broadcaster, and a cable television broadcaster.

EXAMPLE 6

The apparatus according to Example 5, wherein the video content streams are transmitted in television channels in designated market areas.

EXAMPLE 7

The apparatus according to Example 2, wherein determine the set of advertisement-including sequences in the sequential content instance comprises determine a first advertisement and a set of subsequent advertisements in each advertisement-including sequence, subsequent to the first advertisement, wherein each advertisement in the set of subsequent advertisements occurs within a time interval of an end of a previous advertisement in each advertisement-including sequence.

EXAMPLE 8

The apparatus according to Example 7, wherein the time interval is at least one of i) between 115 and 130 seconds or ii) is selected based on at least one of the video broadcaster, a television channel, or a time of day.

EXAMPLE 9

The apparatus according to Example 2, wherein create the data structure of observed advertisement sequences comprising the set of advertisement-including sequences comprises create a set of chronological tree structures, wherein a chronological tree structure in the set of chronological tree structures encodes a chronology and identity of advertisements and non-advertisement content in an advertisement-including sequence, and create an index of the set of chronological tree structures.

EXAMPLE 10

The apparatus according to Example 9, wherein the chronological tree structure comprises a trie.

EXAMPLE 11

The apparatus according to Example 1, wherein the report regarding the set of advertisements rendered by the television-type device comprises a set of advertisement identifiers and a set of render time indicators and wherein to determine at least one reported sequence of advertisements in the set of advertisements rendered by the television-type device comprises to arrange the set of advertisement identifiers chronologically according to the set of render time indicators to create one or more reported advertisement sequences.

EXAMPLE 12

The apparatus according to Example 11, wherein the television-type device monitoring module is further to associate an advertisement family identifier with a subset of specific advertisement identifiers in the set of advertisement identifiers.

EXAMPLE 13

The apparatus according to Example 12, wherein the television-type device monitoring module is to associate the advertisement family identifier with the subset of specific advertisement identifiers in the set of advertisement identifiers when the television-type device monitoring module determines that the specific advertisement identifiers share a common portion and when a combined time-span of the specific advertisement identifiers corresponds to a time-span of the advertisement family identifier.

EXAMPLE 14

The apparatus according to Example 11, wherein more than one advertisement identifier in the set of advertisement identifiers is associated with an overlapping time indicator in the set of render time indicators and wherein the television-type device monitoring module is further to create more than one sequence of advertisements, one for each of the more than one advertisement identifier in the set of advertisement identifiers associated with the overlapping time indicator in the set of render time indicators.

EXAMPLE 15

The apparatus according to Example 9, wherein to perform the search for the at least one reported sequence of advertisements in a data structure of observed advertisement sequences comprises to search the index of the set of chronological tree structures for the at least one reported sequence of advertisements, wherein the result of the search comprises the advertisement-including sequence, and wherein the television-type device monitoring module is further to determine the characteristic of the media content to associate with the advertisement television-type device according to the characteristic of the media content associated with the advertisement-including sequence.

EXAMPLE 16

The apparatus according to Example 15, wherein the characteristic of the media content comprises at least one of a day-time, a broadcaster, a local/national categorization, whether the reported chronological tree structure comprised an advertisement family identifier or a specific advertisement identifier, a schedule identifier, a channel identifier, an advertisement slot identifier, a first-time-airing identifier, and a temporal rating.

EXAMPLE 17

The apparatus according to Example 1, wherein the television-type device monitoring module is further to determine a confidence with respect to the result of the search, wherein the confidence with respect to the result of the search increases when the result of the search comprises a match greater than a threshold between the data structure of observed advertisement sequences and the at least one reported sequence of advertisements.

EXAMPLE 18

The apparatus according to any one or more of Example 2 to Example 17, wherein the threshold comprises two or more advertisements in common between the at least one reported sequence of advertisements and the result of the search, wherein the result of the search comprises an advertisement-including sequence in the set of advertisement-including sequences.

EXAMPLE 19

The apparatus according to Example 2, wherein the television-type device monitoring module is further to determine a gap in the at least one reported sequence of advertisements and wherein the television-type device monitoring module is further to fill the gap with an advertisement from the result of the search, wherein the result of the search comprises an advertisement-including sequence in the set of advertisement-including sequences.

EXAMPLE 20

The apparatus according to Example 19, wherein the television-type device monitoring module is to fill the gap when the gap comprises at least one of less than a threshold number of missing advertisements or an observed advertisement with a known poor reported detection rate.

EXAMPLE 21

The apparatus according to Example 1, further comprising a cluster determination module to determine whether the at least one reported sequence of advertisements was rendered live contemporaneous with a broadcast, wherein to determine whether the at least one reported sequence of advertisements was rendered live contemporaneous with the broadcast comprises to determine whether the at least one reported sequence of advertisements was reported by more than a threshold number of television-type devices within a time period according to agglomerative clustering.

EXAMPLE 22

The apparatus according to Example 2, wherein the television-type device monitoring module is further to determine that an advertisement in the report regarding the set of advertisements rendered by the television-type device is not in the result of the search and is to find a related advertisement in the set of sequential content instances in each video content stream.

EXAMPLE 23

The apparatus according to Example 22, wherein the related advertisement is in a same advertisement family as the advertisement not in the result of the search and was broadcast at similar time and on a same channel.

EXAMPLE 24

An apparatus for computing, comprising: a computer processor, and a memory; and a video observation module to create a datastructure of observed advertisement sequences, wherein to create the datastructure of observed advertisement sequences, the video observation module is to receive a set of video content streams, wherein each video content stream in the set of video content streams is transmitted by a video broadcaster, determine a set of sequential content instances in each video content stream, determine a set of advertisement-including sequences in a sequential content instance in the set of sequential content instances, wherein each advertisement-including sequence in the set of advertisement-including sequences is determined to have a probability of being unique that is greater than a uniqueness threshold, and create the data structure of observed advertisement sequences comprising the set of advertisement-including sequences.

EXAMPLE 25

A computer implemented method, comprising: obtaining a report regarding a set of advertisements rendered by a television-type device, determining according to the report at least one reported sequence of advertisements in the set of advertisements rendered by the television-type device, performing a search for the at least one reported sequence of advertisements in a data structure of observed advertisement sequences, and determining, according to a result of the search, a characteristic of a media content to associate with the advertisement television-type device.

EXAMPLE 26

The method according to Example 25, further comprising creating the datastructure of observed advertisement sequences by receiving a set of video content streams, wherein each video content stream in the set of video content streams is transmitted by a video broadcaster, determining a set of sequential content instances in each video content stream, determining a set of advertisement-including sequences in a sequential content instance in the set of sequential content instances, wherein each advertisement-including sequence in the set of advertisement-including sequences is determined to have a probability of being unique that is greater than a uniqueness threshold, and creating the data structure of observed advertisement sequences comprising the set of advertisement-including sequences.

EXAMPLE 27

The method according to Example 26, wherein the uniqueness threshold comprises at least one of i) two or more advertisements in a sequence or ii) when an advertisement-including sequence comprises an individual advertisement and a preceding and a following non-advertisement content.

EXAMPLE 28

The method according to Example 27, wherein the sequence comprises two or more advertisements and a non-advertisement content.

EXAMPLE 29

The method according to Example 26, further comprising receiving the video content streams from at least one of an Internet-based video streaming service, a terrestrial television broadcaster, a satellite television broadcaster, and a cable television broadcaster.

EXAMPLE 30

The method according to Example 29, further comprising receiving the video content streams as transmitted in television channels in designated market areas.

EXAMPLE 31

The method according to Example 26, wherein determining the set of advertisement-including sequences in the sequential content instance comprises determining a first advertisement and a set of subsequent advertisements in each advertisement-including sequence, subsequent to the first advertisement, wherein each advertisement in the set of subsequent advertisements occurs within a time interval of an end of a previous advertisement in each advertisement-including sequence.

EXAMPLE 32

The method according to Example 31, wherein the time interval is at least one of i) between 115 and 130 seconds or ii) is selected based on at least one of the video broadcaster, a television channel, or a time of day.

EXAMPLE 33

The method according to Example 26, wherein creating the data structure of observed advertisement sequences comprising the set of advertisement-including sequences further comprises creating a set of chronological tree structures, wherein a chronological tree structure in the set of chronological tree structures encodes a chronology and identity of advertisements and non-advertisement content in an advertisement-including sequence, and creating an index of the set of chronological tree structures.

EXAMPLE 34

The method according to Example 33, wherein the chronological tree structure comprises a trie.

EXAMPLE 35

The method according to Example 25, wherein the report regarding the set of advertisements rendered by the television-type device comprises a set of advertisement identifiers and a set of render time indicators and wherein determining at least one reported sequence of advertisements in the set of advertisements rendered by the television-type device comprises arranging the set of advertisement identifiers chronologically according to the set of render time indicators to create one or more reported advertisement sequences.

EXAMPLE 36

The method according to Example 35, further comprising associating an advertisement family identifier with a subset of specific advertisement identifiers in the set of advertisement identifiers.

EXAMPLE 37

The method according to Example 36, further comprising associating the advertisement family identifier with the subset of specific advertisement identifiers in the set of advertisement identifiers after determining that the specific advertisement identifiers share a common portion and that a combined time-span of the specific advertisement identifiers corresponds to a time-span of the advertisement family identifier.

EXAMPLE 38

The method according to Example 35, wherein more than one advertisement identifier in the set of advertisement identifiers is associated with an overlapping time indicator in the set of render time indicators and further comprising creating more than one sequence of advertisements, one for each of the more than one advertisement identifier in the set of advertisement identifiers associated with the overlapping time indicator in the set of render time indicators.

EXAMPLE 39

The method according to Example 33, wherein performing the search for the at least one reported sequence of advertisements in a data structure of observed advertisement sequences comprises searching the index of the set of chronological tree structures for the at least one reported sequence of advertisements, wherein the result of the search comprises the advertisement-including sequence, and further comprising determining the characteristic of the media content to associate with the advertisement television-type device according to the characteristic of the media content associated with the advertisement-including sequence.

EXAMPLE 40

The method according to Example 39, wherein the characteristic of the media content comprises at least one of a day-time, a broadcaster, a local/national categorization, whether the reported chronological tree structure comprised an advertisement family identifier or a specific advertisement identifier, a schedule identifier, a channel identifier, an advertisement slot identifier, a first-time-airing identifier, and a temporal rating.

EXAMPLE 41

The method according to Example 25, further comprising determining a confidence with respect to the result of the search, wherein the confidence with respect to the result of the search increases when the result of the search comprises a match greater than a threshold between the data structure of observed advertisement sequences and the at least one reported sequence of advertisements.

EXAMPLE 42

The method according to any one or more of Example 26 to Example 41, wherein the threshold comprises two or more advertisements in common between the at least one reported sequence of advertisements and the result of the search, wherein the result of the search comprises an advertisement-including sequence in the set of advertisement-including sequences.

EXAMPLE 43

The method according to Example 26, further comprising determining a gap in the at least one reported sequence of advertisements and filling the gap with an advertisement from the result of the search, wherein the result of the search comprises an advertisement-including sequence in the set of advertisement-including sequences.

EXAMPLE 44

The method according to Example 43, further comprising filling the gap when the gap comprises at least one of less than a threshold number of missing advertisements or an observed advertisement with a known poor reported detection rate.

EXAMPLE 45

The method according to Example 25, further comprising determining whether the at least one reported sequence of advertisements was rendered live contemporaneous with a broadcast by determining whether the at least one reported sequence of advertisements was reported by more than a threshold number of television-type devices within a time period according to agglomerative clustering.

EXAMPLE 46

The method according to Example 26, further comprising determining that an advertisement in the report regarding the set of advertisements rendered by the television-type device is not in the result of the search and finding a related advertisement in the set of sequential content instances in each video content stream.

EXAMPLE 47

The method according to Example 46, wherein the related advertisement is in a same advertisement family as the advertisement not in the result of the search and was broadcast at similar time and on a same channel.

EXAMPLE 48

An apparatus for computing, comprising: means to obtain a report regarding a set of advertisements rendered by the television-type device, means to determine according to the report at least one reported sequence of advertisements in the set of advertisements rendered by the television-type device, means to perform a search for the at least one reported sequence of advertisements in a data structure of observed advertisement sequences, and means to determine, according to a result of the search, a characteristic of the media content to associate with the advertisement television-type device.

EXAMPLE 49

The apparatus according to Example 48, further comprising means to create the datastructure of observed advertisement sequences, wherein means to create the datastructure of observed advertisement sequences comprises means to receive a set of video content streams, wherein each video content stream in the set of video content streams is transmitted by a video broadcaster, means to determine a set of sequential content instances in each video content stream, means to determine a set of advertisement-including sequences in a sequential content instance in the set of sequential content instances, wherein each advertisement-including sequence in the set of advertisement-including sequences is determined to have a probability of being unique that is greater than a uniqueness threshold, and means to create the data structure of observed advertisement sequences comprising the set of advertisement-including sequences.

EXAMPLE 50

The apparatus according to Example 49, wherein the uniqueness threshold comprises at least one of i) two or more advertisements in a sequence or ii) when an advertisement-including sequence comprises an individual advertisement and a preceding and a following non-advertisement content.

EXAMPLE 51

The apparatus according to Example 50, wherein the sequence comprises two or more advertisements and a non-advertisement content.

EXAMPLE 52

The apparatus according to Example 49, further comprising means to receive the video content streams from at least one of an Internet-based video streaming service, a terrestrial television broadcaster, a satellite television broadcaster, and a cable television broadcaster.

EXAMPLE 53

The apparatus according to Example 52, further comprising means to receive the video content streams in television channels in designated market areas.

EXAMPLE 54

The apparatus according to Example 49, wherein means to determine the set of advertisement-including sequences in the sequential content instance comprises means to determine a first advertisement and a set of subsequent advertisements in each advertisement-including sequence, subsequent to the first advertisement, wherein each advertisement in the set of subsequent advertisements occurs within a time interval of an end of a previous advertisement in each advertisement-including sequence.

EXAMPLE 55

The apparatus according to Example 55, wherein the time interval is at least one of i) between 115 and 130 seconds or ii) is selected based on at least one of the video broadcaster, a television channel, or a time of day.

EXAMPLE 56

The apparatus according to Example 49, wherein means to create the data structure of observed advertisement sequences comprising the set of advertisement-including sequences comprises means to create a set of chronological tree structures, wherein a chronological tree structure in the set of chronological tree structures encodes a chronology and identity of advertisements and non-advertisement content in an advertisement-including sequence, and means to create an index of the set of chronological tree structures.

EXAMPLE 57

The apparatus according to Example 56, wherein the chronological tree structure comprises a trie.

EXAMPLE 58

The apparatus according to Example 48, wherein the report regarding the set of advertisements rendered by the television-type device comprises a set of advertisement identifiers and a set of render time indicators and wherein means to determine at least one reported sequence of advertisements in the set of advertisements rendered by the television-type device comprises means to arrange the set of advertisement identifiers chronologically according to the set of render time indicators to create one or more reported advertisement sequences.

EXAMPLE 59

The apparatus according to Example 58, wherein further comprising means to associate an advertisement family identifier with a subset of specific advertisement identifiers in the set of advertisement identifiers.

EXAMPLE 60

The apparatus according to Example 59, further comprising means to determine that the specific advertisement identifiers share a common portion and that a combined time-span of the specific advertisement identifiers corresponds to a time-span of the advertisement family identifier and means to then associate the advertisement family identifier with the subset of specific advertisement identifiers in the set of advertisement identifiers.

EXAMPLE 61

The apparatus according to Example 58, wherein more than one advertisement identifier in the set of advertisement identifiers is associated with an overlapping time indicator in the set of render time indicators and further comprising means to create more than one sequence of advertisements, one for each of the more than one advertisement identifier in the set of advertisement identifiers associated with the overlapping time indicator in the set of render time indicators.

EXAMPLE 62

The apparatus according to Example 56, wherein means to perform the search for the at least one reported sequence of advertisements in the data structure of observed advertisement sequences comprises means to search the index of the set of chronological tree structures for the at least one reported sequence of advertisements, wherein the result of the search comprises the advertisement-including sequence, and further comprising means to determine the characteristic of the media content to associate with the advertisement television-type device according to the characteristic of the media content associated with the advertisement-including sequence.

EXAMPLE 63

The apparatus according to Example 62, wherein the characteristic of the media content comprises at least one of a day-time, a broadcaster, a local/national categorization, whether the reported chronological tree structure comprised an advertisement family identifier or a specific advertisement identifier, a schedule identifier, a channel identifier, an advertisement slot identifier, a first-time-airing identifier, and a temporal rating.

EXAMPLE 64

The apparatus according to Example 48, further comprising means to determine a confidence with respect to the result of the search, wherein the confidence with respect to the result of the search increases when the result of the search comprises a match greater than a threshold between the data structure of observed advertisement sequences and the at least one reported sequence of advertisements.

EXAMPLE 65

The apparatus according to any one or more of Example 49 to Example 64, wherein the threshold comprises two or more advertisements in common between the at least one reported sequence of advertisements and the result of the search, wherein the result of the search comprises an advertisement-including sequence in the set of advertisement-including sequences.

EXAMPLE 66

The apparatus according to Example 49, further comprising means to determine a gap in the at least one reported sequence of advertisements and means to fill the gap with an advertisement from the result of the search, wherein the result of the search comprises an advertisement-including sequence in the set of advertisement-including sequences.

EXAMPLE 67

The apparatus according to Example 66, further comprising means to fill the gap when the gap comprises at least one of less than a threshold number of missing advertisements or an observed advertisement with a known poor reported detection rate.

EXAMPLE 68

The apparatus according to Example 48, further comprising means to determine whether the at least one reported sequence of advertisements was rendered live contemporaneous with a broadcast, wherein means to determine whether the at least one reported sequence of advertisements was rendered live contemporaneous with the broadcast comprises means to determine whether the at least one reported sequence of advertisements was reported by more than a threshold number of television-type devices within a time period according to agglomerative clustering.

EXAMPLE 69

The apparatus according to Example 49, further comprising means to determine that an advertisement in the report regarding the set of advertisements rendered by the television-type device is not in the result of the search and means to find a related advertisement in the set of sequential content instances in each video content stream.

EXAMPLE 70

The apparatus according to Example 69, wherein the related advertisement is in a same advertisement family as the advertisement not in the result of the search and was broadcast at similar time and on a same channel.

EXAMPLE 71

One or more non-transient computer-readable media comprising instructions that cause a computer device, in response to execution of the instructions by a processor of the computer device, to: obtain a report regarding a set of advertisements rendered by a television-type device; determine according to the report at least one reported sequence of advertisements in the set of advertisements rendered by the television-type device; perform a search for the at least one reported sequence of advertisements in a data structure of observed advertisement sequences; and determine, according to a result of the search, a characteristic of a media content to associate with the advertisement television-type device.

EXAMPLE 72

The computer-readable media according to Example 71, wherein the instructions are further to cause the processor to receive a set of video content streams, wherein each video content stream in the set of video content streams is transmitted by a video broadcaster, determine a set of sequential content instances in each video content stream, determine a set of advertisement-including sequences in a sequential content instance in the set of sequential content instances, wherein each advertisement-including sequence in the set of advertisement-including sequences is determined to have a probability of being unique that is greater than a uniqueness threshold, and create the data structure of observed advertisement sequences comprising the set of advertisement-including sequences.

EXAMPLE 73

The computer-readable media according to Example 72, wherein the uniqueness threshold comprises at least one of i) two or more advertisements in a sequence or ii) when an advertisement-including sequence comprises an individual advertisement and a preceding and a following non-advertisement content.

EXAMPLE 74

The computer-readable media according to Example 73, wherein the sequence comprises two or more advertisements and a non-advertisement content.

EXAMPLE 75

The computer-readable media according to Example 72, wherein the video content streams are received from at least one of an Internet-based video streaming service, a terrestrial television broadcaster, a satellite television broadcaster, and a cable television broadcaster.

EXAMPLE 76

The computer-readable media according to Example 75, wherein the video content streams are transmitted in television channels in designated market areas.

EXAMPLE 77

The computer-readable media according to Example 72, wherein to determine the set of advertisement-including sequences in the sequential content instance comprises to determine a first advertisement and a set of subsequent advertisements in each advertisement-including sequence, subsequent to the first advertisement, wherein each advertisement in the set of subsequent advertisements occurs within a time interval of an end of a previous advertisement in each advertisement-including sequence.

EXAMPLE 78

The computer-readable media according to Example 77, wherein the time interval is at least one of i) between 115 and 130 seconds or ii) is selected based on at least one of the video broadcaster, a television channel, or a time of day.

EXAMPLE 79

The computer-readable media according to Example 72, wherein to create the data structure of observed advertisement sequences comprising the set of advertisement-including sequences comprises instructions to cause the processor to create a set of chronological tree structures, wherein a chronological tree structure in the set of chronological tree structures encodes a chronology and identity of advertisements and non-advertisement content in an advertisement-including sequence, and to create an index of the set of chronological tree structures.

EXAMPLE 80

The computer-readable media according to Example 79, wherein the chronological tree structure comprises a trie.

EXAMPLE 81

The computer-readable media according to Example 71, wherein the report regarding the set of advertisements rendered by the television-type device comprises a set of advertisement identifiers and a set of render time indicators and wherein to determine at least one reported sequence of advertisements in the set of advertisements rendered by the television-type device comprises instructions to cause the processor to arrange the set of advertisement identifiers chronologically according to the set of render time indicators to create one or more reported advertisement sequences.

EXAMPLE 82

The computer-readable media according to Example 81, further comprising instructions to cause the processor to associate an advertisement family identifier with a subset of specific advertisement identifiers in the set of advertisement identifiers.

EXAMPLE 83

The computer-readable media according to Example 82, further comprising instructions to cause the process to associate the advertisement family identifier with the subset of specific advertisement identifiers in the set of advertisement identifiers when the specific advertisement identifiers share a common portion and when a combined time-span of the specific advertisement identifiers corresponds to a time-span of the advertisement family identifier.

EXAMPLE 84

The computer-readable media according to Example 81, wherein more than one advertisement identifier in the set of advertisement identifiers is associated with an overlapping time indicator in the set of render time indicators and further comprising instructions to cause the processor to create more than one sequence of advertisements, one for each of the more than one advertisement identifier in the set of advertisement identifiers associated with the overlapping time indicator in the set of render time indicators.

EXAMPLE 85

The computer-readable media according to Example 79, wherein to perform the search for the at least one reported sequence of advertisements in a data structure of observed advertisement sequences comprises instructions to cause the processor to search the index of the set of chronological tree structures for the at least one reported sequence of advertisements, wherein the result of the search comprises the advertisement-including sequence, and to determine the characteristic of the media content to associate with the advertisement television-type device according to the characteristic of the media content associated with the advertisement-including sequence.

EXAMPLE 86

The computer-readable media according to Example 15, wherein the characteristic of the media content comprises at least one of a day-time, a broadcaster, a local/national categorization, whether the reported chronological tree structure comprised an advertisement family identifier or a specific advertisement identifier, a schedule identifier, a channel identifier, an advertisement slot identifier, a first-time-airing identifier, and a temporal rating.

EXAMPLE 87

The computer-readable media according to Example 71, further comprising instructions to cause the processor to determine a confidence with respect to the result of the search, wherein the confidence with respect to the result of the search increases when the result of the search comprises a match greater than a threshold between the data structure of observed advertisement sequences and the at least one reported sequence of advertisements.

EXAMPLE 88

The computer-readable media according to any one or more of Example 72 to Example 87, wherein the threshold comprises two or more advertisements in common between the at least one reported sequence of advertisements and the result of the search, wherein the result of the search comprises an advertisement-including sequence in the set of advertisement-including sequences.

EXAMPLE 89

The computer-readable media according to Example 72, further comprising instructions to cause the process to determine a gap in the at least one reported sequence of advertisements and to fill the gap with an advertisement from the result of the search, wherein the result of the search comprises an advertisement-including sequence in the set of advertisement-including sequences.

EXAMPLE 90

The computer-readable media according to Example 89, further comprising instructions to cause the processor to fill the gap when the gap comprises at least one of less than a threshold number of missing advertisements or an observed advertisement with a known poor reported detection rate.

EXAMPLE 91

The computer-readable media according to Example 71, further comprising instructions to cause the processor to determine whether the at least one reported sequence of advertisements was rendered live contemporaneous with a broadcast, wherein to determine whether the at least one reported sequence of advertisements was rendered live contemporaneous with the broadcast comprises to determine whether the at least one reported sequence of advertisements was reported by more than a threshold number of television-type devices within a time period according to agglomerative clustering.

EXAMPLE 92

The computer-readable media according to Example 72, further comprising instructions to cause the processor to determine that an advertisement in the report regarding the set of advertisements rendered by the television-type device is not in the result of the search and to find a related advertisement in the set of sequential content instances in each video content stream.

EXAMPLE 93

The computer-readable media according to Example 92, wherein the related advertisement is in a same advertisement family as the advertisement not in the result of the search and was broadcast at similar time and on a same channel.

The invention claimed is:

1. A server computing device, comprising:
   a processor; and
   a server memory coupled with the processor via a network interface, wherein the memory includes a permanent mass storage device that stores a program code for
   a television-type device monitoring routine, wherein the routine, when called by the processor via the network interface and executed by the processor, is to:
   determine a characteristic of a media content to associate with a television-type device, wherein to determine the characteristic of the media content to associate with the television-type device, the routine is to:
   obtain a report regarding a set of advertisements rendered by the television-type device;
   determine according to the report at least one reported sequence of advertisements in the set of advertisements rendered by the television-type device;
   perform a search for the at least one reported sequence of advertisements in a data structure of observed advertisement sequences;
   determine, according to a result of the search, the characteristic of the media content to associate with the television-type device; and
   store the characteristic of the media content associated with the television-type device in the server memory, for further processing by the server computing device.

2. The apparatus according to claim 1, further comprising a video observation routine to create the datastructure of observed advertisement sequences, wherein to create the datastructure of observed advertisement sequences, the video observation routine, when called by the processor via the network interface and executed by the processor, is to:

receive a set of video content streams, wherein each video content stream in the set of video content streams is transmitted by a video broadcaster;

determine a set of sequential content instances in each video content stream;

determine a set of advertisement-including sequences in a sequential content instance in the set of sequential content instances, wherein each advertisement-including sequence in the set of advertisement-including sequences is determined to have a probability of being unique that is greater than a uniqueness threshold; and create the data structure of observed advertisement sequences comprising the set of advertisement-including sequences.

3. The apparatus according to claim 1, wherein the report regarding the set of advertisements rendered by the television-type device comprises a set of advertisement identifiers and a set of render time indicators and wherein to determine at least one reported sequence of advertisements in the set of advertisements rendered by the television-type device includes to arrange the set of advertisement identifiers chronologically according to the set of render time indicators to create one or more reported advertisement sequences.

4. The apparatus according to claim 1, further comprising a cluster determination routine to determine whether the at least one reported sequence of advertisements was rendered live contemporaneous with a broadcast, wherein the routine, when called by the processor via the network interface and executed by the processor, is to determine whether the at least one reported sequence of advertisements was rendered live contemporaneous with the broadcast, which includes to determine whether the at least one reported sequence of advertisements was reported by more than a threshold number of television-type devices within a time period according to agglomerative clustering.

5. The apparatus according to claim 2, wherein the uniqueness threshold comprises at least one of i) two or more advertisements in a sequence or ii) when an advertisement-including sequence comprises an individual advertisement and a preceding and a following non-advertisement content.

6. The apparatus according to claim 2, wherein determine the set of advertisement-including sequences in the sequential content instance includes to determine a first advertisement and a set of subsequent advertisements in each advertisement-including sequence, subsequent to the first advertisement, wherein each advertisement in the set of subsequent advertisements occurs within a time interval of a previous advertisement in each advertisement-including sequence.

7. The apparatus according to claim 2, wherein to create the data structure of observed advertisement sequences comprising the set of advertisement-including sequences includes to:

create a set of chronological tree structures, wherein a chronological tree structure in the set of chronological tree structures encodes a chronology and identity of advertisements and non-advertisement content in an advertisement-including sequence; and create an index of the set of chronological tree structures.

8. The apparatus according to claim 7, wherein to perform the search for the at least one reported sequence of advertisements in a data structure of observed advertisement sequences includes to search the index of the set of chronological tree structures for the at least one reported sequence of advertisements, wherein the result of the search comprises the advertisement-including sequence, and wherein the television-type device monitoring routine is further to determine the characteristic of the media content to associate with the television-type device according to the characteristic of the media content associated with the advertisement-including sequence, wherein the characteristic of the media content comprises at least one of a day-time, a broadcaster, a local/national categorization, whether the reported chronological tree structure comprised an advertisement family identifier or a specific advertisement identifier, a schedule identifier, a channel identifier, an advertisement slot identifier, a first-time-airing identifier, and a temporal rating.

9. A computer implemented method, comprising:

obtaining a report regarding a set of advertisements rendered by a television-type device, determining according to the report at least one reported sequence of advertisements in the set of advertisements rendered by the television-type device, performing a search for the at least one reported sequence of advertisements in a data structure of observed advertisement sequences, and determining, according to a result of the search, a characteristic of a media content to associate with the television-type device.

10. The method according to claim 9, further comprising creating the datastructure of observed advertisement sequences by receiving a set of video content streams, wherein each video content stream in the set of video content streams is transmitted by a video broadcaster, determining a set of sequential content instances in each video content stream, determining a set of advertisement-including sequences in a sequential content instance in the set of sequential content instances, wherein each advertisement-including sequence in the set of advertisement-including sequences is determined to have a probability of being unique that is greater than a uniqueness threshold, and creating the data structure of observed advertisement sequences comprising the set of advertisement-including sequences.

11. The method according to claim 9, wherein the report regarding the set of advertisements rendered by the television-type device comprises a set of advertisement identifiers and a set of render time indicators and wherein determining at least one reported sequence of advertisements in the set of advertisements rendered by the television-type device comprises arranging the set of advertisement identifiers chronologically according to the set of render time indicators to create one or more reported advertisement sequences and further comprising associating an advertisement family identifier with a subset of specific advertisement identifiers in the set of advertisement identifiers after determining that the specific advertisement identifiers share a common portion and that a combined time-span of the specific advertisement identifiers corresponds to a time-span of the advertisement family identifier.

12. The method according to claim 9, further comprising determining whether the at least one reported sequence of advertisements was rendered live contemporaneous with a broadcast by determining whether the at least one reported sequence of advertisements was reported by more than a threshold number of television-type devices within a time period according to agglomerative clustering.

13. The method according to claim 10, wherein the uniqueness threshold comprises at least one of i) two or more advertisements in a sequence or ii) when an advertisement-including sequence comprises an individual advertisement and a preceding and a following non-advertisement content.

14. The method according to claim 10, wherein determining the set of advertisement-including sequences in the sequential content instance comprises determining a first advertisement and a set of subsequent advertisements in each advertisement-including sequence, subsequent to the first advertisement, wherein each advertisement in the set of subsequent advertisements occurs within a time interval of a previous advertisement in each advertisement-including sequence.

15. The method according to claim 10, wherein creating the data structure of observed advertisement sequences comprising the set of advertisement-including sequences further comprises creating a set of chronological tree structures, wherein a chronological tree structure in the set of chronological tree structures encodes a chronology and identity of advertisements and non-advertisement content in an advertisement-including sequence, and creating an index of the set of chronological tree structures.

16. The method according to claim 15, wherein performing the search for the at least one reported sequence of advertisements in a data structure of observed advertisement sequences comprises searching the index of the set of chronological tree structures for the at least one reported sequence of advertisements, wherein the result of the search comprises the advertisement-including sequence, and further comprising determining the characteristic of the media content to associate with the television-type device according to the characteristic of the media content associated with the advertisement-including sequence, wherein the characteristic of the media content comprises at least one of a day-time, a broadcaster, a local/national categorization, whether the reported chronological tree structure comprised an advertisement family identifier or a specific advertisement identifier, a schedule identifier, a channel identifier, an advertisement slot identifier, a first-time-airing identifier, and a temporal rating.

17. A non-transitory computing device-readable storage medium having instructions stored thereon that, in response to execution on a computing device, cause the computing device to:
  obtain a report regarding a set of advertisements rendered by a television-type device;
  determine, according to the report, at least one reported sequence of advertisements in the set of advertisements rendered by the television-type device;
  perform a search for the at least one reported sequence of advertisements in a data structure of observed advertisement sequences, and
  determine, according to a result of the search, a characteristic of a media content to associate with the television-type device.

18. The non-transitory computing device-readable storage medium of claim 17, wherein the instructions further cause the computing device to:
  create the datastructure of observed advertisement sequences by receiving a set of video content streams, wherein each video content stream in the set of video content streams is transmitted by a video broadcaster;
  determine a set of sequential content instances in each video content stream;
  determine a set of advertisement-including sequences in a sequential content instance in the set of sequential content instances, wherein each advertisement-including sequence in the set of advertisement-including sequences is determined to have a probability of being unique that is greater than a uniqueness threshold; and
  create the data structure of observed advertisement sequences comprising the set of advertisement-including sequences.

19. The non-transitory computing device-readable storage medium of claim 17, wherein the report regarding the set of advertisements rendered by the television-type device comprises a set of advertisement identifiers and a set of render time indicators and wherein the instructions that cause the computing device to determine at least one reported sequence of advertisements in the set of advertisements rendered by the television-type device further cause the computing device to arrange the set of advertisement identifiers chronologically according to the set of render time indicators to create one or more reported advertisement sequences, and wherein the instructions further cause the computing device to associate an advertisement family identifier with a subset of specific advertisement identifiers in the set of advertisement identifiers after determining that the specific advertisement identifiers share a common portion and that a combined time-span of the specific advertisement identifiers corresponds to a time-span of the advertisement family identifier.

20. The non-transitory computing device-readable storage medium of claim 17, wherein the instructions further cause the computing device to determine whether the at least one reported sequence of advertisements was rendered live contemporaneous with a broadcast by determining whether the at least one reported sequence of advertisements was reported by more than a threshold number of television-type devices within a time period according to agglomerative clustering.

21. The non-transitory computing device-readable storage medium of claim 18, wherein the uniqueness threshold comprises at least one of i) two or more advertisements in a sequence or ii) when an advertisement-including sequence comprises an individual advertisement and a preceding and a following non-advertisement content.

22. The non-transitory computing device-readable storage medium of claim 18, wherein the instructions that cause the computing device to determine the set of advertisement-including sequences in the sequential content instance further cause the computing device to determine a first advertisement and a set of subsequent advertisements in each advertisement-including sequence, subsequent to the first advertisement, wherein each advertisement in the set of subsequent advertisements occurs within a time interval of a previous advertisement in each advertisement-including sequence.

23. The non-transitory computing device-readable storage medium of claim 18, wherein the instructions that cause the computing device to create the data structure of observed advertisement sequences comprising the set of advertisement-including sequences further cause the computing device to:
  create a set of chronological tree structures, wherein a chronological tree structure in the set of chronological tree structures encodes a chronology and identity of advertisements and non-advertisement content in an advertisement-including sequence; and
  create an index of the set of chronological tree structures.

24. The non-transitory computing device-readable storage medium of claim 22, wherein the instructions that cause the computing device to perform the search for the at least one reported sequence of advertisements in a data structure of observed advertisement sequences further cause the computing device to search the index of the set of chronological tree structures for the at least one reported sequence of advertisements, wherein the result of the search comprises the advertisement-including sequence, wherein the instructions further cause the computing device to determine the characteristic of the media content to associate with the advertisement television-type device according to the characteristic of the media content associated with the advertisement-including sequence, wherein the characteristic of the media content comprises at least one of a day-time, a broadcaster, a local/national categorization, whether the reported chronological tree structure comprised an advertisement family identifier or a specific advertisement identifier, a schedule identifier, a channel identifier, an advertisement slot identifier, a first-time-airing identifier, and a temporal rating.

* * * * *